US010268273B1

(12) United States Patent
Sundaram et al.

(10) Patent No.: US 10,268,273 B1
(45) Date of Patent: Apr. 23, 2019

(54) STYLUS WITH MULTIPLE INPUTS

(71) Applicant: Apple Inc., Cupertino, CA (US)

(72) Inventors: Sridhar Sundaram, Santa Clara, CA (US); Kevin M. Keeler, Saratoga, CA (US); Dinesh C. Mathew, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/593,219

(22) Filed: May 11, 2017

Related U.S. Application Data

(60) Provisional application No. 62/385,878, filed on Sep. 9, 2016.

(51) Int. Cl.
| | |
|---|---|
| *G06F 3/01* | (2006.01) |
| *G06F 3/038* | (2013.01) |
| *G06F 3/041* | (2006.01) |
| *G06F 3/0346* | (2013.01) |
| *G06F 3/0354* | (2013.01) |

(52) U.S. Cl.
CPC ............ *G06F 3/016* (2013.01); *G06F 3/0346* (2013.01); *G06F 3/0383* (2013.01); *G06F 3/03545* (2013.01); *G06F 3/041* (2013.01); *G06F 2203/04105* (2013.01)

(58) Field of Classification Search
CPC ........ G06F 3/016; G06F 3/041; G06F 3/0346; G06F 3/0381; G06F 3/03545
USPC ............... 345/156–184; 33/24.2, 558; 343/2; 369/181
See application file for complete search history.

(56) References Cited

U.S. PATENT DOCUMENTS

| | | | | |
|---|---|---|---|---|
| 5,491,904 A | * | 2/1996 | McMurtry | G01B 5/012 33/558 |
| 5,942,733 A | * | 8/1999 | Allen | G06K 9/00335 178/18.01 |

(Continued)

FOREIGN PATENT DOCUMENTS

KR            100286611 B1      1/2001

OTHER PUBLICATIONS

Wang et al., "Electroactive polymers for sensing," Interface Focus 6: 20160026, The Royal Society Publishing, Jun. 2016, 20 pages.

(Continued)

*Primary Examiner* — Prabodh M Dharia
(74) *Attorney, Agent, or Firm* — Dickinson Wright RLLP

(57) ABSTRACT

According to some embodiments, an electronic stylus including flexible contact members disposed at a distal end of the housing, and at least some of which are capable of independently flexing relative to one another when contacting a protective layer of an electronic device. The components further include a sensor capable of (i) detecting a change in flexure of the flexible contact members in accordance with the contacting, and (ii) responding to the change in flexure by providing a corresponding detection signal. The components can include a processor capable of generating a feedback instruction that is based upon the change in flexure. The component can include a communications unit that responds to the feedback instruction by transmitting a feedback parameter to the electronic device such that a graphical output is presented at a display of the electronic device in accordance with the change in flexure.

20 Claims, 54 Drawing Sheets

(56) References Cited

U.S. PATENT DOCUMENTS

| | | | |
|---|---|---|---|
| 6,353,414 B1* | 3/2002 | Jones | G06F 1/1626 |
| | | | 343/702 |
| 6,809,462 B2 | 10/2004 | Pelrine et al. | |
| 6,894,683 B2 | 5/2005 | Clapper et al. | |
| 7,424,154 B2 | 9/2008 | Seto et al. | |
| 9,239,622 B2 | 1/2016 | Park et al. | |
| 9,329,703 B2 | 5/2016 | Falkenburg et al. | |
| 2005/0248549 A1 | 11/2005 | Dietz et al. | |
| 2006/0001654 A1 | 1/2006 | Smits | |
| 2008/0055279 A1 | 3/2008 | Osada et al. | |
| 2008/0238879 A1* | 10/2008 | Jaeger | G06F 3/03545 |
| | | | 345/173 |
| 2009/0022332 A1 | 1/2009 | Van Schaack et al. | |
| 2009/0122024 A1* | 5/2009 | Nakamura | G06F 3/0416 |
| | | | 345/173 |
| 2010/0171718 A1* | 7/2010 | Denda | G06F 3/044 |
| | | | 345/173 |
| 2011/0115751 A1 | 5/2011 | Wernersson | |
| 2011/0304577 A1* | 12/2011 | Brown | G06F 3/03545 |
| | | | 345/174 |
| 2011/0320204 A1 | 12/2011 | Locker et al. | |
| 2012/0127088 A1 | 5/2012 | Pance et al. | |
| 2012/0327040 A1* | 12/2012 | Simon | G06F 3/03545 |
| | | | 345/179 |
| 2013/0002580 A1* | 1/2013 | Sudou | G06F 3/038 |
| | | | 345/173 |
| 2013/0106794 A1 | 5/2013 | Logan et al. | |
| 2013/0194242 A1 | 8/2013 | Park et al. | |
| 2013/0234967 A1* | 9/2013 | Stoddard | G06F 3/03545 |
| | | | 345/173 |
| 2013/0234986 A1 | 9/2013 | Elias | |
| 2013/0265218 A1* | 10/2013 | Moscarillo | G06F 3/017 |
| | | | 345/156 |
| 2013/0307829 A1 | 11/2013 | Libin | |
| 2014/0028592 A1 | 1/2014 | Wang et al. | |
| 2014/0043289 A1* | 2/2014 | Stern | G06F 3/044 |
| | | | 345/174 |
| 2014/0062966 A1* | 3/2014 | Szymanski | G06F 3/03545 |
| | | | 345/179 |
| 2014/0078070 A1 | 3/2014 | Armstrong-Muntner | |
| 2014/0078117 A1 | 3/2014 | Asano | |
| 2014/0168124 A1 | 6/2014 | Park et al. | |
| 2014/0198069 A1 | 7/2014 | Park et al. | |
| 2014/0210756 A1 | 7/2014 | Lee et al. | |
| 2014/0285453 A1 | 9/2014 | Park et al. | |
| 2014/0340318 A1* | 11/2014 | Stringer | G06F 3/03545 |
| | | | 345/173 |
| 2015/0029136 A1 | 1/2015 | Shahpamia | |
| 2015/0177838 A1 | 6/2015 | Bae et al. | |
| 2015/0241970 A1 | 8/2015 | Park et al. | |
| 2015/0261382 A1* | 9/2015 | Lin | G06F 3/03545 |
| | | | 345/175 |
| 2015/0338993 A1* | 11/2015 | Holtz | G06F 3/03545 |
| | | | 345/179 |
| 2016/0044422 A1 | 2/2016 | Aurongzeb et al. | |
| 2016/0048225 A1* | 2/2016 | Curtis | G06F 3/044 |
| | | | 345/173 |
| 2016/0054820 A1 | 2/2016 | Sezgin et al. | |
| 2016/0109972 A1* | 4/2016 | Hyde | G06F 3/041 |
| | | | 345/173 |
| 2016/0188205 A1* | 6/2016 | Rao | H04L 63/08 |
| | | | 715/773 |
| 2016/0209957 A1* | 7/2016 | Jung | G06F 3/044 |
| 2016/0231833 A1 | 8/2016 | Gu et al. | |
| 2016/0282970 A1 | 9/2016 | Evreinov et al. | |
| 2016/0306426 A1* | 10/2016 | Modarres | G06F 3/0412 |
| 2017/0176171 A1* | 6/2017 | Harsila | G01B 1/00 |
| 2017/0177136 A1* | 6/2017 | Chandran | G06F 3/0416 |
| 2017/0262086 A1 | 9/2017 | Ogata et al. | |
| 2017/0285774 A1 | 10/2017 | Parikh et al. | |
| 2018/0046249 A1 | 2/2018 | Peretz et al. | |
| 2018/0188830 A1 | 7/2018 | Kim et al. | |
| 2018/0329529 A1* | 11/2018 | Stringer | G06F 3/03545 |

OTHER PUBLICATIONS

Ozsecen et al., "Nonlinear Force Control of Dielectric Electroactive Polymer Actuators," Electroactive Polymer Actuators and Devices (EAPAD), Proc. of SPIE, vol. 7642, Mar. 2010, pp. 76422C-1-76422C-8, 8 pages.

El-Sayed et al., "Development of a Micro-Gripper Using Piezo-electric Bimorphs," MDPI, Sensors 13, No. 5, May 7, 2013, pp. 5826-5840, 15 pages.

"Haptics—Solutions for ERM and LRA Actuators," Texas Instruments, 2013, 5 pages.

* cited by examiner

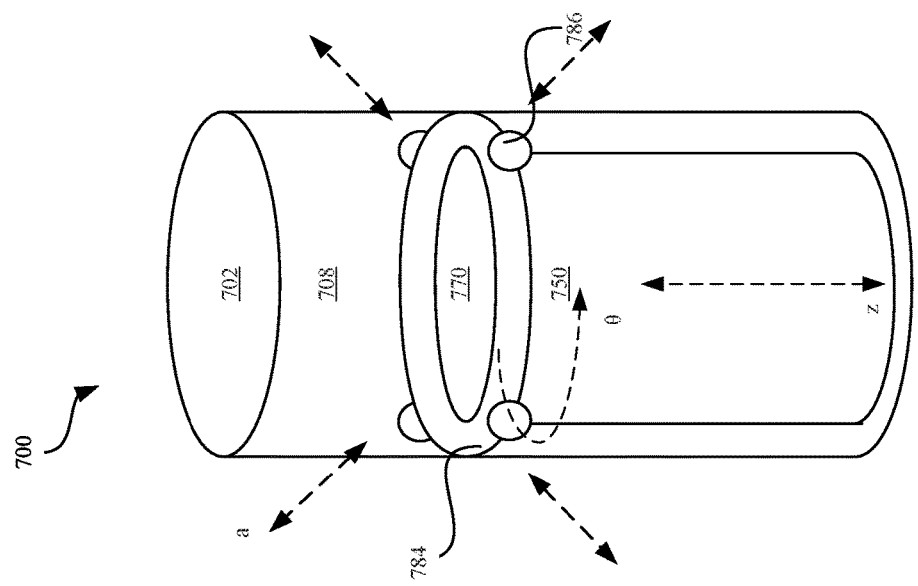
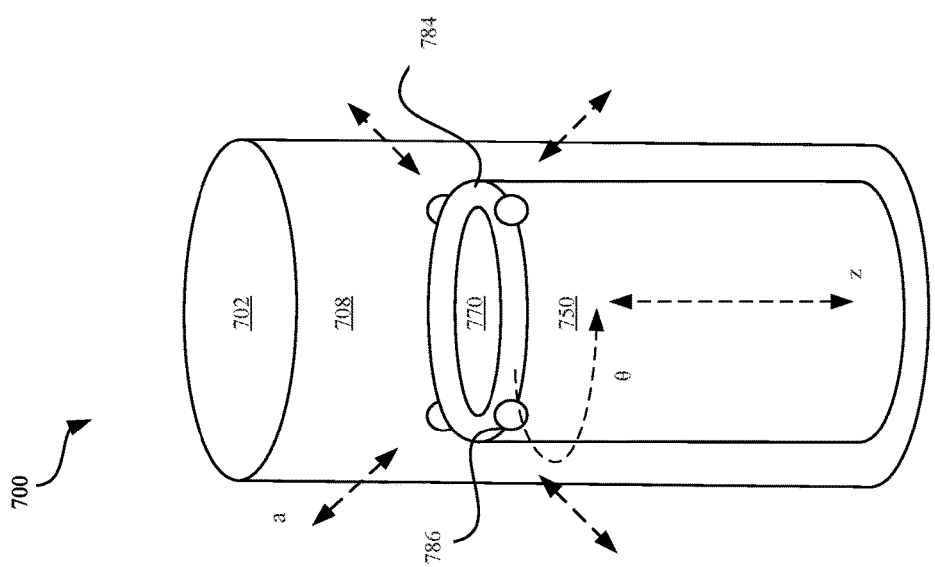

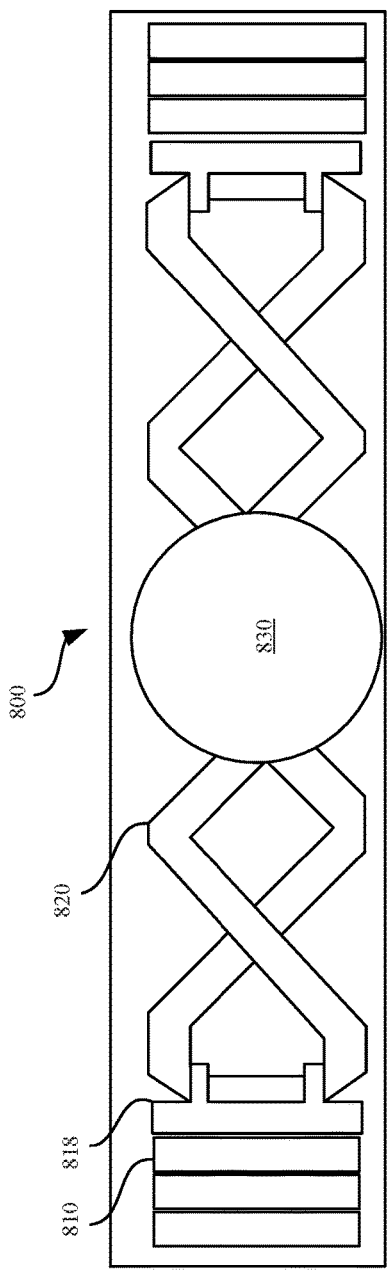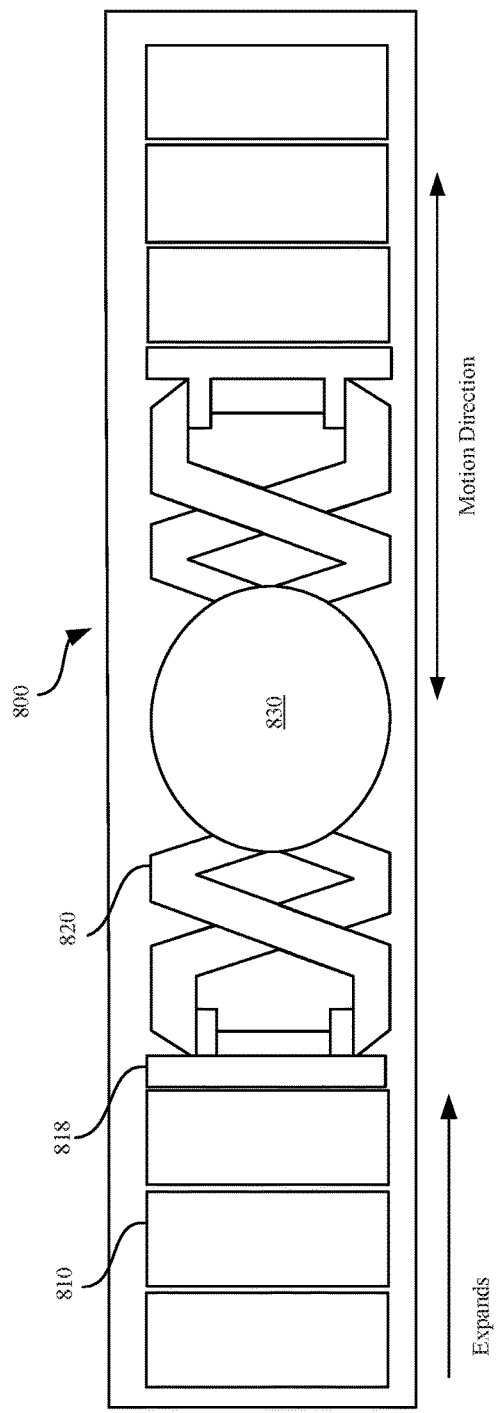
FIG. 8A
FIG. 8B

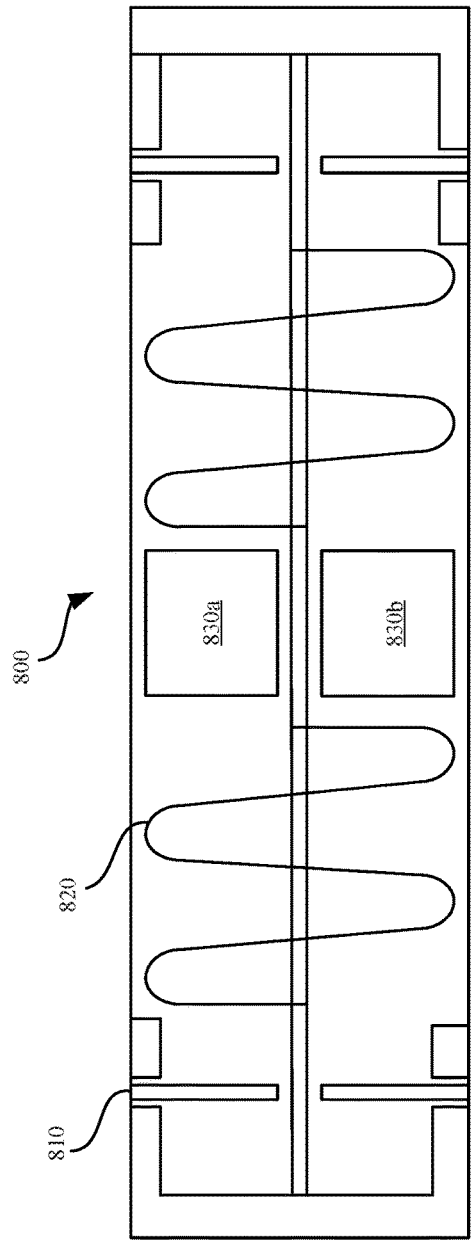
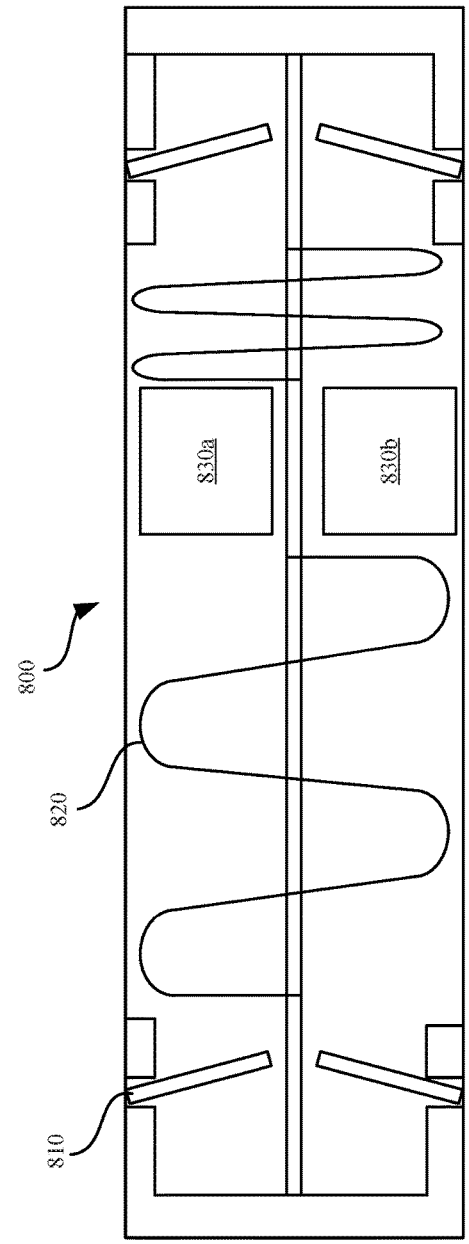
FIG. 8D
FIG. 8E

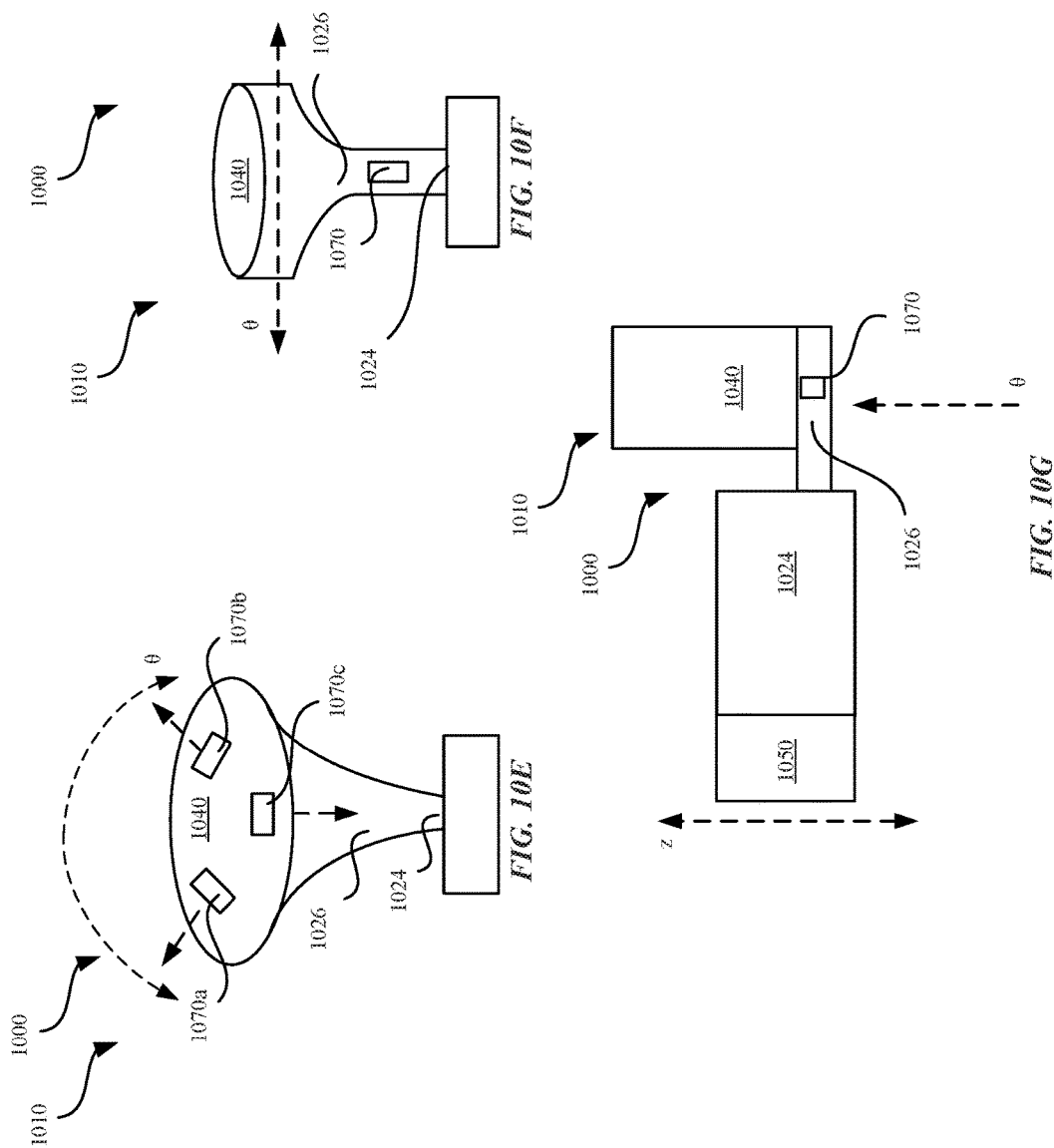

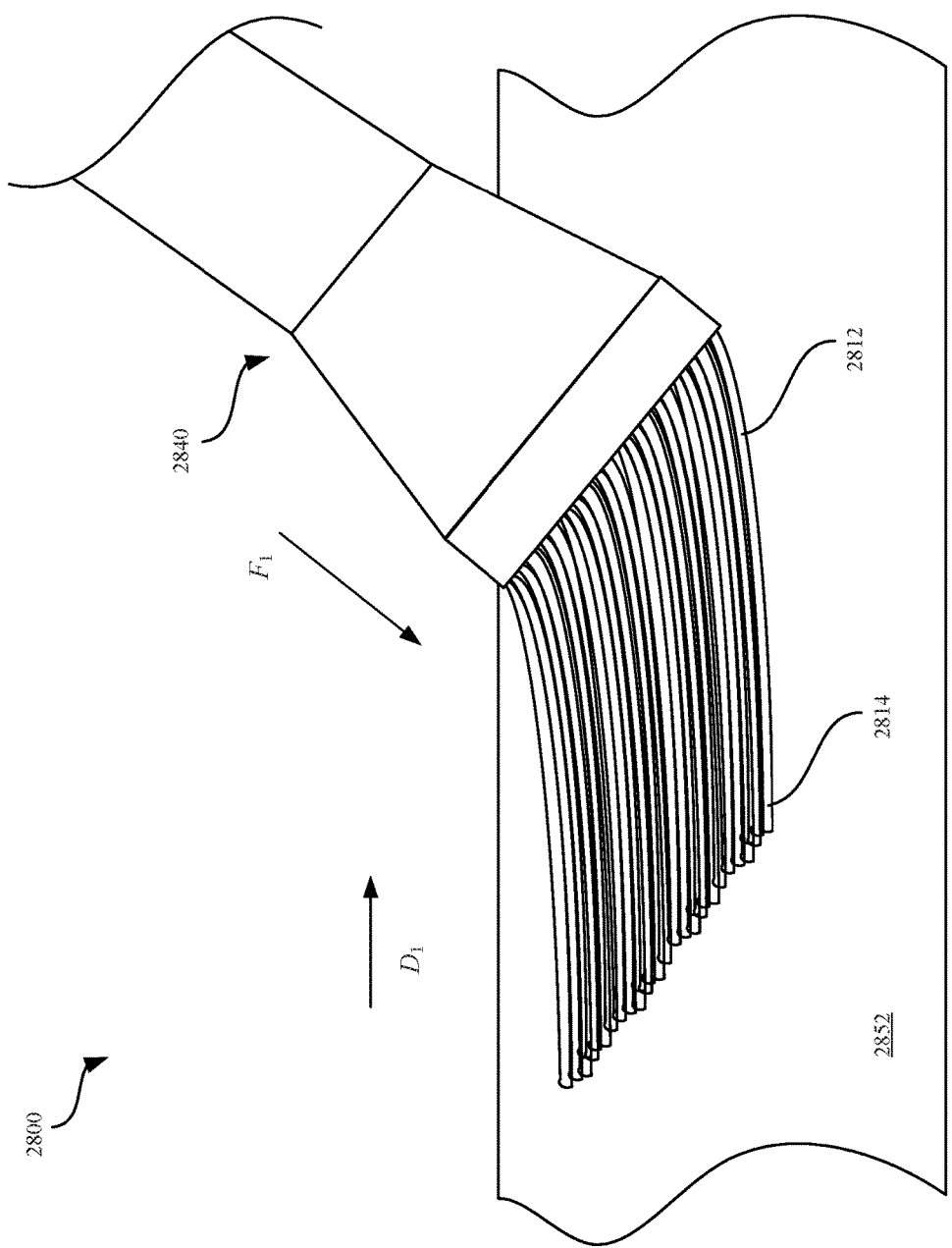

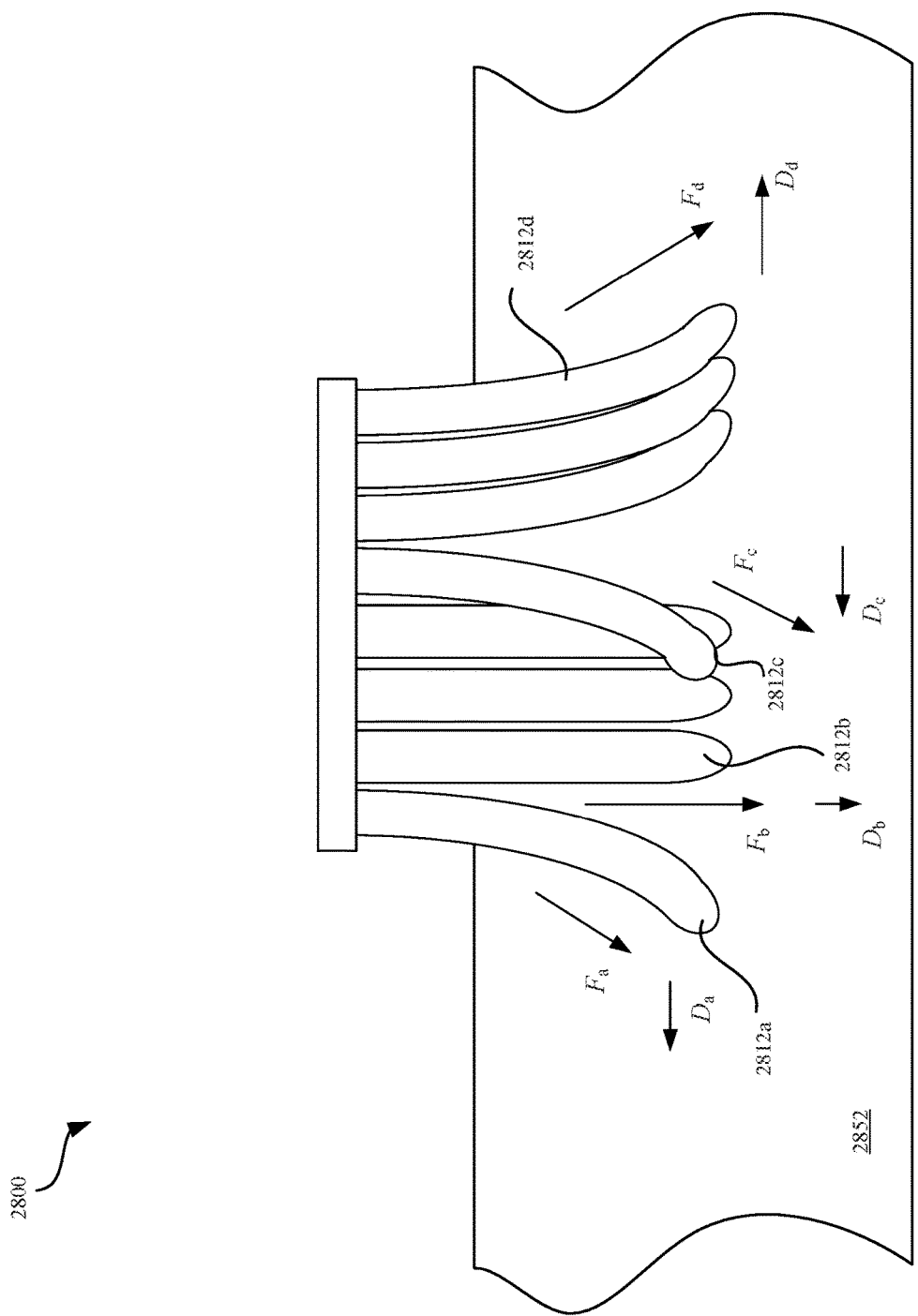

STYLUS WITH MULTIPLE INPUTS

CROSS-REFERENCE TO RELATED APPLICATIONS

The present application claims the benefit of U.S. Provisional Application No. 62/385,878, entitled "STYLUS WITH MULTIPLE INPUTS" filed Sep. 9, 2016, the contents of which are incorporated herein by reference in its entirety for all purposes.

This application is related to U.S. patent application Ser. No. 15/592,029, entitled "STIFFNESS RENDERING FOR A PENCIL", by Wang et al., filed May 10, 2017, U.S. patent application Ser. No. 15/593,225, entitled "ACOUSTICS TO MATCH PENCIL/STYLUS INPUT", by Wang et al., filed May 11, 2017, and U.S. patent application Ser. No. 15/593,240, entitled "APPLE PENCIL HAPTICS", by Taylor et al., filed May 11, 2017, the contents of which are incorporated by reference herein in their entirety for all purposes.

FIELD

The described embodiments relate to a portable electronic device having flexible contact members. More specifically, each of the flexible contact members is capable of independently flexing relative to one another, and the touch sensitive device can generate a feedback response that is based on a change in flexure of the flexible contact members.

BACKGROUND

Electronic devices can include a touch screen that can provide an immersive multimedia user experience when used in interaction with an electronic stylus. Despite advancements in software to render the user's inputs and commands more accurately at the touch screen, the touch screen is unable to fully render the user's inputs due to limitations in the hardware of the electronic stylus. Accordingly, there is a need to improve upon the user's multimedia experience by implementing flexible contact members at the electronic stylus.

SUMMARY

This paper describes various embodiments related to a portable electronic device having flexible contact members. More specifically, each of the flexible contact members is capable of independently flexing relative to one another, and the touch sensitive device can generate a feedback response that is based on a change in flexure of the flexible contact members.

According to some embodiments, an electronic stylus for use with an electronic device having a display assembly overlaid by a protective layer, the display assembly including a touch sensitive surface that overlays a display, is described. The electronic stylus can include a housing that carries components, where the components can include flexible contact members disposed at a distal end of the housing, and at least some of which are capable of independently flexing relative to one another when contacting the protective layer. The components can further include a sensor coupled to the flexible contact members, the sensor capable of (i) detecting a change in flexure of the flexible contact members in accordance with the contacting, and (ii) responding to the change in flexure by providing a corresponding detection signal. The components can further include a processor in communication with the sensor and capable of receiving the detection signal, the processor capable of generating a feedback instruction that is based upon the change in flexure. The components can further include a communications unit coupled to and capable of receiving the feedback instruction from the processor, where the communications unit responds to the feedback instruction by transmitting a feedback parameter to the electronic device such that a graphical output is presented at the display in accordance with the change in flexure.

According to some embodiments, an accessory device is described. The accessory device can include a housing having walls that define a cavity, where the housing carries operational components in the cavity that include a processor capable of providing instructions and a flexible tip extending through an opening at a distal end of the housing, wherein the flexible tip is capable of flexing when a stimulus originating from outside the housing transmits a load through the flexible tip. The operational components can further include a sensor coupled to the processor and the flexible tip, wherein the sensor is capable of (i) detecting an alteration in a physical characteristic of the flexible tip in accordance with the flexing, and, in response (ii) generating a contact parameter based on the altered physical characteristic.

According to some embodiments, a method for generating feedback at an electronic stylus that includes a housing, a sensor carried by walls of the housing, a flexible contact member coupled to the sensor, a processor in communication with the sensor, and a communications unit coupled to the processor, is described. The method can include in response to detecting, by the sensor, a change in flexure of the flexible contact member caused by an interaction between the flexible contact member and a touch sensitive portion of an electronic device: receiving, by the processor, a contact feedback parameter from the sensor that is based on the change in flexure, and instructing, by the processor, the communications unit to transmit the contact feedback parameter to the electronic device.

The described embodiments may be better understood by reference to the following description and the accompanying drawings. Additionally, advantages of the described embodiments may be better understood by reference to the following description and accompanying drawings.

BRIEF DESCRIPTION OF THE DRAWINGS

The disclosure will be readily understood by the following detailed description in conjunction with the accompanying drawings, wherein like reference numerals designate like structural elements, and in which:

FIGS. 7A-7B illustrate perspective views of a haptic feedback component that can be implemented in the touch sensitive device, in accordance with some embodiments.

FIGS. 8A-8E illustrate cross-sectional views of the haptic feedback component that can be implemented in the touch sensitive device, in accordance with various embodiments.

FIGS. 10A-10G illustrate perspective views of a touch sensitive device that includes a cantilever haptic feedback component, in accordance with various embodiments.

FIGS. 28A-28B illustrate perspective views of the touch sensitive device in contact with the electronic device, in accordance with some embodiments.

Figure 1:
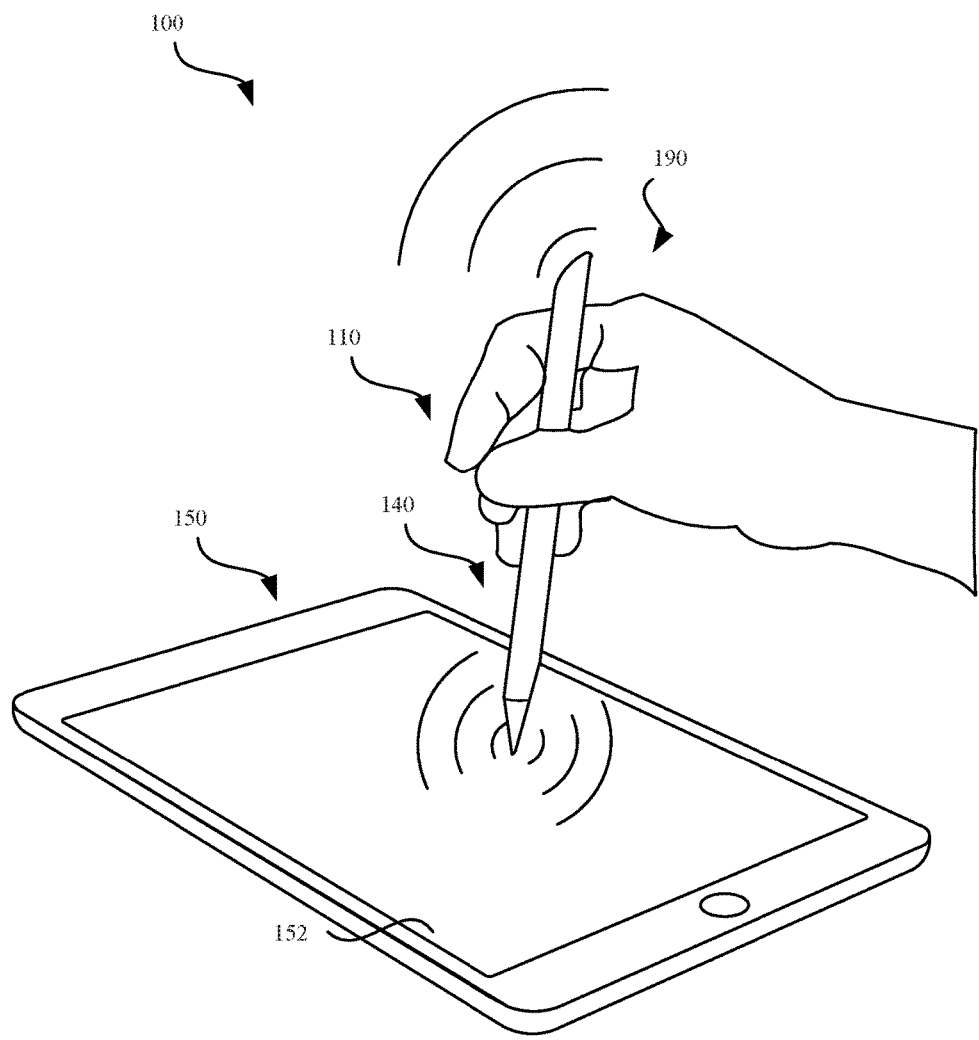
FIG. 1 illustrates a perspective view of a system for generating haptic feedback and audible feedback, in accordance with some embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

The following disclosure describes various embodiments of a portable electronic device having flexible contact members. Certain details are set forth in the following description and figures to provide a thorough understanding of various embodiments of the present technology. Moreover, various features, structures, and/or characteristics of the present technology can be combined in other suitable structures and environments. In other instances, well-known structures, materials, operations, and/or systems are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

Conventional electronic devices include touch screen displays that generate graphical images based on user input implemented by an electronic stylus. Despite advancements made in software that have allowed the touch screen displays to render the user's inputs and commands to be more accurately rendered, the touch screen displays are unable to fully capture the user's inputs and intentions due to limitations in the hardware of the electronic stylus. Therefore, there is a need to improve the manner in which electronic styluses provide user inputs and commands to the touch screen display. The techniques and components described herein relate to a portable electronic device capable having flexible contact members that are capable of interacting with a touch screen of a computing device, and each of the flexible contact members are capable of independently flexing relative to one another during the interaction. The portable electronic device can generate a feedback parameter that is based on the change in flexure of each of the flexible contact members. Subsequently, the feedback parameter can be transmitted to the computing device, so as to cause the computing device to provide a graphical output at the touch screen that is based on the change in flexure. Such techniques and components may be advantageous to graphical artists drawing with an electronic stylus, where the accuracy and representation of graphical images generated by the touch screen more accurately reflect the user's intentions.

One of the components described herein is a "audible feedback component" which is interchangeably used with the term "acoustic feedback component", and refers to generating audible feedback or acoustic feedback in response to contact that is made between an interface unit of a touch sensitive device and an electronic device.

As used herein, the term "haptic feedback" can refer to simulating a sensation of touch by applying force, vibrations, or motions that can be perceived by the nerves within the user's appendages. As described herein, haptic feedback can involve the transformation, displacement, oscillation, vibration, or modification of a body of material (e.g., substrate) from an initial configuration to a modified configuration in order to provide feedback that can be perceived by a user. In some embodiments, the haptic feedback perceived by the user is caused by force being exerted by a haptic feedback component against a housing of the electronic device. The haptic feedback can simulate a sensation of touch at a user's nerves present in the user's appendages (e.g., fingers, hand, palm, toes, etc.) as well as other body parts (e.g., lips, nose, etc.).

As used herein, the term "touch sensitive device" can refer to an instrument that is capable of inputting a request or command to a surface of an electronic device. The surface can include a display, screen, or panel that is pressure-sensitive or has touch screen capabilities. The surface of the electronic device can detect different input commands or requests according to an amount of pressure that is applied against the surface, the amount of strain that is applied against the surface, an angle of the input command, velocity of the input command, acceleration of the input command, and the like. The term "touch sensitive" can refer to adjusting the input command or request based on the type of touch that is input to the screen.

According to some embodiments, an electronic stylus for use with an electronic device having a display assembly overlaid by a protective layer, the display assembly including a touch sensitive surface that overlays a display, is described. The electronic stylus can include a housing that carries components, where the components can include flexible contact members disposed at a distal end of the housing, and at least some of which are capable of independently flexing relative to one another when contacting the protective layer. The components can further include a sensor coupled to the flexible contact members, the sensor capable of (i) detecting a change in flexure of the flexible contact members in accordance with the contacting, and (ii) responding to the change in flexure by providing a corresponding detection signal. The components can further include a processor in communication with the sensor and capable of receiving the detection signal, the processor capable of generating a feedback instruction that is based upon the change in flexure. The components can further include a communications unit coupled to and capable of receiving the feedback instruction from the processor, where the communications unit responds to the feedback instruction by transmitting a feedback parameter to the electronic device such that a graphical output is presented at the display in accordance with the change in flexure.

The various embodiments set forth herein are provided to generate an amount of audible feedback in accordance with interaction between an interface unit of the touch sensitive device and another electronic device. Exemplary electronic devices that can include the audible feedback component can include, but are not limited to, portable electronic devices, styluses, smartphones, smartwatches, consumer devices, wearable electronic devices, tablet computers, laptops, computing devices, and the like, such as those manufactured by Apple Inc., based in Cupertino, Calif.

The foregoing provides various electronic devices capable of providing audible feedback. A more detailed discussion of these electronic devices is set forth below and described with reference to FIGS. 1-37, which illustrate detailed diagrams of devices and components that can be used to implement these techniques and features.

FIG. 1 illustrates a perspective view of a system 100 for generating haptic feedback and audible feedback by a touch sensitive device 110 in conjunction with contact between the touch sensitive device 110 and an electronic device 150. The touch sensitive device 110 is configured to be physically manipulated by a user to contact the touch screen panel 152. In some examples, the touch screen panel 152 can be referred to as a surface, a panel, a display. The touch screen panel 152 can also be referred to as pressure-sensitive. In some examples, the touch sensitive device 110 can refer to a stylus or pencil, such as the Apple Pencil® manufactured by Apple Inc. As described herein, haptic feedback can refer to stimulation of nerves within a user's fingers. Haptic feedback can simulate a sensation of touch by applying force, vibrations, or motions that can be perceived by the user. The touch sensitive device 110 includes one or more haptic feedback components 140 that are configured to generate electrostatic signals that can penetrate a housing of the touch sensitive device 110 to stimulate the nerves of the user's fingers. In some embodiments, the haptic feedback component 140 utilizes a piezoelectric element to induce the haptic feedback. In some embodiments, the terms piezoelectric element, actuator, and piezoelectric actuator can be used interchangeably in the embodiments described herein.

The haptic feedback component 140 is configured to generate different types of haptic feedback based on mechanical input between the touch sensitive device 110 and the touch screen panel 152. In some embodiments, the haptic feedback component 140 is configured to impart haptic feedback in a plurality of different directions/dimensions. For example, the haptic feedback component 140 can be configured to simulate the physical sensation of moving a paintbrush across a canvas that is displayed by the touch screen panel 152. In another example, the haptic feedback component 140 can be configured to simulate a difference between a wet paintbrush and a dry paintbrush that is displayed on the touch screen panel 152. In another example, the haptic feedback component 140 can increase oscillation of a mass in order to simulate moving a paintbrush across a rough surface (e.g., wood) that is displayed by the touch screen panel 152. In another example, the haptic feedback component 140 can be configured to simulate the effect of a pencil rubbing against an edge of a piece of paper. Notably, the haptic feedback component 140 can be configured to independently generate different types of haptic feedback without requiring haptic feedback instructions from the electronic device 150. Although in some embodiments, haptic feedback generated by the haptic feedback component 140 can be based on a haptic feedback parameter that is generated by the electronic device 150.

As described herein, a sound effect is generated by the audible feedback component 190 (e.g., speaker) in conjunction with contact between the touch sensitive device 110 and the touch screen panel 152. In some examples, the audible feedback refers to a sound effect that can be perceived within the human hearing range (e.g., 20 Hz to about 20 kHz). In some embodiments, the sound effect can be generated by an audible feedback component 190, where the sound effect is based on an audible feedback parameter provided by the electronic device 150. The electronic device 150 can represent, for example, a portable computer, a tablet, a smartphone, or other electronic device with a touch screen display.

Figure 2A:
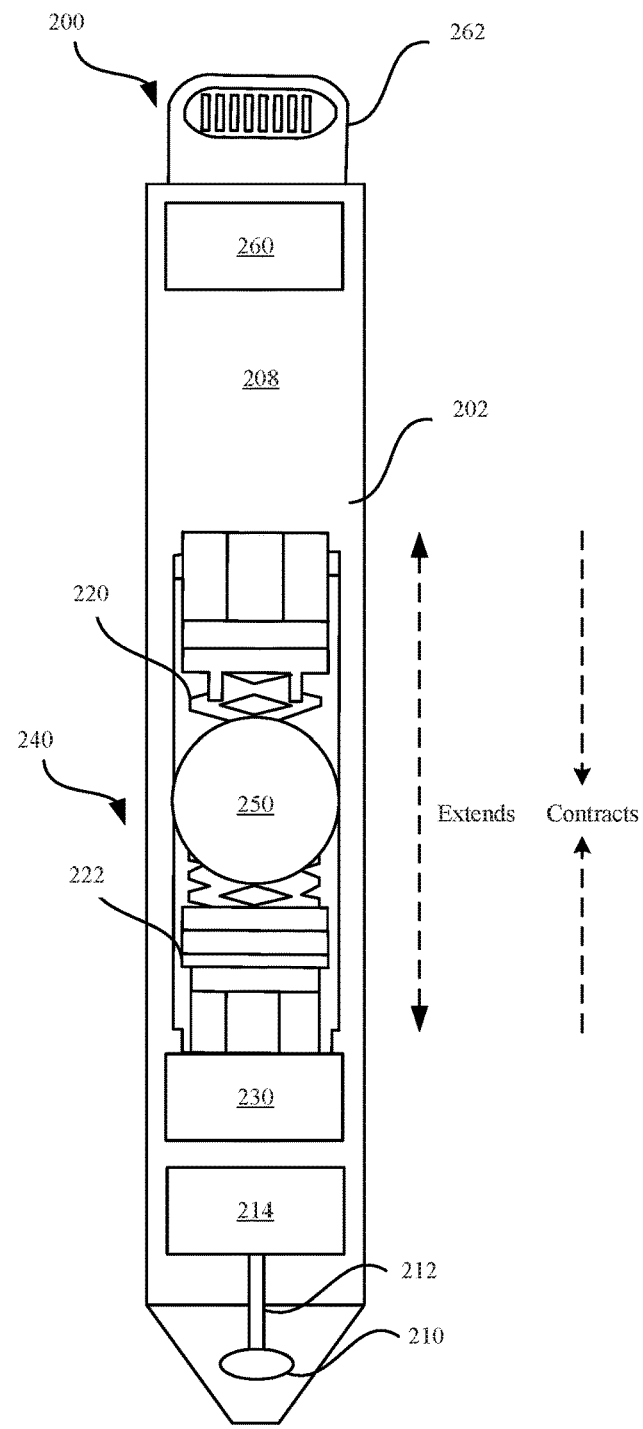
FIGS. 2A-2D illustrate cross-sectional views of touch sensitive devices that include an axial haptic feedback component, in accordance with various embodiments.

FIGS. 2A-2D illustrate a touch sensitive device 200 including an axial haptic feedback component 240, in accordance with various embodiments. FIG. 2A illustrates a cross-sectional view of a touch sensitive device 200 that includes an axial haptic feedback component 240 in an internal cavity 208, in accordance with some embodiments. In some embodiments, the axial haptic feedback component 240 can include a bimorph actuator. As shown in FIG. 2A, the touch sensitive device 200 includes a conductive tip 210 that is positioned at a distal end of the touch sensitive device 200. In some embodiments, the conductive tip 210 refers to a point that is configured to physically contact the touch screen panel 152 of the electronic device 150. In some embodiments, the conductive tip 210 can be referred to as a distal interface unit or an interface unit. In some embodiments, the distal interface unit 210 extends through an opening of a distal end of the elongated housing 202. Although FIG. 2A shows that the conductive tip 210 is substantially pointed in order to provide precise mechanical input to the touch screen panel 152 of the electronic device 150, the conductive tip 210 can correspond to any number of shapes, including round, blunt, and the like.

In some embodiments, the conductive tip 210 can be configured to form an electrically conductive pathway with electrodes of conductive sensors of the touch screen panel 152. In such a configuration, the conductive tip 210 can be formed of material having electrically conductive properties, such as copper, aluminum, and the like. The conductive tip 210 is coupled to an elongated housing 202 or extended through an opening of an elongated housing 202 of the touch sensitive device 200 having walls. In some embodiments, the elongated housing 202 can be formed of material characterized as being an electrical insulating material, such as rubber, plastic, synthetic polymers, and the like. In this manner, the conductive tip 210 can be electrically isolated from the elongated housing 202 of the touch sensitive device 200 to prevent the user's fingers from acting as a ground for the conductive tip 210. In other words, the elongated housing 202 can be formed of a material that is different from the conductive tip 210.

In some embodiments, the conductive tip 210 can be fixedly coupled to a retaining member (not illustrated) of the elongated housing 202. In this configuration, when pressure is applied against the conductive tip 210, the conductive tip 210 does not move in response to the applied pressure. In some embodiments, the conductive tip 210 is moveable relative to the retaining member (not illustrated) of the elongated housing 202. In this instance, when pressure is applied against the conductive tip 210, the conductive tip 210 is configured to move in a direction that corresponds to the direction of the applied pressure.

In some embodiments, the elongated housing 202 includes a conductive electrode 212 that is electrically coupled to the conductive tip 210. The conductive electrode 212 can be electrically coupled to a capacitive sensor 214 that is configured to detect a change in capacitance between the conductive tip 210 and the electrodes of the conductive sensors of the touch screen panel 152. The conductive electrode 212 is configured to detect a mechanical input (e.g., physical contact) that is applied by the conductive tip 210 against the touch screen panel 152 by generating an electrical current that corresponds to the amount of the mechanical input. In conjunction with the mechanical input between the conductive tip 210 and the touch screen panel 152, the conductive electrode 212 is configured to detect for changes in capacitance. Subsequently, the conductive electrode 212 transmits an electrical current that corresponds to the capacitive change to the capacitive sensor 214. The capacitive sensor 214 is configured to convert the electrical current into an electrical signal that is proportional to the amount of the electric current. In some examples, the electrical signal can refer to an alternating current (A/C) or a direct current (D/C) signal. Subsequently, the electrical signal can be transmitted to a controller 230. The controller 230 can be configured to generate a contact parameter based upon the electrical signal.

Although FIG. 2A illustrates that the touch sensitive device 200 includes a single conductive electrode 212, the touch sensitive device 200 can include a plurality of conductive electrodes 212 to increase the number of electrical signals and the types of electrical signals that are received by the controller 230 during a given time. For example, a touch sensitive device 200 that includes a plurality of conductive electrodes 212 that are each electrically coupled to the controller 230 via a dedicated wire or line (not illustrated) can cause the touch sensitive device 200 to receive multiple capacitive change measurements.

In some embodiments, the touch sensitive device 200 includes a power supply 260 that is configured to supply energy to the controller 230 and to the axial haptic feedback component 240. In some examples, the power supply 260 is a rechargeable battery that is electrically coupled to a charging port 262. In some embodiments, the axial haptic feedback component 240 includes a coil element or spring 220, a piezoelectric element 222, and a mass 250. In conjunction with receiving an electrical signal from the capacitive sensor 214, the controller 230 includes a control logic component that is configured to generate a haptic feedback parameter. The haptic feedback parameter can specify an amount of input voltage to be provided to the piezoelectric element 222 from the power supply 260. The amount of input voltage that is generated by the power supply 260 can be proportional to the electric current that is detected by the capacitive sensor 214. The amount by which the piezoelectric element 222, spring 220, and the mass 250 are displaced by the input voltage can be proportional to the amount of input voltage.

In other embodiments, the axial haptic feedback component 240 can be configured to generate haptic feedback even in the absence of a power supply 260 or a power supply 260 that is non-functional. In one example, a user shaking the touch sensitive device 200 with sufficient force can cause the mass 250 and spring 220 to mechanically displace resulting in haptic feedback that is perceived by the user. In another example, the mass 250 and spring 220 can be configured to mechanically displace in the absence of an input voltage that is received from the power supply 260.

In some embodiments, the mass 250 can amplify the displacement of the piezoelectric element 222. In some examples, the mass 250 is comprised of tungsten or steel. Details of the axial haptic feedback component 240 are described in more detail with reference to FIGS. 8A-8B. As shown in FIG. 2A, the piezoelectric element 222, spring 220, and the mass 250 are configured to (1) extend in at least one of an axial direction (d1) or (2) contract in an axial direction (d2) in conjunction with an actuation mode.

In some embodiments, the capacitive sensor 214 can be configured to determine an approximate location along the elongated housing 202 where the moment of the mass 250 is localized. In some examples, the capacitive sensor 214 can determine where the user's fingers are positioned so that the capacitive sensor 214 can direct the mass 250 towards the position of the user's fingers such as by causing a rotation of the mass 250 via a rotating mechanism or by actuating a servo motor or piezo motor to actuate the mass 250 in the direction of the position of the user's fingers.

Although FIG. 2A shows that the axial haptic feedback component 240 utilizes a spring 220 to facilitate displacement of the mass 250, other embodiments of the axial haptic feedback component 240 can utilize a liquid to displace the mass 250. For example, the liquid can be a gel, ferrous liquid, and the like. In some embodiments, the spring 220 can refer to a magnetic spring.

In some embodiments, the elongated housing 202 can be comprised of material to simulate a skin shearing effect. The skin shearing effect can refer to a mechanical force that acts upon an area of the skin in a direction parallel to the body's surface. The amount of the skin shearing effect that is perceived by the user can correspond to (1) an amount of pressure exerted, (2) the coefficient of friction of the material of the elongate body 202, and (3) the extent to which the user's fingers make contact with the elongated housing 202. In response to the axial haptic feedback component 240 displacing the mass 250, areas of the elongated housing 202 that are adjacent to the mass 250 can be configured to bend, elongate, or extend. For example, material at these areas of the elongated housing 202 can be configured to extend in an axial direction to correspond with axial displacement of the mass 230. In some examples, the elongated housing 202 can be made of material that facilitate stretch, such as a shape-memory alloy.

Furthermore, the elongated housing 202 can be characterized as having a different type of texture than the conductive tip 210 in order to simulate the skin shearing effect. For example, the elongated housing 202 can have a textured surface such as ridges or grooves that are formed along an outer surface of the elongated housing 202.

In some embodiments, the touch sensitive device 200 includes a power supply 260. In some examples, the power supply 260 is a rechargeable battery such as a lithium-ion battery (Li-on), nickel metal hydride (NiMH) battery, and the like. Notably, the piezoelectric element 222 of the axial haptic feedback component 240 consumes a small amount of energy, e.g., about 1 milliwatts.

Figure 2B:
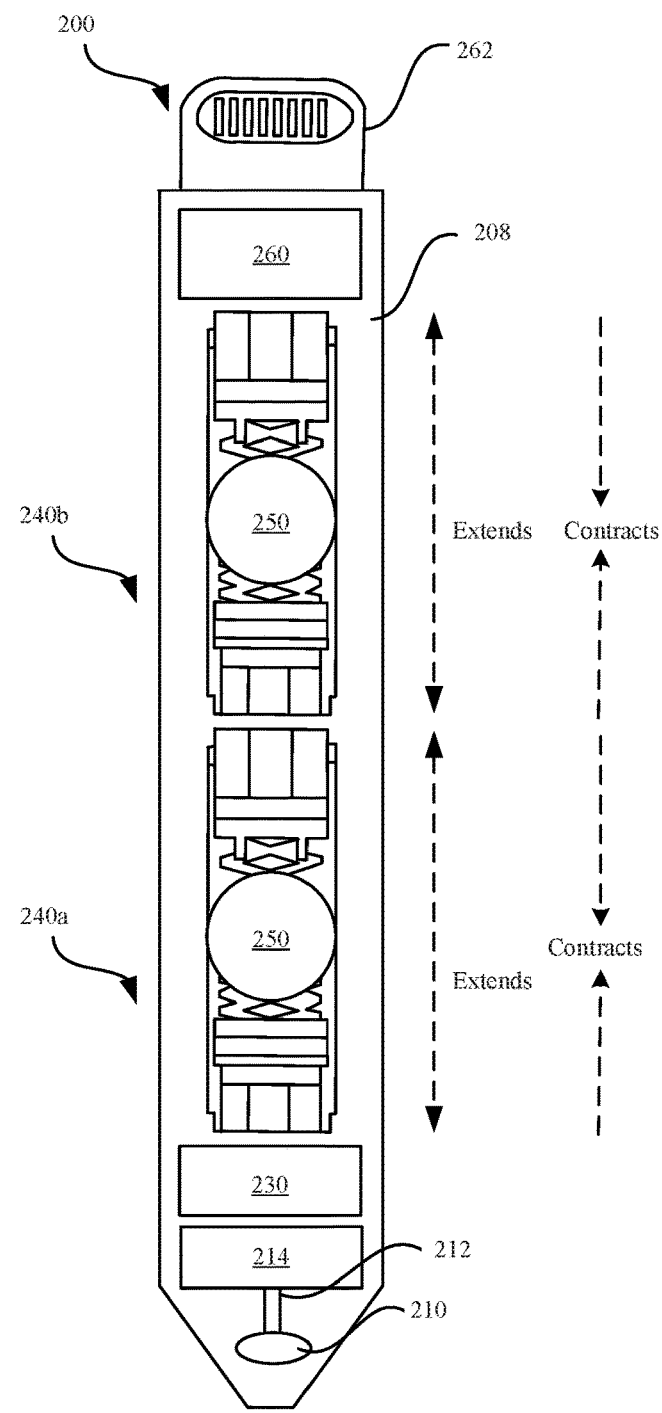

FIG. 2B illustrates a cross-sectional view of a touch sensitive device 200 that includes a plurality of axial haptic feedback components 240a, 240b that are stacked in a serial configuration in internal cavity 208, in accordance with some embodiments. As shown in FIG. 2B, axial haptic feedback component 240a is positioned closer towards the distal end (i.e., conductive tip 210) of the touch sensitive device 200, while the axial haptic feedback component 240b is positioned closer towards the proximal end (e.g., by the power supply 260) of the touch sensitive device 200. By providing multiple axial haptic feedback components 240a, 240b, the touch sensitive device 200 is configured to simultaneously provide different types of haptic feedback associated with multiple directionalities. In this manner, the amount of haptic feedback perceived by the user is magnified. Additionally, including a plurality of axial haptic feedback components 240a, 240b within the touch sensitive device 200 can ensure that regardless of wherever the user's fingers are positioned along the elongated housing 202 that the user will perceive some amount of haptic feedback.

As shown in FIG. 2B, each axial haptic feedback component 240a, 240b includes a piezoelectric element 222, a spring 220, and a mass 250. The piezoelectric element 222, spring 220, and mass 250 are configured to extend in at least one of an axial direction (d1) or contract in an axial direction (d2).

Figure 2C:
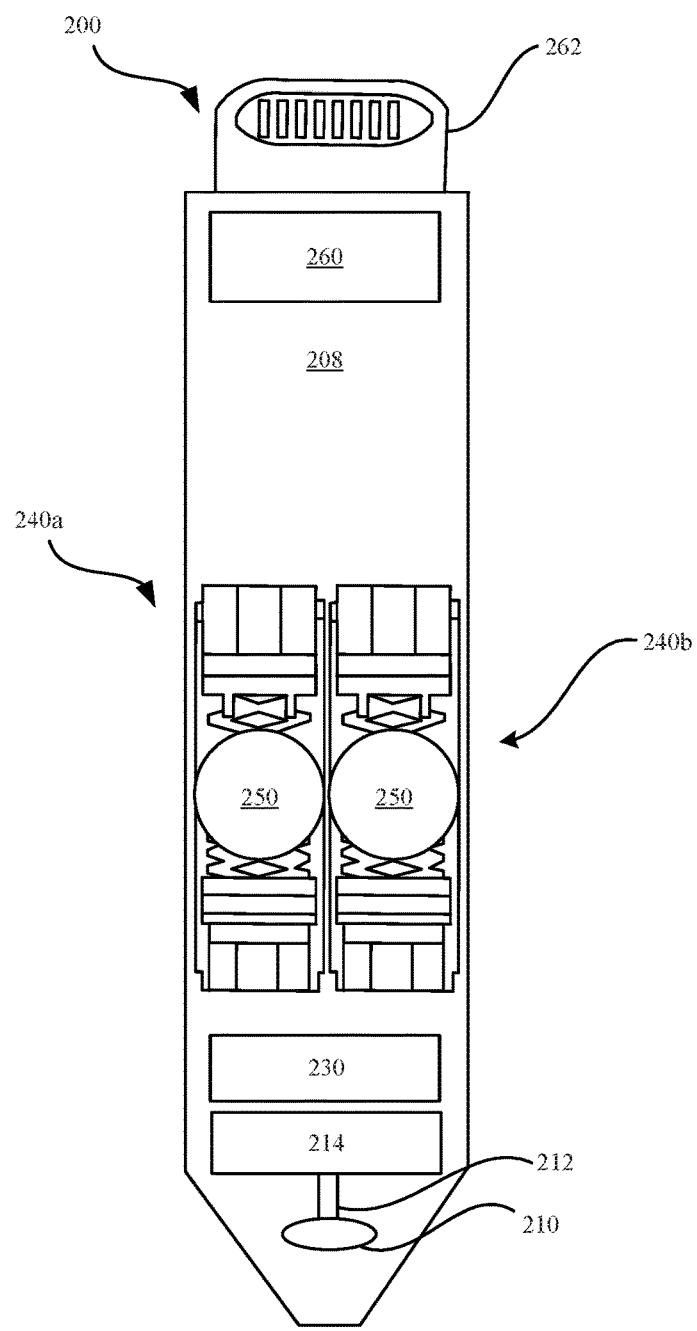

FIG. 2C illustrates a cross-sectional view of a touch sensitive device 200 that includes a plurality of axial haptic feedback components 240a, 240b that are each aligned parallel to each other in internal cavity 208, in accordance with some embodiments. As shown in FIG. 2C, each of the piezoelectric elements 222, spring 220, and the mass 250 of the axial haptic feedback components 240a, 240b are configured to extend in at least one of an axial direction (d1) or contract in an axial direction (d2). In this manner, the user can perceive an increased amount of localized haptic feedback along the periphery of the elongated housing 202. FIGS. 8D-8E illustrate an exemplary cross-sectional view of the axial haptic feedback components 240a, 240b that are aligned side-by-side.

The touch sensitive device 200 of FIGS. 2A-2C can include any number of axial haptic feedback components 240, and can be arranged in any suitable order or manner and can be modified according to any of the embodiments described herein.

Figure 2D:
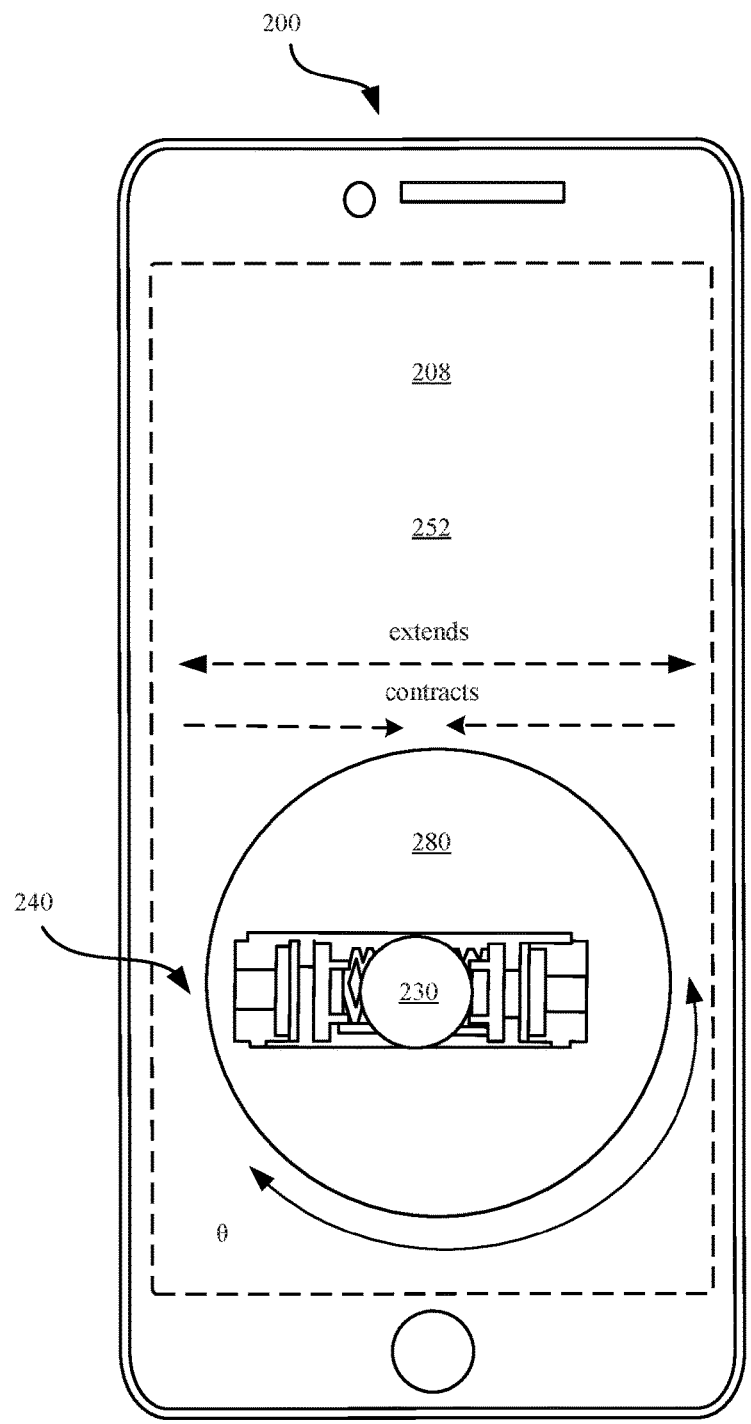

FIG. 2D illustrates a perspective view of a touch sensitive device 200 that includes an axial haptic feedback component 240 within an internal cavity 208, in accordance with some embodiments. The touch sensitive device 200 can refer to a portable electronic device, such as an iPhone® manufactured by Apple Inc. Unlike the various embodiments of the touch sensitive device 200 that involves generating haptic feedback by the touch sensitive device 200 based on contact between the touch sensitive device 200 and the electronic device 150, the embodiment of the touch sensitive device 200 as shown in FIG. 2D) includes a touch screen panel 252 that includes capacitance sensors that are configured to detect changes in capacitance. Based upon the detected changes in capacitance, the axial haptic feedback component 240 can generate haptic feedback that can be perceived by the user. In some embodiments, the axial haptic feedback component 240 is coupled to a rotating mechanism 280 that is configured to rotate the axial haptic feedback component 240 along an angular direction (θ) within the touch sensitive device 200.

Figure 3:
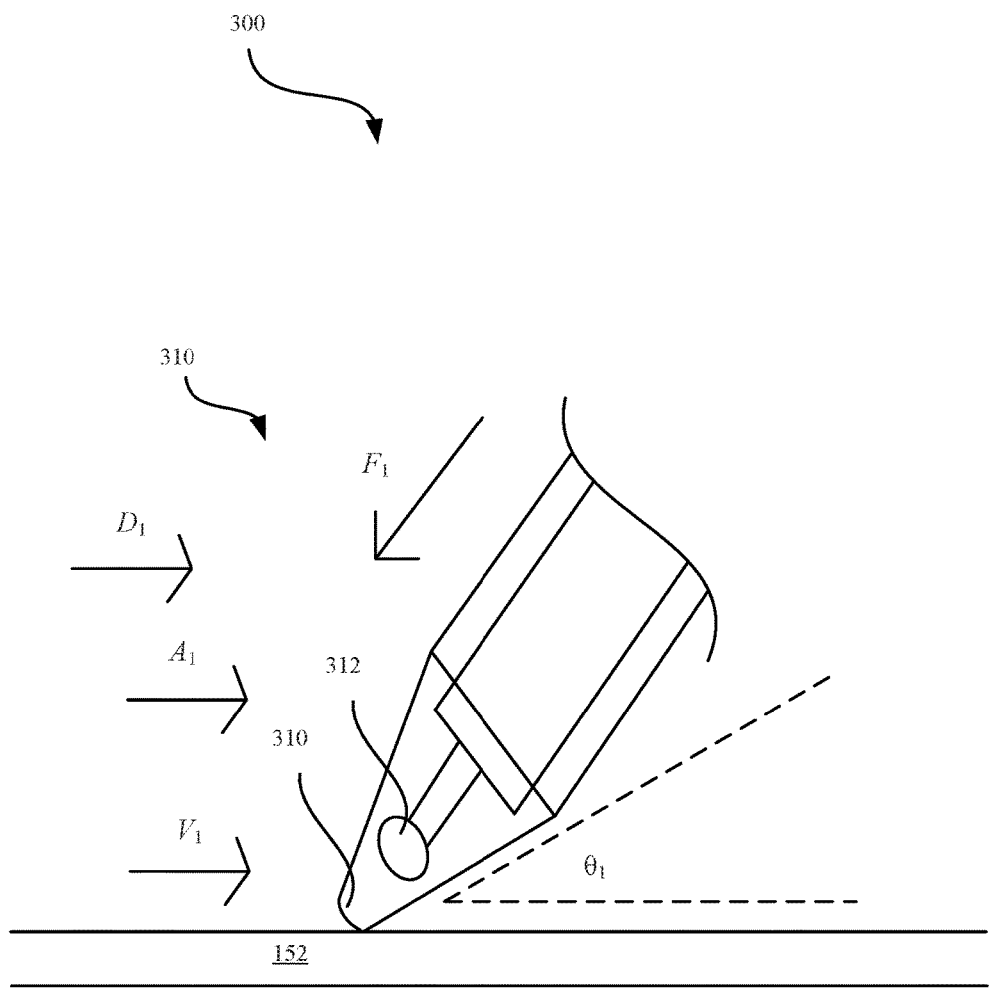
FIG. 3 illustrates an exemplary diagram of using a touch sensitive device in conjunction with an electronic device, in accordance with some embodiments.

FIG. 3 illustrates an exemplary diagram of using a touch sensitive device 300 in conjunction with the electronic device 150, in accordance with some embodiments as shown in FIG. 1. FIG. 3 illustrates that when the conductive tip 310 of the touch sensitive device 300 makes contact with the touch screen panel 152 of the electronic device 150, the conductive electrode 312 of the touch sensitive device 300 is configured to detect a change in capacitance that corresponds to a motion parameter. The motion parameter can also be referred to as a contact parameter. A contact parameter can be derived by the controller 230 from the change in capacitance, where the contact parameter can refer to at least one of a distance ($D_1$) traveled by the conductive tip 310, acceleration ($A_1$) of the conductive tip 310, velocity ($V_1$) of the conductive tip 310, force ($F_1$) applied by the conductive tip 310 against the touch screen panel 152, and an angle ($\theta_1$) between the conductive tip 310 and the touch screen panel 152. FIG. 3 illustrates an exemplary diagram during Time 1 ($t_1$) of the conductive tip 310 of the touch sensitive device 300 in contact with the touch screen panel 152 of the electronic device 150. In conjunction with the contact, the conductive electrode 312 is configured to determine a capacitive change in electrical current that corresponds to an amount of distance ($D_1$) traveled by the conductive tip 310 between a starting time ($t_0$) and $t_1$, in accordance with one example. The conductive electrode 312 can be configured to monitor an amount of distance traveled by the conductive tip 310 by tracking a change in a first position corresponding to $t_0$ and a second position corresponding to $t_1$. The conductive electrode 312 can be configured to generate an electrical current in conjunction with the capacitive change. Accordingly, the electrical current can be transmitted to the capacitive sensor 214 to be converted to an electrical signal that indicates the capacitive change.

FIG. 3 further shows that the conductive electrode 312 can determine a change in capacitance that corresponds to an amount of force ($F_1$) that is exerted by the conductive tip 310 against the touch screen panel 152. Additionally, the conductive electrode 312 can be configured to utilize the change in capacitance to determine whether the conductive tip 310 makes contact with the touch screen panel 152 to create an electrical pathway, when the conductive tip 310 changes position on the touch screen panel 152, and when the conductive tip 310 breaks contact from the touch screen panel 152 to sever the electrical pathway.

In some embodiments, based upon the detected change in capacitance, the haptic feedback component 140 can be configured to generate haptic feedback that resembles resistance that opposites the direction, force, or moment of the mass 250 of the touch sensitive device 110. For example, the controller 230 can be configured to execute instructions to cause the haptic feedback component 140 to oppose the direction, distance, or force of the touch sensitive device 110. In one example, the controller 230 can cause the controller 230 to activate the haptic feedback component 140, a servo motor, or a piezo motor to cause the mass 250 to oscillate in a direction that opposes the direction, distance, or force of the touch sensitive device 110 if the controller 230 has received instructions to cause the touch sensitive device 110 to simulate the sensation that it is a weighted device. In some examples, the controller 230 can receive instructions from the electronic device 150 that can cause the controller 230 to exaggerate the amount of haptic feedback generated if the touch sensitive device 110 is to simulate the perception that the touch sensitive device 110 is a heavy, wood paint brush in contrast to a light, plastic pencil. In this manner, the controller 230 can artificially increase the opposing moment imparted by the mass 250 of the touch sensitive device 110 to compensate for the simulation that the touch sensitive device 110 is a variety of different writing objects.

In some examples, the haptic feedback component 140 can generate an increased amount of opposing moment when the controller 230 receives instructions from the electronic device 150 that the digital medium displayed by the electronic device 150 is wood in contrast to paper. For example, wood is characterized as having a larger coefficient of friction than paper. Thus, drawing on wood may be characteristically more difficult to draw on than paper. By utilizing the controller 230 to generate different amounts of haptic feedback based upon the type of medium to be drawn on, the touch sensitive device 110 can enhance the user's experience by providing an enhanced sense of realism.

Figure 4A:
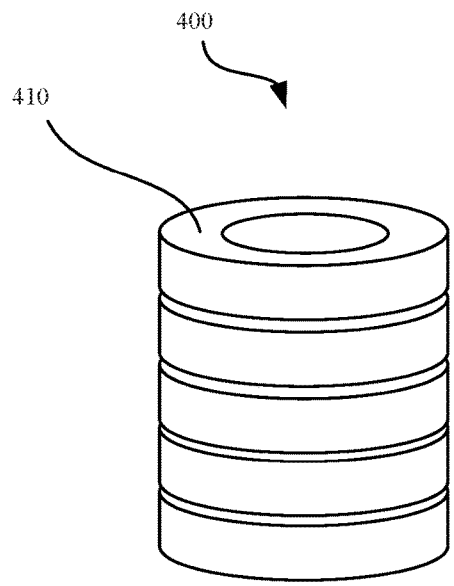
FIGS. 4A-4B illustrate views of a piezoelectric element, in accordance with some embodiments.
Figure 4B:
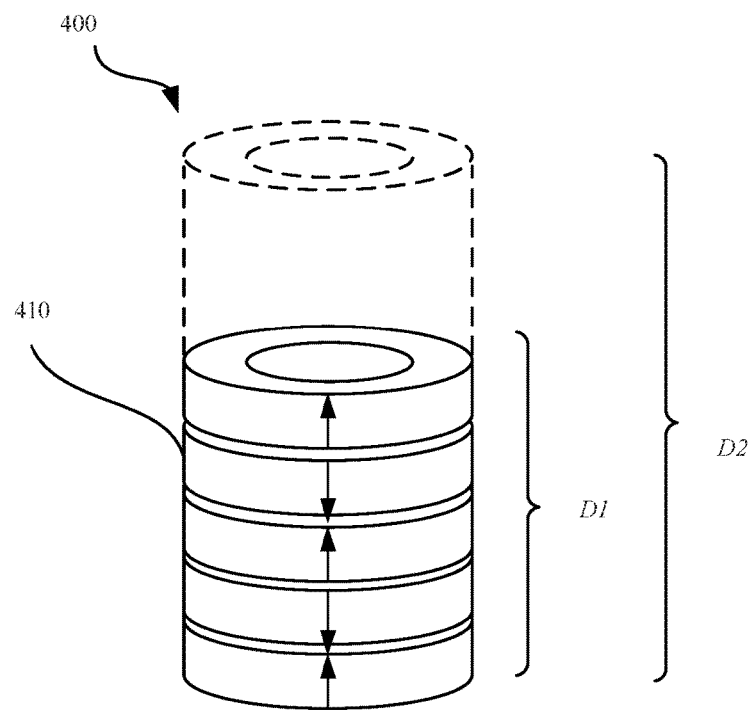

FIGS. 4A-4B illustrate views of a piezoelectric element 400 that corresponds to the piezoelectric element 222 of FIGS. 2A-2D, in accordance with some embodiments. FIG. 4A illustrates a perspective view of the piezoelectric element 400 in conjunction with the non-actuation mode of the axial haptic feedback component 240 of FIGS. 2A-2D. Each piezoelectric element 400 includes a piezoelectric disc 410. In some embodiments, the piezoelectric element 400 includes piezoelectric discs 410 arranged in a stacked configuration as shown in FIGS. 4A-4B. Each piezoelectric disc 410 can range in size, e.g., between about 0.5 millimeters to about 1 millimeters. By stacking the piezoelectric discs 410 in a stacked configuration, the displacement of the mass 250 can be amplified. Where a plurality of piezoelectric discs 410 are stacked together, an input voltage can be utilized to displace or push each individual piezoelectric disc 410 to ultimately push against the spring 220. For example, a single axial haptic feedback component 240 that includes two piezoelectric discs 410 that can result in twice the displacement of the mass 250 as compared to a single axial haptic feedback component 240 that includes a single piezoelectric disc 410. In this manner, increasing the displacement range of the mass 250 can increase the amount of haptic feedback that is sensed by the user. In some examples, each piezoelectric disc 410 can be configured to displace between e.g., about 10 micrometers to a maximum range of about 1 millimeter.

As shown in FIG. 4A, a distal end or surface of the piezoelectric disc 410 is coupled to a force concentrator that is coupled to the spring 220. The force concentrator can be configured to concentrate the amount of force generated by displacement of the piezoelectric element 400 towards the mass 230.

FIG. 4A illustrates that the piezoelectric disc 410 is substantially circular shaped. In this manner, the piezoelectric disc 410 can be more efficiently stacked into the internal cavity of the elongated housing 202. Although the piezoelectric disc 410 is illustrated as having a substantially circular shape, the piezoelectric element 400 can also be characterized as having a rectangular, square, elliptical, or other regular or irregular shape.

In some embodiments, the piezoelectric disc 410 can be referred to as a unimorph actuator. For example, a unimorph piezoelectric disc 410 can be manufactured from an electrically active ceramic material and a non-electrically active (i.e., passive) substrate material. In some embodiments, the amount of mechanical force that is generated by the piezoelectric disc 410 is proportional to the cross-sectional area of the piezoelectric disc 410. For example, where input voltage is constant, by increasing the cross-sectional area of the piezoelectric disc 410, a larger amount of mechanical force can be generated. The piezoelectric disc 410 can be characterized according to a piezoelectric coefficient, which refers to the efficiency of the piezoelectric disc 410 in converting electrical energy into mechanical energy.

FIG. 4B illustrates a cross-sectional view of a piezoelectric element 400 in conjunction with operation of the axial haptic feedback component 240 in the actuation mode, in accordance with some embodiments. FIG. 4B shows that in response to receiving the input voltage, the piezoelectric element 400 is configured to oscillate by contracting/expanding. FIG. 4B shows the length (D2) of the expanded stack of piezoelectric elements 400 in conjunction with the actuated mode compared to the length (D1) of the stack of piezoelectric elements 400 in conjunction with the non-actuated mode.

In some embodiments, the piezoelectric disc 410 is configured to contract in an axial direction (e.g., up/down) based upon a polarity of the input voltage. For example, FIG. 4B illustrates that a positive voltage that is applied to the piezoelectric element 400 causes the piezoelectric element 400 to displace in a first direction (e.g., up), while a negative voltage that is applied to the piezoelectric element 400 can cause the piezoelectric element 400 to displace in a second direction (e.g., down) that is opposite the first direction.

Figure 5A:
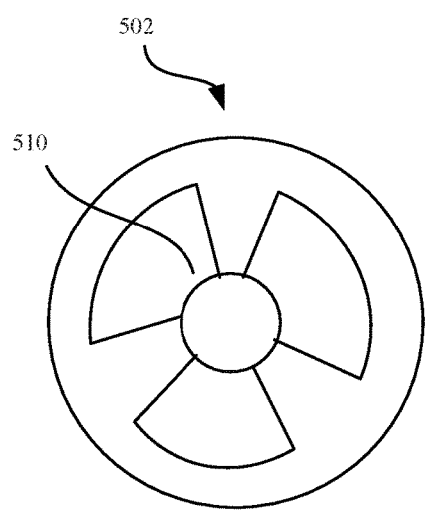
FIGS. 5A-5D illustrate views of a piezoelectric element that can be implemented in the axial haptic feedback component, in accordance with various embodiments.

FIGS. 5A-5D illustrate various embodiments of a piezoelectric element that can implemented in the axial haptic feedback component 240 described herein, in accordance with some embodiments. FIG. 5A illustrates a top view of a piezoelectric element 502 that includes a piezoelectric portion 510, according to some embodiments. The piezoelectric portion 510 is arranged in a tri-foil configuration. In this tri-foil configuration, the piezoelectric element 500 is configured to generate greater amount of displacement of the mass 250 as compared to the concentric configuration of the piezoelectric element 400, as shown in FIGS. 4A-4B.

Figure 5B:
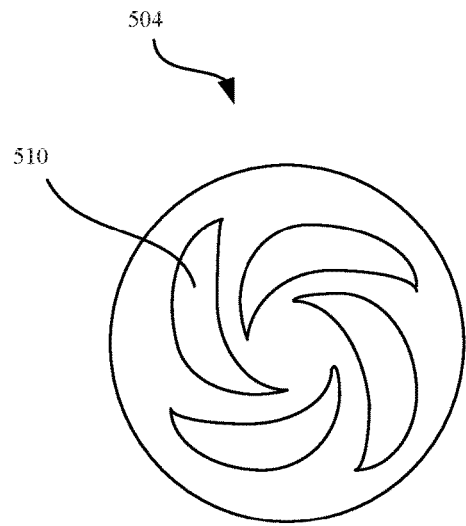

FIG. 5B illustrates a top view of a piezoelectric element 504 that includes a piezoelectric portion 510 in a crescent configuration shape, according to some embodiments. In this crescent configuration, the piezoelectric element 500 is configured to generate greater displacement of the mass 250 as compared to the concentric configuration of the piezoelectric element 400, as shown in FIGS. 4A-4B.

Figure 5C:
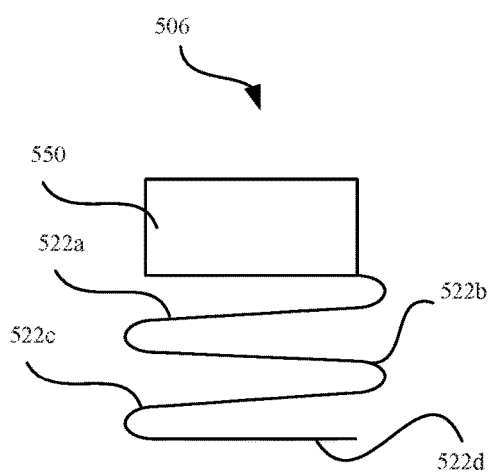

FIG. 5C illustrates a cross-sectional view of a piezoelectric element 506 that includes a plurality of flexible piezoelectric members 522a-d that are coupled to each other to form a spiral or accordion-like shape, according to some embodiments. Each flexible piezoelectric member 522a-d is foldable and flexible. In conjunction with receiving an input voltage and operating the axial haptic feedback component 240 in the actuation mode, each flexible piezoelectric member 522a-d is configured to further bend or unbend such that the piezoelectric element 500 is configured to fold (i.e., contract) or unfold (i.e., expand). A mass 550 is coupled to a surface of the flexible piezoelectric member 522a such that oscillation of the plurality of flexible piezoelectric members 522a-d causes the mass 550 to oscillate in a corresponding direction.

Figure 5D:
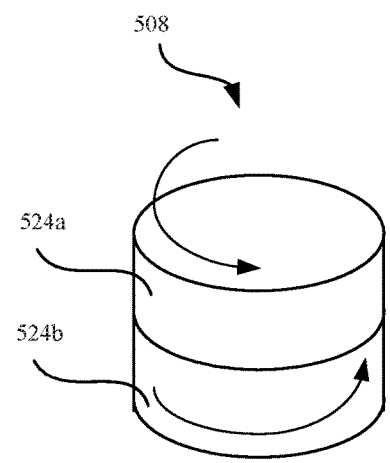

FIG. 5D illustrates a perspective view of a piezoelectric element 508 that is characterized by a plurality of piezoelectric members 524a, 524b, according to some embodiments. Each piezoelectric member 524a, 524b includes an internal eccentric mass (not illustrated). As shown in FIG. 5D, each piezoelectric member 524a, 524b is substantially circular shaped. During the non-actuation mode (i.e., out-of-phase), the piezoelectric electric members 524a, 524b are aligned in opposing directions. Subsequently, during the actuation mode (i.e., in-phase), both the piezoelectric electric members 524a, 524b are aligned along substantially the same direction causing the eccentric mass to oscillate.

Figure 6B:
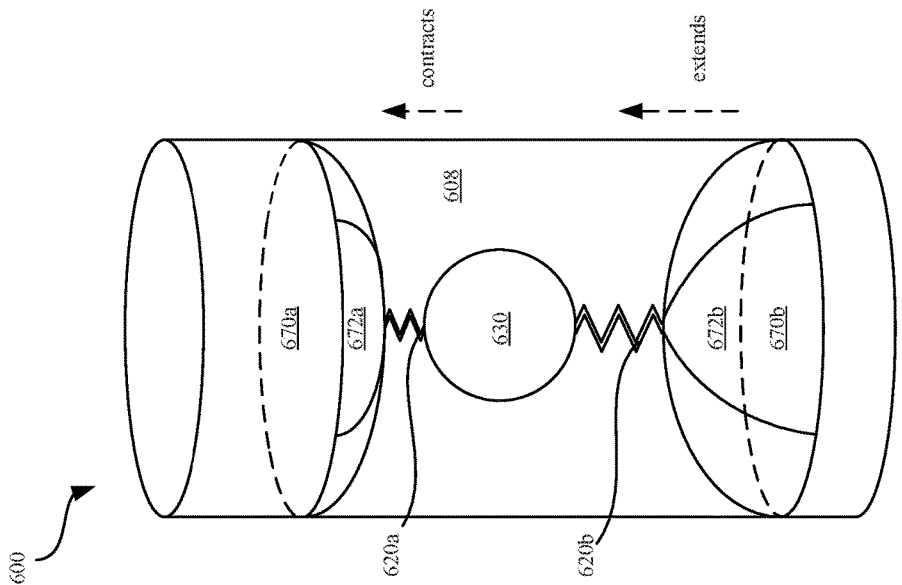
FIGS. 6A-6B illustrate perspective views of a haptic feedback component that can be implemented in the touch sensitive device, in accordance with some embodiments.
Figure 6A:
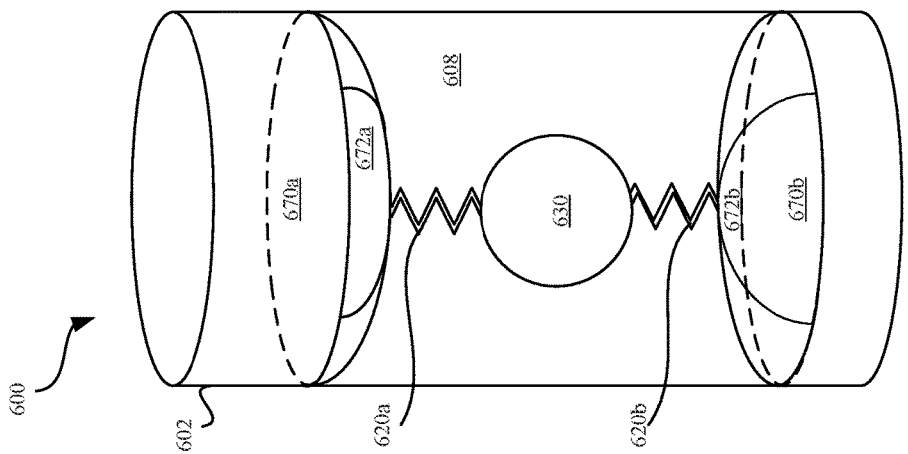

FIGS. 6A-6B illustrate perspective views of an axial haptic feedback component 600 that can be implemented in the touch sensitive device 200, as shown in FIGS. 2A-2D. FIG. 6A illustrates an axial haptic feedback component 600 in conjunction with the non-actuation mode, while FIG. 6B illustrates the axial haptic feedback component 600 in conjunction with the actuation mode. As shown in FIG. 6A, the haptic feedback component 600 includes an elongated housing 602 having an internal cavity 608. The haptic feedback component 600 includes a first piezoelectric element 670a and a second piezoelectric element 670b. A mass 630 is positioned between the first and second piezoelectric elements 670a, 670b, where the mass 630 is coupled to the first and second piezoelectric elements 670a, 670b via coiled elements 620a, 620b, respectively. The first piezoelectric element 670a includes a first dome element 672a and the second piezoelectric element 670b includes a second dome element 672b. In some embodiments, each of the first and second dome elements 672a, 672b can be characterized as having a cone shape.

FIG. 6B illustrates the actuation mode of the axial haptic feedback component 600, in accordance with some embodiments. In response to receiving an input voltage, the first and second piezoelectric elements 670a, 670b displace in opposing directions. For example, FIG. 6B illustrates that the second dome element 672b extends so as to cause the coiled element 620b to also extend to displace the mass 630, while the first dome element 672a contracts so as to cause the coiled element 620a to contract. Accordingly, the mass 630 oscillates in a substantially axial direction in response to the first and second piezoelectric elements 670a, 670b receiving the input voltage.

FIGS. 7A-7B illustrate perspective views of a haptic feedback component 700 that can be implemented in the touch sensitive device 200, as shown in FIGS. 2A-2D. FIG. 7A illustrates the haptic feedback component 700 in conjunction with the non-actuation mode, while FIG. 7B illustrates the haptic feedback component 700 in conjunction with the actuation mode. As shown in FIG. 7A, the haptic feedback component 700 includes a piezoelectric element 770 that is coupled to a substrate 784, where the haptic feedback component 700 is included within an internal cavity 708 of an elongated housing 702 of the haptic feedback component 700. In response to receiving an input voltage, the piezoelectric element 770 can be configured to expand in a substantially outward direction, whereupon the substrate 784 stretches as well. In some examples, the substrate 784 is made from flexible material that can stretch or recede in accordance with the oscillation of the piezoelectric element 770. In some embodiments, the substrate 784 includes a plurality of contacts 786 that are positioned along a periphery of the substrate 784. Each of the plurality of contacts 786 are a weighted mass that be comprised of tungsten or steel.

As shown in FIG. 7B, in conjunction with the haptic feedback component 700 operating in the actuation mode, the piezoelectric element 770 is configured to expand in a substantially outward direction. In some embodiments, the substrate 784 of the haptic feedback component 700 is positioned adjacent to an inner surface of the elongated housing 702. During the actuation mode, each of the plurality of contacts 786 can be configured to displace along direction (a) to contact the inner surface of the elongated housing 702 resulting in a tapping effect. In some examples, at least one of the duration of the tapping effect, the force generated by the tapping effect, or the speed associated with the tapping effect can be based upon the amplitude of the input voltage that is received.

In some embodiments, the piezoelectric element 770 is coupled to a rotating mechanism 750. The rotating mechanism 750 is configured to impart moment along direction (θ) on the contacts 786 in a plurality of different directions. The rotating mechanism 750 is configured to cause the contacts 786 to displace according to a plurality of angles/directions/dimensions. In some embodiments, the piezoelectric element 770 is coupled to a servo motor or piezoelectric motor that is configured to displace the piezoelectric element 770 according to an axial direction (z).

Figure 8C:
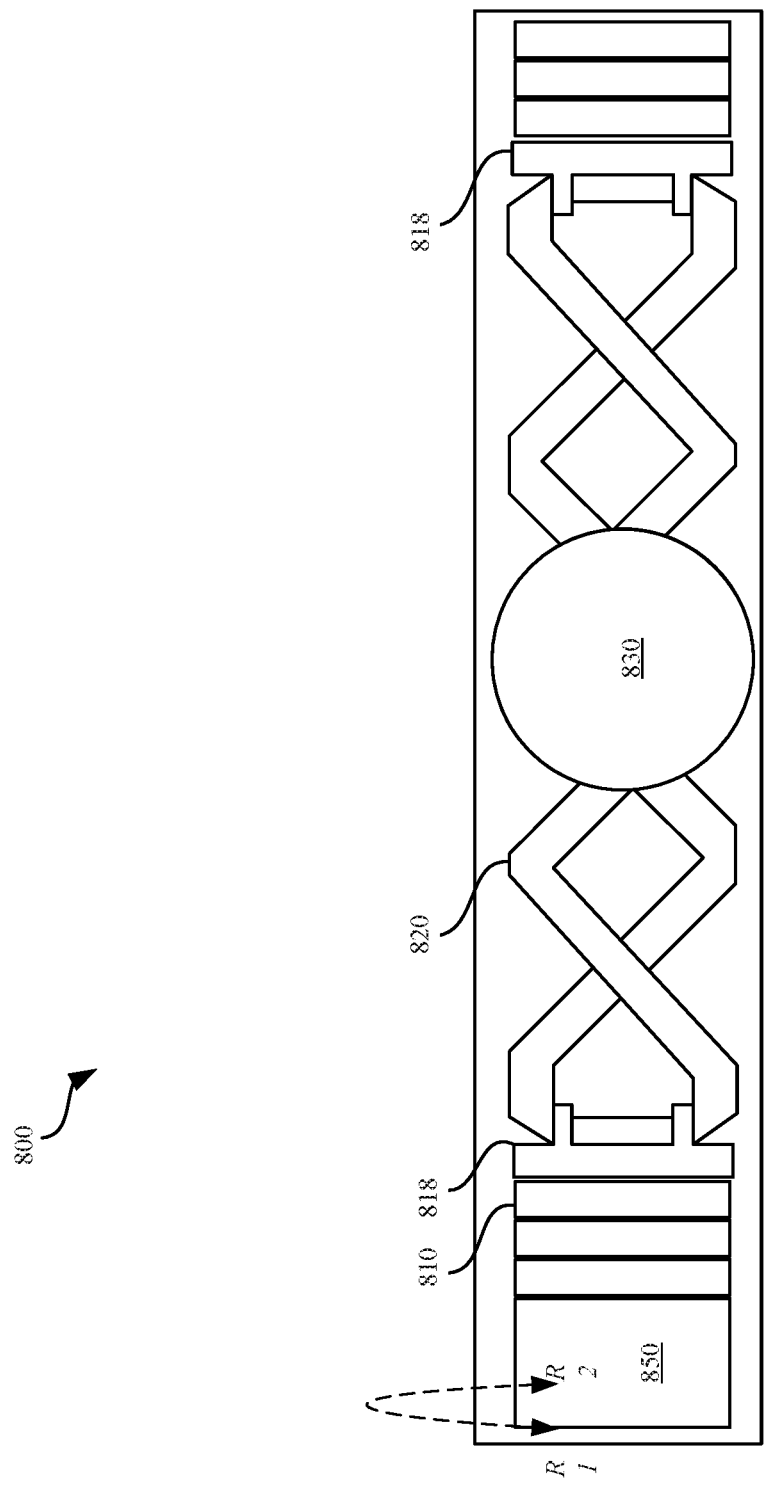

FIGS. 8A-8E illustrate cross-sectional views of various embodiments of the haptic feedback component that can be implemented in the touch sensitive device, in accordance with some embodiments. FIGS. 8A-8B illustrate cross-sectional views of the axial haptic feedback component 800 that can be implemented in the touch sensitive device 200, as shown in FIGS. 2A-2D. FIG. 8A illustrates the axial haptic feedback component 800 in conjunction with the non-actuation mode. The axial haptic feedback component 800 includes one or more piezoelectric discs 810 that are arranged in a stack. The stack of piezoelectric discs 810 are coupled to a force concentrator 818 that is coupled to a spring 820 and a mass 830. The force concentrator 818 can be configured to concentrate the amount of force generated by the piezoelectric discs 810 towards the mass 830. The stacked configuration can amplify the amount of the displacement of the mass 830 where all other factors (e.g., input voltage) remain constant. The piezoelectric discs 810 are configured to provide a displacement input for the mass 830. Furthermore, coupling the mass 830 directly to the spring 820 can amplify the amount of displacement of the mass 830 when compared to directly mounting the mass 830 to a surface a piezoelectric disc 810. In this manner, increasing the displacement range of the mass 830 can increase the amount of haptic feedback that is perceived by the user. Furthermore, the piezoelectric discs 810 can be preloaded.

FIG. 8B shows the axial haptic feedback component 800 operating in the actuation mode. As shown in FIG. 8B, in response to the stack of piezoelectric discs 810 receiving the input voltage, the stack of piezoelectric discs 810 are configured to oscillate. As a result, a sufficiently large piezoelectric coefficient is generated to produce a predetermined strain on the stack of piezoelectric discs 810.

FIG. 8C shows the axial haptic feedback component 800 of FIGS. 8A-8B in conjunction with the non-actuation mode, and the axial haptic feedback component 800 including a rotating mechanism 850. A proximal end of a piezoelectric disc 810 is coupled to the rotating mechanism 850. In some embodiments, the rotating mechanism 850 is configured to rotate in a substantially circular orientation relative to a neutral axis (N) of the axial haptic feedback component 800. In some embodiments, the rotating mechanism 850 is configured to rotate in a bi-directional manner $R_1$ and $R_2$ (i.e., clockwise and counter-clockwise). As the rotating mechanism 850 is coupled to the piezoelectric disc 810, the rotating mechanism 850 is configured to also cause the piezoelectric discs 810, spring 820, and mass 830 to rotate in an orientation similar to the rotating mechanism 850. Moreover, the rotating mechanism 650 is configured to appropriately adjust the position of the piezoelectric elements 810, spring 820, and mass 830 in order to appropriately bias the mass 840. In some embodiments, the rotating mechanism 850 is configured to actively change the momentum that is imparted to the mass 830. In addition, the rotating mechanism 850 is configured to impart moment on the mass 830 in a plurality of different directions and the rotating mechanism 850 is configured to cause the mass 830 to displace according to a plurality of angles/directions/dimensions.

FIGS. 8D-8E illustrates a cross-sectional view of a plurality of axial haptic feedback components 800 that are aligned parallel to each other and correspond to the touch sensitive device 200 of FIG. 2C, in accordance with some embodiments. FIG. 8D shows a cross-sectional view of the plurality of axial haptic feedback components 800 in the non-actuation mode. As shown in FIG. 8E, each of the piezoelectric discs 810, spring 820, and a first mass 830a and a second mass 830b of the axial haptic feedback components 800 are configured to extend in at least one of an axial direction or contract in an axial direction.

Figure 9:
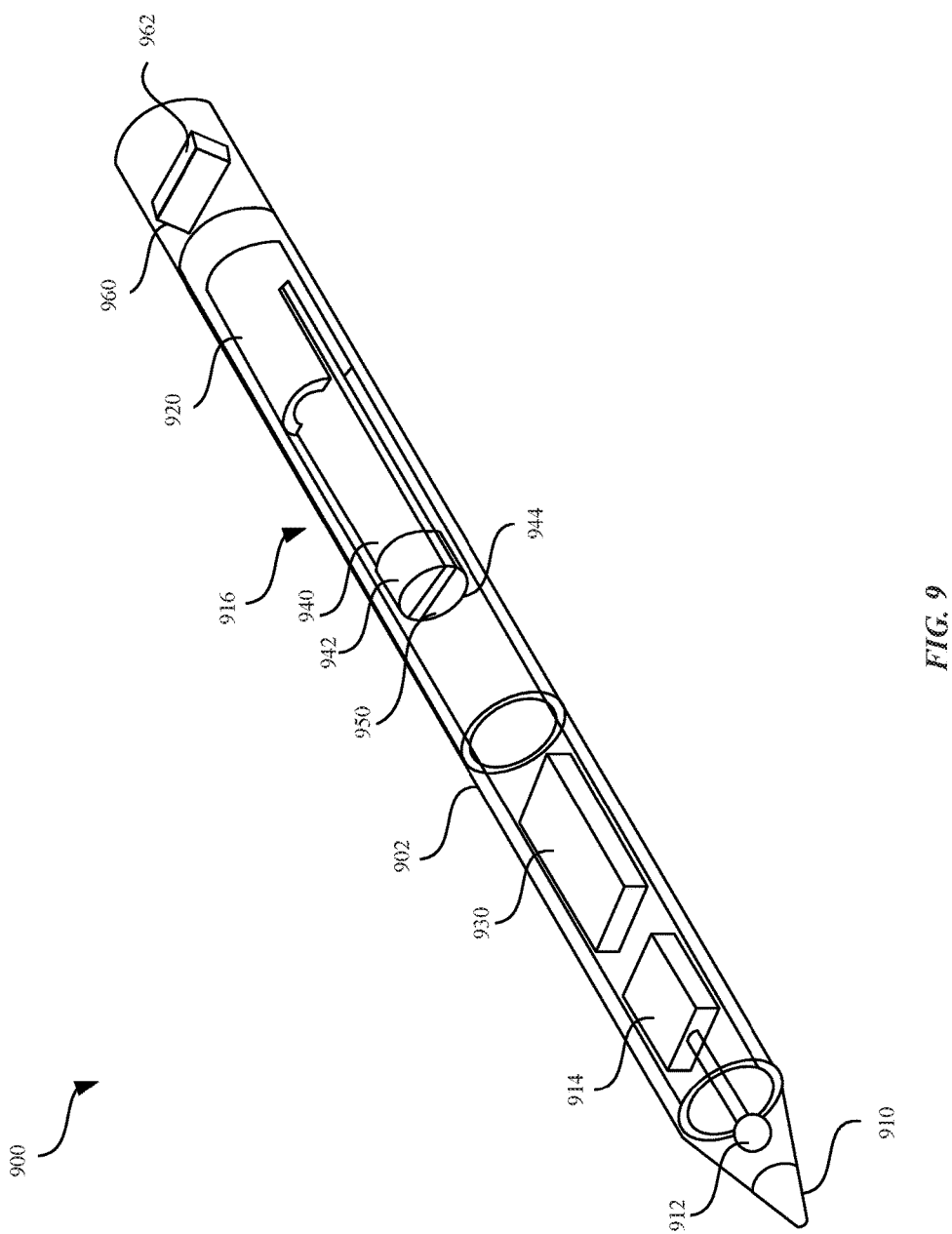
FIG. 9 illustrates a perspective view of a touch sensitive device that can generate haptic feedback, in accordance with some embodiments.

FIG. 9 illustrates a perspective view of a touch sensitive device 900 that can be implemented in the system 100, as shown in FIG. 1. FIG. 9 illustrates that the touch sensitive device 900 includes a cantilever haptic feedback component 916. The touch sensitive device 900 includes a conductive tip 910 that is substantially pointed in order to provide precise mechanical input to the touch screen panel 152 of the electronic device 150. The conductive tip 910 can correspond to any number of shapes, including round, blunt, and the like. In some embodiments, the conductive tip 910 can be configured to form a conductive pathway with electrodes of conductive sensors of the touch screen panel 152. In such a configuration, the conductive tip 910 can be formed of material having electrically conductive properties, such as copper, aluminum, and the like. The conductive tip 910 is coupled to the elongated body 902 that has walls. In some embodiments, the elongated body 902 can be formed of material characterized as being an electrical insulating material, such as rubber, plastic, synthetic polymers, and the like. In this manner, the conductive tip 910 can be electrically isolated from the elongated body 902 of the touch sensitive device 900 to prevent the user's fingers from acting as a ground for the conductive tip 910.

FIG. 9 illustrates that the touch sensitive device 900 includes an elongated body 902 that includes an interior cavity 908. In some embodiments, the cantilever haptic feedback component 916 includes a rigid mount 920, a piezoelectric flexible beam 940, and a mass 950. The mass 950 can include a first portion 942 and a second portion 944. The amount by which the piezoelectric flexible beam 940 displaces can be proportional to an amount of input voltage that is received. In some embodiments, the mass 950 can amplify the displacement of the piezoelectric flexible beam 940. In some examples, the piezoelectric flexible beam 940 can be configured to displace up to a maximum range of 4 millimeters.

In some embodiments, the touch sensitive device 900 includes a conductive electrode 912 that is electrically coupled to the conductive tip 910. The conductive electrode 912 is electrically coupled to a capacitive sensor 914 that is configured to detect a change in capacitance in conjunction with contact between the conductive tip 910 and the electrodes of the conductive sensors of the touch screen panel 152. The conductive electrode 912 is configured to detect a mechanical input (e.g., physical contact) that is applied by the conductive tip 910 against the touch screen panel 152 by generating an electrical current that corresponds to the amount of mechanical input. The conductive electrode 912 transmits the electrical current to a capacitive sensor 914. The capacitive sensor 914 is configured to convert the electrical current into an electrical signal that is proportional to the amount of the electric current. In some examples, the electrical signal can refer to an alternating current (A/C) or a direct current (D/C) signal. Subsequently, the electrical signal can be transmitted to a controller 930. The controller 930 can be configured to generate a contact parameter based upon the electrical signal.

Although FIG. 9 illustrates that the touch sensitive device 900 includes a single conductive electrode 912, the touch sensitive device 900 can include a plurality of conductive electrodes 912.

In some embodiments, the elongated body 902 can be comprised of material to simulate a skin shearing effect. In response to displacement of the mass 950, areas of the elongated body 902 that are adjacent to the cantilever haptic feedback component 916 can be comprised of material that can bend, elongate, or extend to coincide with the moment of the mass 950. For example, if the mass 950 rotates in a pitch rotation, the contact between the mass 950 and an inner surface of the elongated body 902 can cause the material of the elongated body 902 to bend.

In some embodiments, the touch sensitive device 900 includes a power supply 960 that is configured to supply energy to the controller 930 and to the cantilever haptic feedback component 916. In some examples, the power supply 960 is a rechargeable battery that is electrically coupled to a charging port 962. In some embodiments, the controller 930 generates a haptic feedback parameter to specify an amount of input voltage to be generated from the power supply 960 and to be provided to the piezoelectric flexible beam 940. The amount by which the piezoelectric flexible beam 940 and mass 950 are displaced by the input voltage can be proportional to the amount of input voltage that is provided.

In other embodiments, the cantilever haptic feedback component 916 can be configured to generate haptic feedback in the absence of a power supply 960. In one example, shaking the touch sensitive device 900 with sufficient force can cause the mass 950 and the piezoelectric flexible beam 940 to mechanically displace resulting in haptic feedback that is perceived by the user. In another example, the mass 950 and the piezoelectric flexible beam 940 can mechanically displace in the absence of an input voltage.

Figure 10A:
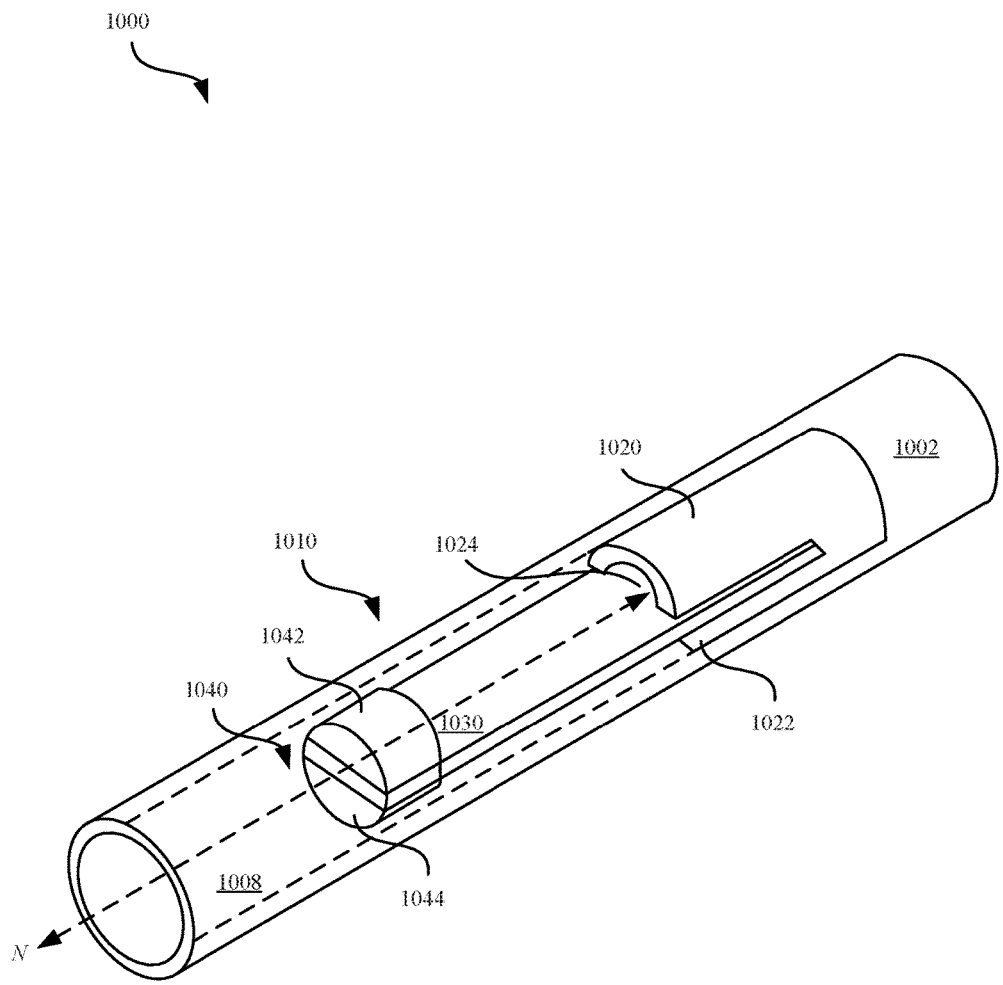

FIGS. 10A-10G illustrate perspective views of various embodiments of a touch sensitive device 1000 that includes a cantilever haptic feedback component 1010, in accordance with some embodiments. FIG. 10A illustrates that the touch sensitive device 1000 includes a cantilever haptic feedback component 1010. The cantilever haptic feedback component 1010 can be positioned along any position of the length of the elongated body 1002 that is sufficient to permit the cantilever haptic feedback component 1010 to provide localized feedback.

FIG. 10A shows that the cantilever haptic feedback component 1010 includes a rigid mount 1020, a piezoelectric flexible beam 1030, and a mass 1040 that is coupled to a distal end of the piezoelectric flexible beam 1030. The rigid mount 1020 securely fixes the proximal end of the cantilever haptic feedback component 1010 to the elongated body 1002 via a securing component 1022. In some examples, the securing component 1022 securely couples the proximal end of the cantilever haptic feedback component 1010 to the wall(s) of the elongated body 1002. In this manner, the cantilever haptic feedback component 1010 stays secured to the elongated body 1002 during usage of the touch sensitive device 1000.

FIG. 10A shows that a portion of a proximal end of the piezoelectric flexible beam 1030 extends through a recess or opening 1024 in the rigid mount 1020 and can be coupled to the securing component 1022. The rigid mount 1020 can be characterized as a cylindrical tube. In some embodiments, the proximal end of the piezoelectric flexible beam 1030 can be coupled to the securing component 1022. In some embodiments, the proximal end of the piezoelectric flexible beam 1030 is mounted to an inner surface of the rigid mount 1020.

Additionally, the piezoelectric flexible beam 1030 extends along the longitudinal length of the elongated body 1002, in accordance with some embodiments. The piezoelectric flexible beam 1030 can be characterized as having a neutral axis (N) that extends longitudinally along the length of the elongated body 1002. As shown in FIG. 10A, the mass 1040 can include a first portion 1042 and a second portion 1044. In some examples, the mass 1040 is tungsten or steel. The piezoelectric flexible beam 1030 is configured to pass between a lower surface of the first portion 1042 and an upper surface of the second portion 1044 so that the distal end of the piezoelectric flexible beam 1030 extends between the first portion 1042 and the second portion 1044. In some embodiments, the piezoelectric flexible beam 1030 can be secured to the mass 1040/rigid mount 1020 by use of an adhesive, screws, or other attachment means. In some embodiments, the piezoelectric flexible beam 1030 can be machined from the rigid mount 1020.

In some embodiments, the piezoelectric flexible beam 1030 can refer to a bimorph piezoelectric cantilever beam. The term "bimorph" can refer to the piezoelectric flexible beam 1030 having two active layers. In some embodiments, the bimorph piezoelectric cantilever beam can include two active layers and a passive layer that is sandwiched between the two active layers. In response to receiving an electrical signal, a first active layer of the piezoelectric flexible beam 1030 expands while a second active layer of the piezoelectric flexible beam 1030 contracts, as described in more detail with reference to FIG. 12.

In other embodiments, the piezoelectric flexible beam 1030 can refer to a unimorph piezoelectric cantilever beam. The term "unimorph" can refer to the piezoelectric flexible beam 1030 having an active layer and a passive layer.

Figure 10B:
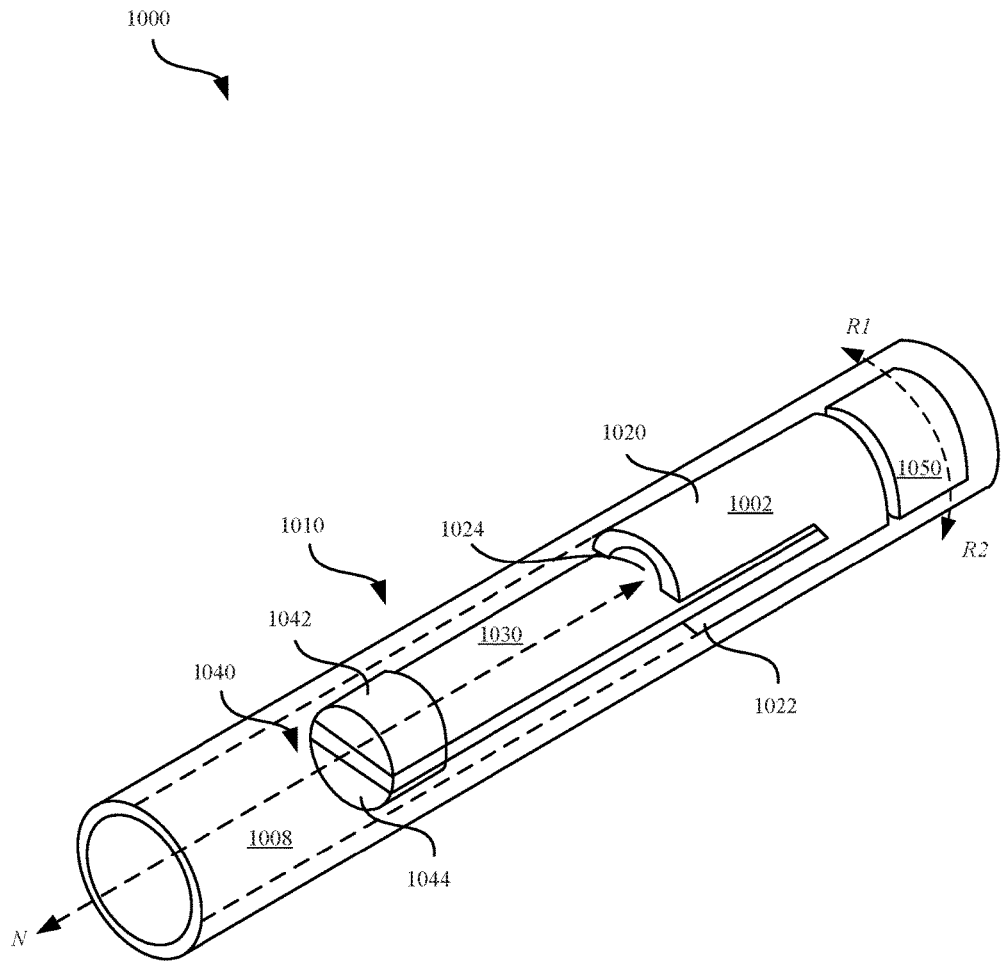

FIG. 10B illustrates that the elongated body 1002 of the touch sensitive device 1000 that includes a cantilever haptic feedback component 1010 includes a rigid mount 1020, a piezoelectric flexible beam 1030, and a mass 1040 that is coupled to a distal end of the piezoelectric flexible beam 1030. The cantilever haptic feedback component 1010 further includes a rotating mechanism 1050. In some embodiments, a proximal end of the rigid mount 1020 is coupled to a distal end of the rotating mechanism 1050. In some embodiments, the rotating mechanism 1050 is configured to rotate in a substantially circular orientation relative to a neutral axis (N) of the piezoelectric flexible beam 1030. In some embodiments, the rotating mechanism 1050 is configured to rotate in a bi-directional manner (R1, R2) (i.e., clockwise and counter-clockwise). As the rotating mechanism 1050 is coupled to the rigid mount 1020, the rotating mechanism 1050 is configured to cause the piezoelectric flexible beam 1030 and the mass 1040 to rotate in an orientation that is similar to the orientation of the rotating mechanism 1050. In this configuration, the rotating mechanism 1050 is configured to provide enhanced levels of feedback to a user while using the touch sensitive device 1000. For example, if the touch sensitive device 1000 is manipulated according to at least one of the 6-degrees of freedom (DOF), including forward/back, up/down, left/right, pitch, yaw, or roll, the rotating mechanism 1050 is configured to adjust the position of the piezoelectric flexible beam 1030 and mass 1040 in order to bias the mass 1040 according to the changed position. In some embodiments, the rotating mechanism 1050 is configured to actively change the moment that is imparted to the mass 1040. In addition, the rotating mechanism 1050 can impart moment on the mass 1040 in a plurality of different directions or dimensions.

In some embodiments, the mass 1040 is biased in a certain orientation/position within the interior cavity 1008 of the elongated body 1002 by nature of the cantilever design of the piezoelectric flexible beam 1060. Accordingly, the rotating mechanism 1050 is configured to rotate the mass 1040 in order maintain the appropriate amount of bias by the mass 1040 regardless of the orientation of the touch sensitive device 1000. The weight of the mass 1040 is actively biased by the rotating mechanism 1050 so that there are no unbalanced forces that are produced by the mass 1040. In this manner, the rotating mechanism 1050 can shift the weight distribution produced by the mass 1040 to continually provide a balanced weight distribution.

Figure 10C:
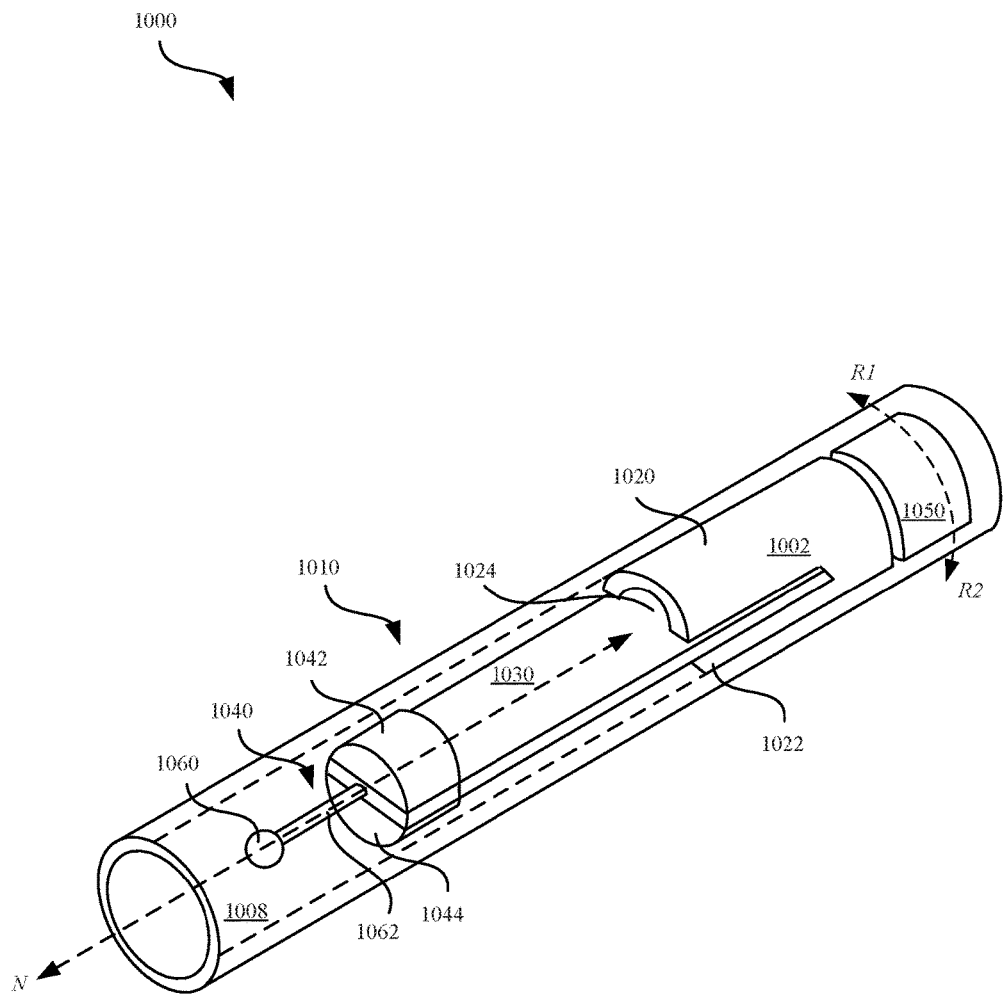

FIG. 10C illustrates the touch sensitive device 1000 includes a cantilever haptic feedback component 1010 that includes a tip electrode 1060, in accordance with some embodiments. The tip electrode 1060 is coupled to a distal end of the mass 1040 via a shaft 1062. By positioning the tip electrode 1060 at the distal end of the cantilever haptic feedback component 1010, the tip electrode 1060 can provide supplemental detection of the orientation of the touch sensitive device 1000. In some embodiments, the tip electrode 1060 can include a magnetic element and a position sensor (e.g., accelerometer, gyroscope) that is provided in the tip electrode 1060. In some embodiments, the tip electrode 1060 can include the position sensor in order to determine the location and orientation of the mass 1040 relative to the elongated body 1002. In some embodiments, the tip electrode 1060 can be configured to interact with the conductive electrode 1012 and the capacitive sensor 914 of the touch sensitive device 900 to provide supplemental feedback.

Figure 10D:
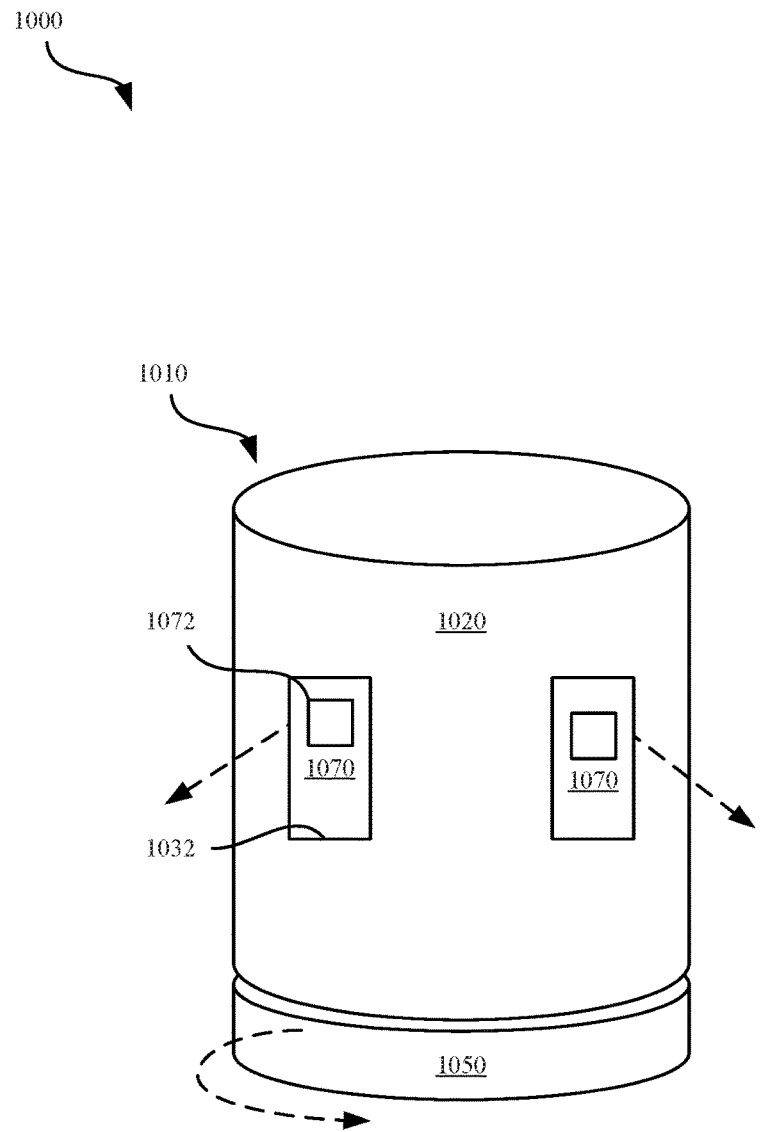

FIG. 10D illustrates the touch sensitive device 1000 includes a cantilever haptic feedback component 1010, in accordance with some embodiments. As shown in FIG. 10D, the rigid mount 1020 of the cantilever haptic feedback component 1010 includes one or more piezoelectric elements 1070 that are positioned along an outer surface of the rigid mount 1020. In contrast to the cantilever haptic feedback component 910 shown in FIG. 9, the cantilever haptic feedback component 1010 does not include a piezoelectric flexible beam 940. Instead the cantilever haptic feedback component 1010 includes one or more piezoelectric elements 1070 that each include a mass 1072 coupled to the corresponding piezoelectric element 1070. In some embodiments, apertures 1032 can be machined through the rigid mount 1020 to form openings that have a shape and size that corresponds to the one or more piezoelectric elements 1070. In some examples, the rigid mount 1020 is formed from a single block of metal (e.g., aluminum). When the haptic feedback component 1010 receives an electrical signal, the one or more piezoelectric elements 1070 are configured to oscillate in an outward direction so that each of the one or more piezoelectric elements 1070 is configured to displace the mass 1072 in a direction that extends from an outer surface of the rigid mount 1020. In this configuration, the haptic feedback component 1010 can provide localized haptic feedback. In some embodiments, the cantilever haptic feedback component 1010 is coupled to a rotating mechanism 1050.

FIG. 10E illustrates a cantilever haptic feedback component 1010 of a touch sensitive device 1000, in accordance with some embodiments. As shown in FIG. 10E, the cantilever haptic feedback component 1010 includes a mass 1040 that is coupled to a pivot 1024 via shaft 1026, where the mass 1040 is configured to oscillate in an angular direction ($\theta$) relative to the pivot 1024 that is coupled to an elongated body 902. The mass 1040 includes a plurality of piezoelectric elements 1070*a-c* that can be arranged evenly about the periphery of the mass 1040. In some embodiments, each individual piezoelectric element 1070*a*, 1070*b*, or 1070*c* is configured to be independently actuated in response to receiving an electrical signal. For example, if only the piezoelectric element 1070*a* receives an electrical signal, then piezoelectric element 1070*a* actuates causing the mass 1040 adjacent to the piezoelectric element 1070*a* adjacent to the piezoelectric element 1070*a* to displace. Accordingly, individual actuation of each of the piezoelectric elements 1070*a*, 1070*b*, or 1070*c* can cause the mass 1040 to provide localized feedback. In addition, the pivot 1024 can impart moment on the mass 1040 in a plurality of different directions or dimensions. In some examples, the cantilever haptic feedback component 1010 is positioned adjacent to an inner surface of the elongated body 902 of the touch sensitive device 900 such that displacement of the one or more piezoelectric elements 1070*a-c* can cause the mass 1040 to contact the inner surface of the elongated body 902 resulting in a tapping effect. In some embodiments, the cantilever haptic feedback component 1010 can be characterized as a pendulum.

FIG. 10F illustrates a cantilever haptic feedback component 1010 of a touch sensitive device 1000, in accordance with some embodiments. As shown in FIG. 10F, the cantilever haptic feedback component 1010 includes a mass 1040 that is coupled to a pivot 1024 via shaft 1026. Along a surface of the shaft 1026 is one or more piezoelectric elements 1070. In conjunction with receiving the electrical signal, the piezoelectric element 1070 is configured to cause the mass 1040 to oscillate in a side-to-side manner direction ($\theta$) in accordance with the pivot 1024. In addition, the pivot 1024 can impart moment on the mass 1040 in a plurality of different directions or dimensions. In some examples, the cantilever haptic feedback component 1010 is positioned sufficiently adjacent to an inner surface of the elongated body 902 of the touch sensitive device 900 such that displacement of the piezoelectric element 1070 can cause the mass 1040 to contact the inner surface of the elongated body 902 resulting in a tapping effect. In some examples, at least one of the duration of the tapping effect, the force generated by the tapping effect, or the speed associated with the tapping effect can be based upon the amplitude of the electrical signal that is received.

FIG. 10G illustrates a cantilever haptic feedback component 1010 of a touch sensitive device 1000, in accordance with some embodiments. As shown in FIG. 10G, the cantilever haptic feedback component 1010 includes a mass 1040 that is coupled to an upper surface of a distal end of a shaft 1026. The shaft 1026 includes one or more piezoelectric elements 1070 that are configured to cause the mass 1040 to oscillate relative to a pivot 1024 according to angular direction ($\theta$). In some embodiments, the cantilever haptic feedback component 1010 can further include a rotating mechanism 1050 that is coupled to the pivot 1024. In addition, the rotating mechanism 1050 is configured to impart moment on the mass 1040 in a plurality of different directions (z). In some examples, the cantilever haptic feedback component 1010 is positioned sufficiently adjacent to an inner surface of the elongated body 902 of the touch sensitive device 900 such that extension of the piezoelectric element 1070 can cause the mass 1040 to contact the inner surface of the elongated body 902 resulting in a tapping effect.

Figure 11A:
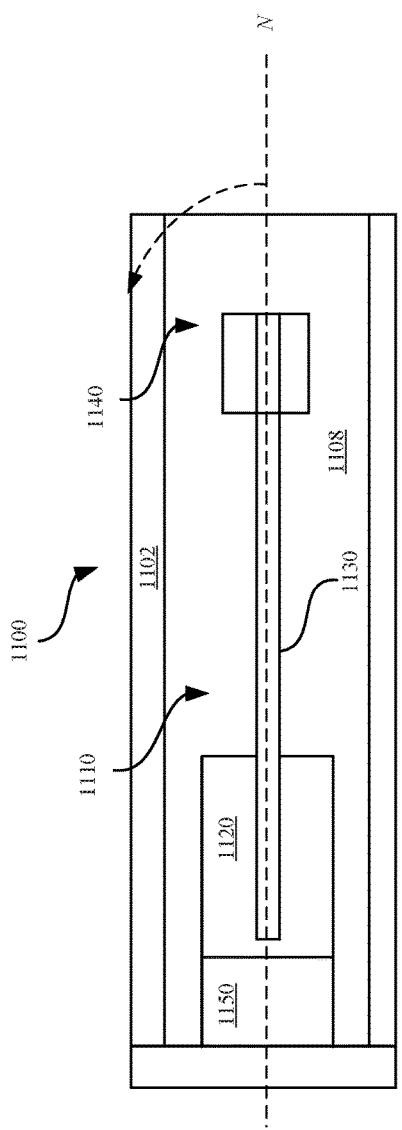
FIGS. 11A-11B illustrate cross-sectional views of a touch sensitive device that includes a cantilever haptic feedback component, in accordance with some embodiments.
Figure 11B:
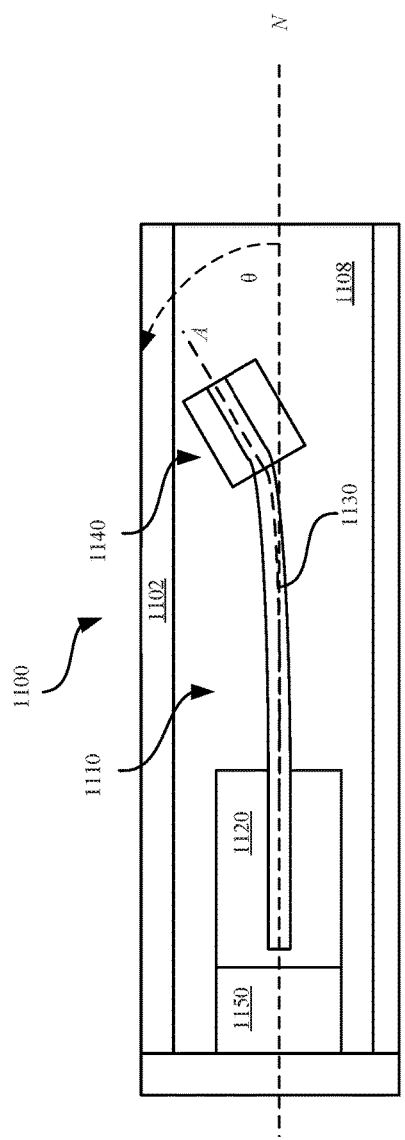

FIGS. 11A-11B illustrate cross-sectional views of a touch sensitive device 1100 that corresponds to the touch sensitive device 1000, as shown in FIG. 10B. FIG. 11A illustrates a cross-sectional view of the touch sensitive device 1100 during a non-actuation mode. As shown in FIG. 11A, the touch sensitive device 1100 includes a cantilever haptic feedback component 1110 and a mass 1140 that are positioned in a cavity 1108 of the touch sensitive device 1100. As shown in FIG. 11A, the piezoelectric flexible beam 1130 is positioned to align with the neutral axis (N) of the touch sensitive device 1100. During the non-actuation mode, the axis (A) of the piezoelectric flexible beam 1130 is positioned to align with the neutral axis (N) of the elongated body 1102.

FIG. 11B illustrates a cross-sectional view of the touch sensitive device 1100 in conjunction with an actuation mode. As shown in FIG. 11B, the piezoelectric flexible beam 1130 is angled from the neutral axis (N) of the elongated body 1102 so that the axis (A) of the piezoelectric flexible beam 1130 is no longer aligned with the neutral axis (N) of the elongated body 1102.

Although FIG. 11B illustrates that the mass 1140 of the cantilever haptic feedback component 1110 is configured to displace in a substantially upwards direction (θ), the distal end of the piezoelectric flexible beam 1030 is configured to rotate in substantially 360° degrees to impart moment to the mass 1140 in a plurality of different directions or dimensions.

Furthermore, FIG. 11B illustrates that the piezoelectric flexible beam 1130 is coupled to the rigid mount 1120. The rigid mount 1120 can be rotationally coupled to the rotating mechanism 1150 so that the rotating mechanism 1150 is configured to appropriately adjust the position of the piezoelectric flexible beam 1130 and the mass 1140 in order to bias the mass 1140. For example, if the mass 1140 is displaced laterally, then the rotating mechanism 1150 is configured to rotate so that the piezoelectric flexible beam 1130 and the mass 1140 rotate in a similar direction. In this manner, the rotating mechanism 1150 can bias the mass 1140 to prevent the user from feeling an imbalance of weight within the elongated body 1102.

In some embodiments, the piezoelectric flexible beam 1130 is configured to displace in a direction (e.g., up/down) based upon a polarity of the input voltage.

Figure 12:
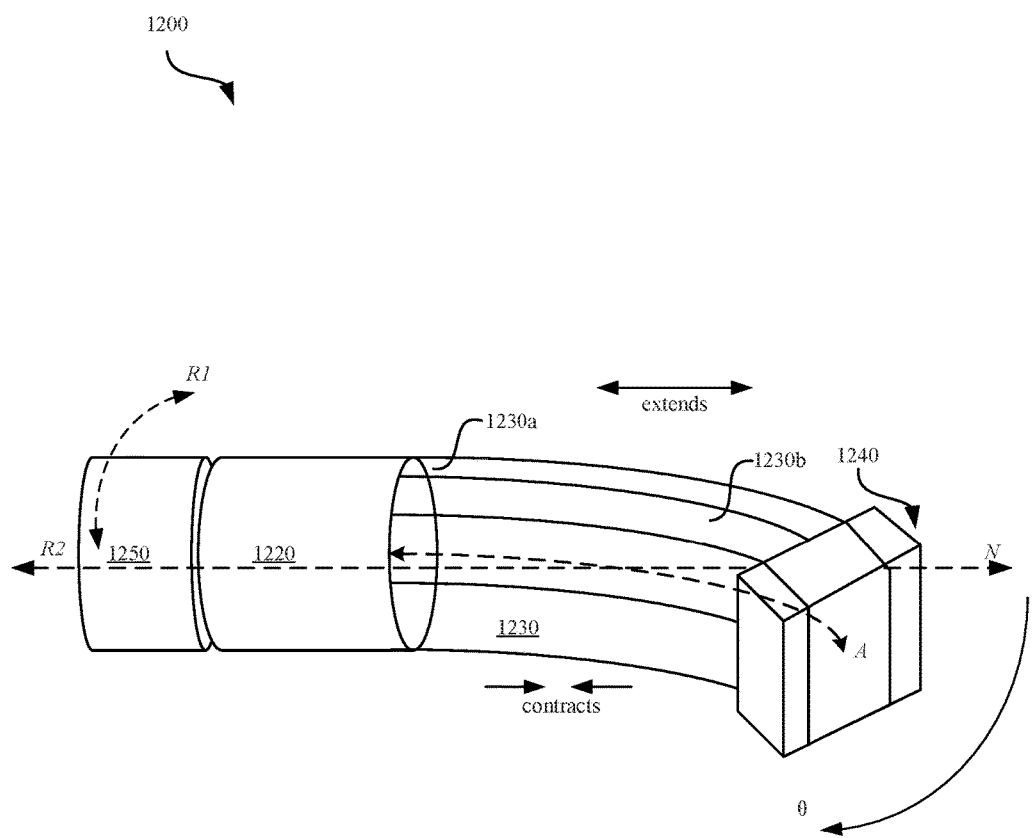
FIG. 12 illustrates a perspective view of a cantilever haptic feedback component, in accordance with some embodiments.

FIG. 12 illustrates a perspective view of a cantilever haptic feedback component 1200 that corresponds to the cantilever haptic feedback component 1010 of FIG. 10B, in accordance with some embodiments. FIG. 12 illustrates that the cantilever haptic feedback component 1200 includes a piezoelectric flexible beam 1230 that is configured to flex in accordance with the cantilever haptic feedback component 1210 operating in the actuation mode. As shown in FIG. 12, the cantilever haptic feedback component 1200 includes a piezoelectric flexible beam 1230 and a mass 1240. In some embodiments, the piezoelectric flexible beam 1230 can refer to a bimorph piezoelectric cantilever beam. The term "bimorph" can refer to the piezoelectric flexible beam 1230 having a first active layer 1230a and a second active layer 1230b. As shown in FIG. 12, a surface of the first active layer 1230a is coupled to a surface of the second active layer 1230b. When the cantilever haptic feedback component 1200 receives an electrical signal, the first active layer 1230a of the piezoelectric flexible beam 1230 contracts while the second active layer 1230b expands which results in a bending motion by the piezoelectric flexible beam 1230 according to direction (θ). During the actuation mode, the axis (A) of the piezoelectric flexible beam 1230 is no longer aligned with the neutral axis (N) of the elongated body 1002. In some examples, the first and second active layers 1230a, 1230b can be made from a piezoelectric-type material such as ceramic.

In some examples, the amount of deflection of the piezoelectric flexible beam 1230/mass 1240 corresponds to at least one of the voltage, frequency, pulse, or current of the electrical signal that is received. For example, when the applied voltage at the cantilever haptic feedback component 1200 is 40 V, the amount of deflection is about 10 N. In contrast, when the applied voltage at the cantilever haptic feedback component 1200 is 80 V, the amount of deflection is about 20 N.

Figure 13A:
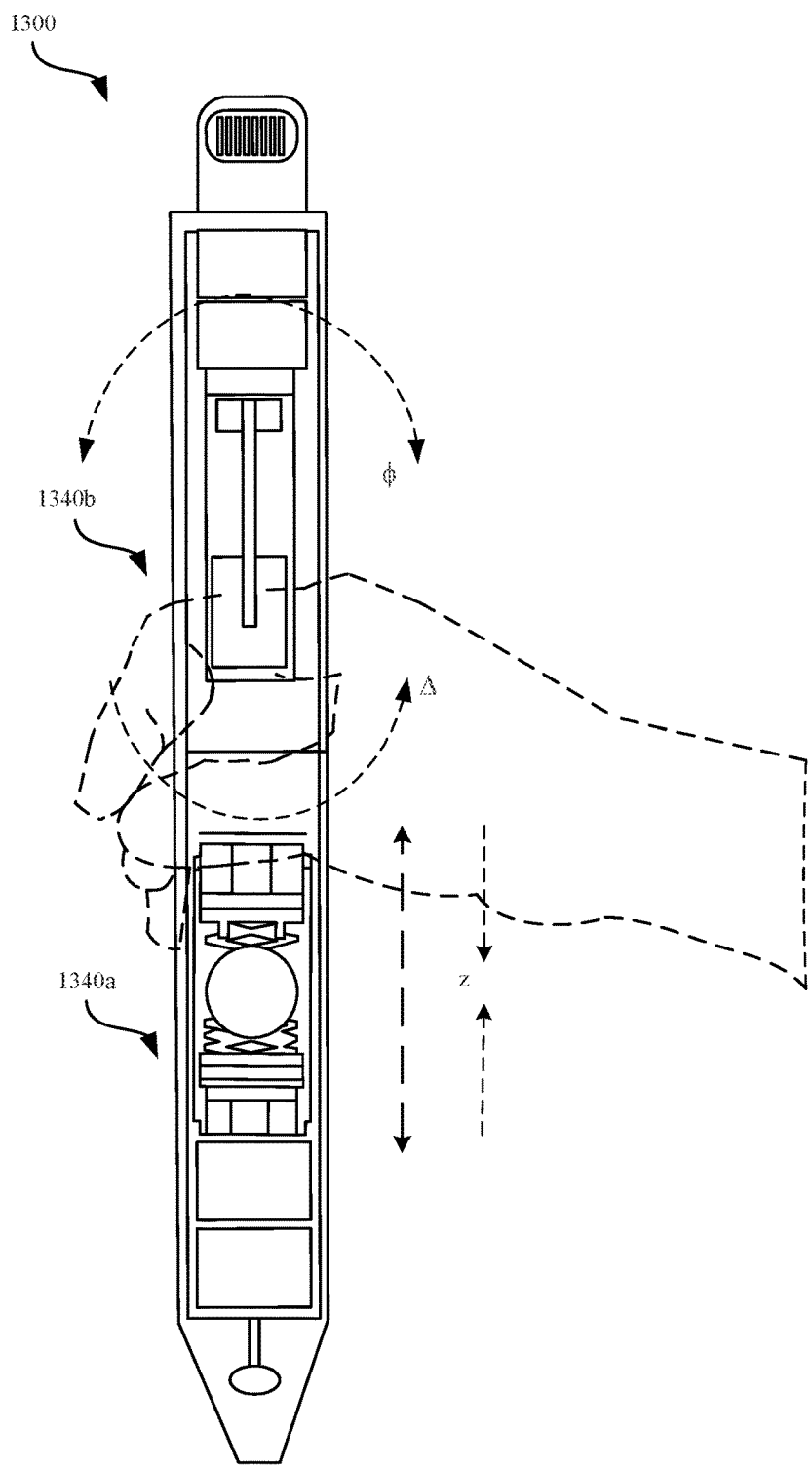
FIGS. 13A-13C illustrate cross-sectional views of a touch sensitive device, in accordance with various embodiments.
Figure 13B:
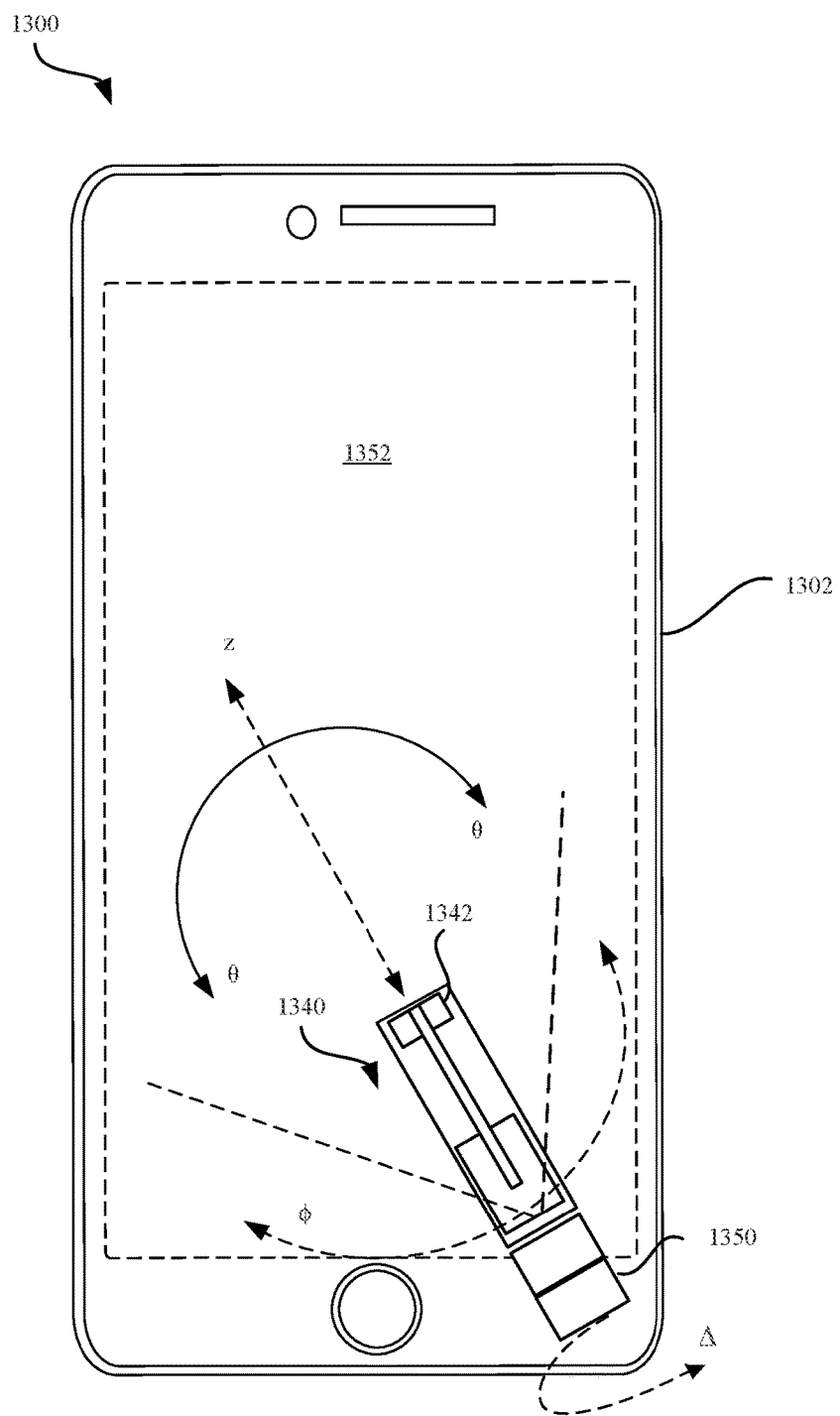
Figure 13C:
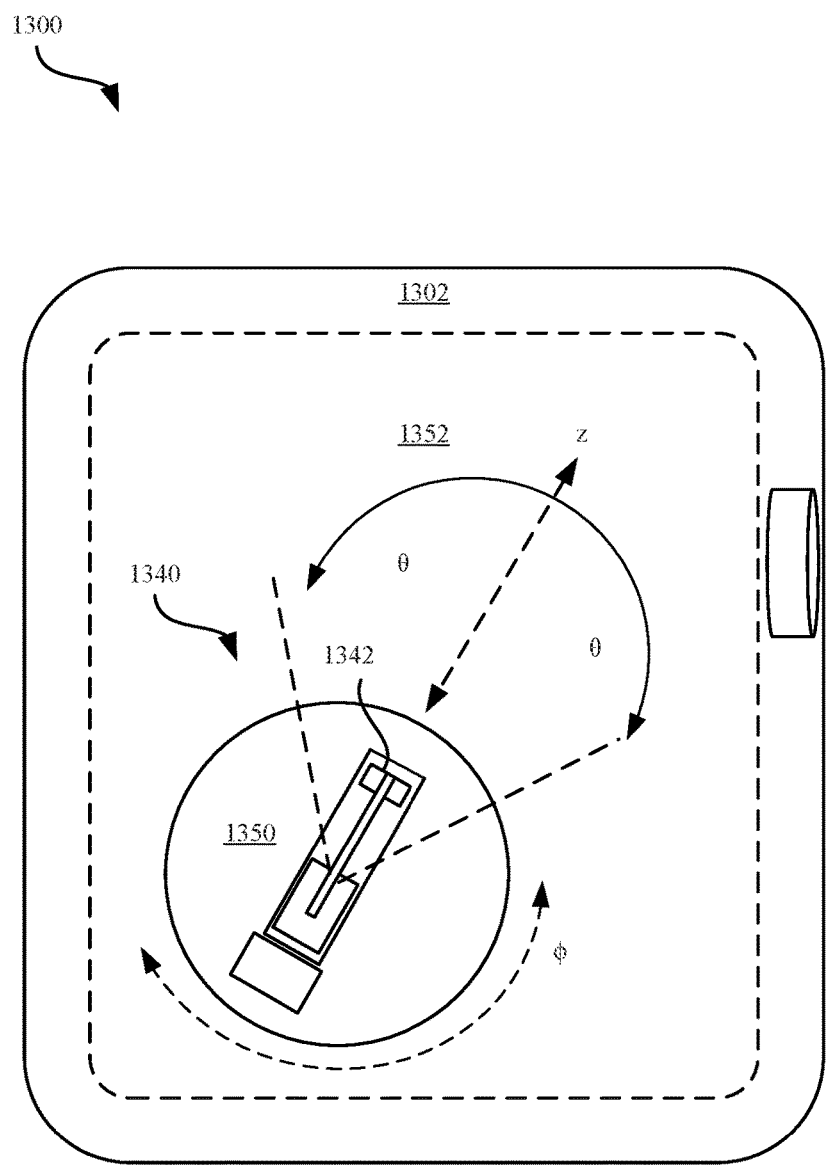

FIGS. 13A-13C illustrate cross-sectional views of a touch sensitive device 1300, in accordance with some embodiments. FIG. 13A illustrates a cross-sectional view of a touch sensitive device 1300 that includes an axial haptic feedback component 1340a and a cantilever haptic feedback component 1340b. As shown in FIG. 13A, the axial haptic feedback component 1340a can be positioned towards the distal end of the touch sensitive device 1300, while the cantilever haptic feedback component 1340b can be positioned towards the proximal end of the touch sensitive device 1300. In some examples, the user's fingers can act as a pivot to facilitate the rolling motion of displacement of the mass 950 of the cantilever haptic feedback component 1340b.

By providing two different types of haptic feedback components 1340a, 1340b, the touch sensitive device 1300 is configured to simultaneously provide haptic feedback associated with a variety of directionalities or degrees of freedom. In this manner, the amount of haptic feedback perceived by the user is magnified. The multiple haptic feedback components 1340a, 1340b of the touch sensitive device 1300 can be arranged in any suitable order or manner, and can be modified according to any of the embodiments described herein. For example, FIG. 13A illustrates that the axial haptic feedback component 1340a is configured to displace in an axial manner (z). FIG. 13A further illustrates that the cantilever haptic feedback component 1340b is configured to rotate along a roll direction (φ). FIG. 13A further illustrates that at least one of the haptic feedback components 1340a, 1340b is configured to rotate along a yaw orientation (Δ).

FIG. 13B illustrates a perspective view of a touch sensitive device 1300 that includes a cantilever haptic feedback component 1340 within an internal cavity, in accordance with some embodiments. The touch sensitive device 1300 can refer to a portable electronic device, such as an iPhone® manufactured by Apple Inc, Unlike the embodiment of the touch sensitive device 900 that involves generating haptic feedback via contact between the touch sensitive device 900 and the electronic device 150, the embodiment of the touch sensitive device 1300 shown in FIG. 13B includes a touch screen panel 1352 that includes capacitance sensors that are configured to detect changes in capacitance. Based upon the detected changes in capacitance, the cantilever haptic feedback component 1340 can generate haptic feedback that can be perceived by the user. In some examples, the mass 1342 of the cantilever haptic feedback component 1340 is configured to oscillate according to a pitch direction (θ). In some embodiments, the touch sensitive device 1300 includes a servo or piezo motor that is configured to displace the mass 1342 according to a substantially axial direction (z). In some embodiments, the cantilever haptic feedback component 1340 is coupled to a rotating mechanism 1350 that is configured to rotate the cantilever haptic feedback component 1340 in substantially 360° degrees along direction (Δ) to impart moment to the mass 1342 in a plurality of different directions or dimensions.

In some embodiments, the cantilever haptic feedback component 1340 can be positioned adjacent to the inner surface of the elongated body 1302 such that when the mass 1342 oscillates, the mass 1342 can contact an inner surface of the elongated body 1302 to produce a tapping sound effect.

FIG. 13C illustrates a perspective view of a touch sensitive device 1300 that includes a cantilever haptic feedback component 1340 within an internal cavity, in accordance with some embodiments. The touch sensitive device 1300 can refer to a portable electronic device that can be worn around a user's wrist or other appendage, such as an Apple Watch® manufactured by Apple Inc. Unlike the embodiment of the touch sensitive device 900 that generates haptic feedback via contact between the touch sensitive device 900 and the electronic device 150, the embodiment of the touch sensitive device 1300 shown in FIG. 13C includes a touch screen panel 1352 that includes capacitance sensors that are configured to detect changes in capacitance. Based upon the detected changes in capacitance, the cantilever haptic feedback component 1340 can generate haptic feedback that can be perceived by the user. In some examples, the mass 1342 of the cantilever haptic feedback component 1340 is configured to rotate according to a pitch direction (θ). In some embodiments, the touch sensitive device 1300 includes a servo or piezo motor that is configured to displace the mass 1342 according to a substantially axial direction (z). In some embodiments, the cantilever haptic feedback component 1340 is coupled to a rotating mechanism 1350 that is configured to rotate the cantilever haptic feedback component 1340 in substantially 360° degrees along direction (Δ) to impart moment to the mass 1342 in a plurality of different directions or dimensions. In some embodiments, the cantilever haptic feedback component 1340 can be positioned adjacent to the inner surface of the elongated body 1302 such that when the mass 1342 oscillates along direction (φ), the mass 1342 can contact against the inner surface of the elongated body 1302 to produce a tapping effect.

Figure 14:
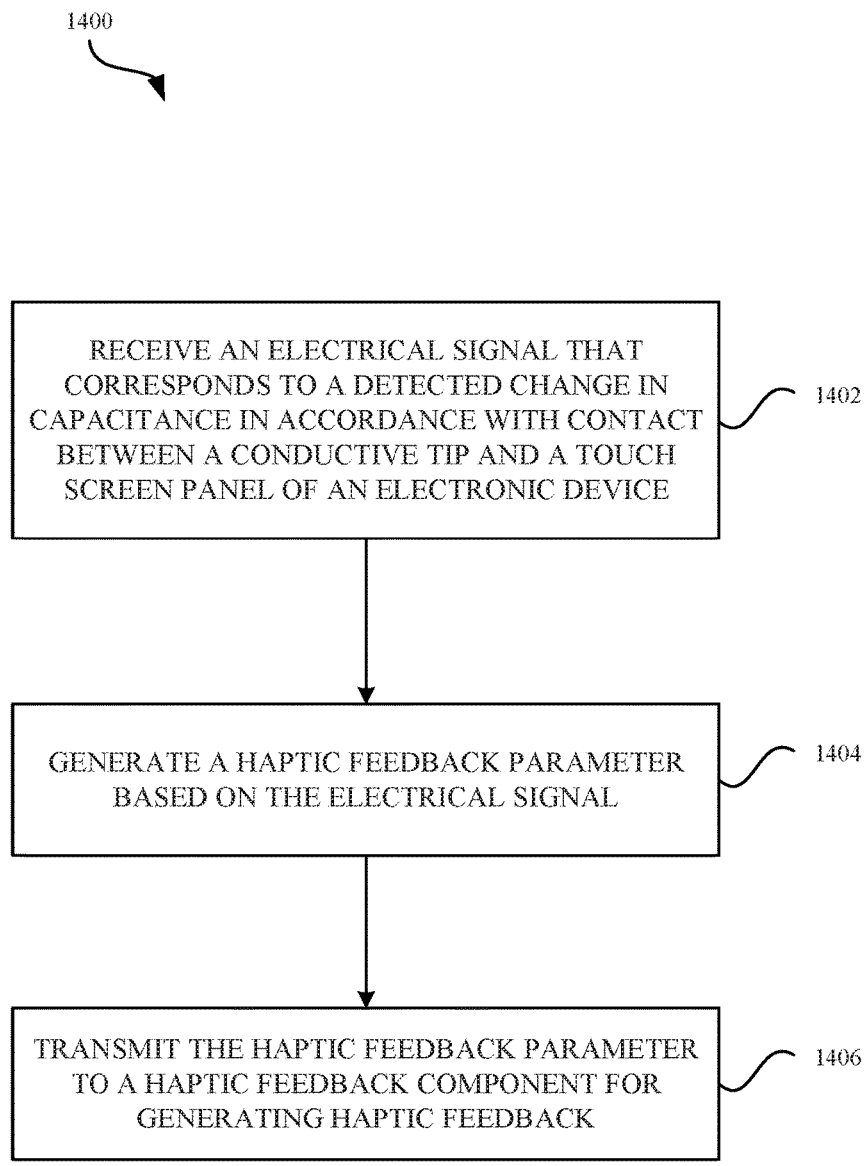
FIG. 14 illustrates a method for generating haptic feedback by a touch sensitive device, in accordance with some embodiments.

FIG. 14 illustrates a method 1400 for generating haptic feedback by at least one of the axial haptic feedback component 240, cantilever haptic feedback component 910, or other type of haptic feedback component as described herein, according to some embodiments. As shown in FIG. 14, the method begins at step 1402, where in conjunction with the conductive tip 210 of the touch sensitive device 200 coming into contact/changing the type of contact/separating from contact with the touch screen panel 152 of the electronic device 150, the controller 230 of the touch sensitive device 200 receives an electrical signal that indicates a change in capacitance as detected by a capacitive sensor 214 of the touch sensitive device 200 as corresponds to a contact parameter. At step 1404, the controller 230 generates a haptic feedback parameter based on the detected change in capacitance. At step 1406, the controller 230 transmits the haptic feedback parameter to a haptic feedback component 240 so that the haptic feedback component 240 generates haptic feedback that corresponds to the haptic feedback parameter.

Figure 15:
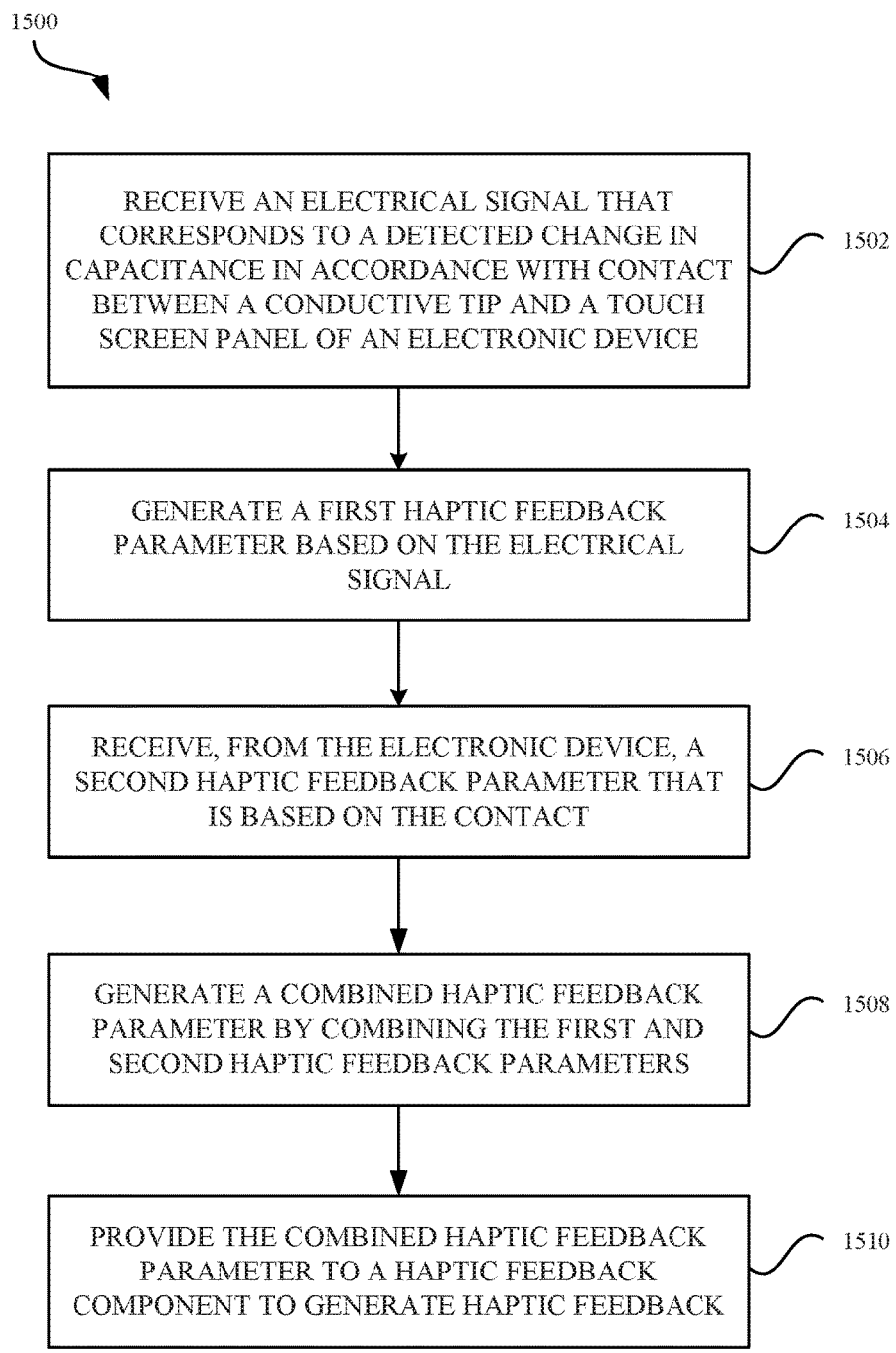
FIG. 15 illustrates a method for generating haptic feedback by a touch sensitive device, in accordance with some embodiments.

FIG. 15 illustrates a method 1500 for generating haptic feedback by the touch sensitive device 110, in conjunction with contact between the touch sensitive device 110 and the touch screen panel 152 of the electronic device 150. Although the method 1500 can be implemented according to at least the touch sensitive device 200, the touch sensitive device 900, and other embodiments described herein, the method 1500 is described with reference to the touch sensitive device 900. In some embodiments, the method begins at step 1502, where a controller 930 of the touch sensitive device receives an electrical signal that corresponds to a change in capacitance in accordance with the conductive tip 910 of the touch sensitive device 900 that generates haptic feedback by coming into contact/changing the type of contact/separating from contact with the touch screen panel 152 of the electronic device 150. At step 1504, the controller 930 generates a first haptic feedback parameter that is based upon the electrical signal that corresponds to the detected change in capacitance as corresponds to a contact parameter. At step 1506, the controller 930 receives, from the electronic device 150, a second haptic feedback parameter that is in accordance with the contact. In some embodiments, the electronic device 150 can generate the second haptic feedback parameter based upon a change in capacitance that is detected by a capacitive sensor associated with the touch screen panel 152. At step 1508, the controller 930 can combine a first electrical signal associated with the first haptic feedback parameter and a second electrical signal associated with the second haptic feedback parameter to generate a combined haptic feedback parameter. Subsequently, at step 1510, the controller 930 can provide the combined haptic feedback parameter to a haptic feedback component 910 of the touch sensitive device 900 so that the haptic feedback component 910 generates the haptic feedback.

Figure 16:
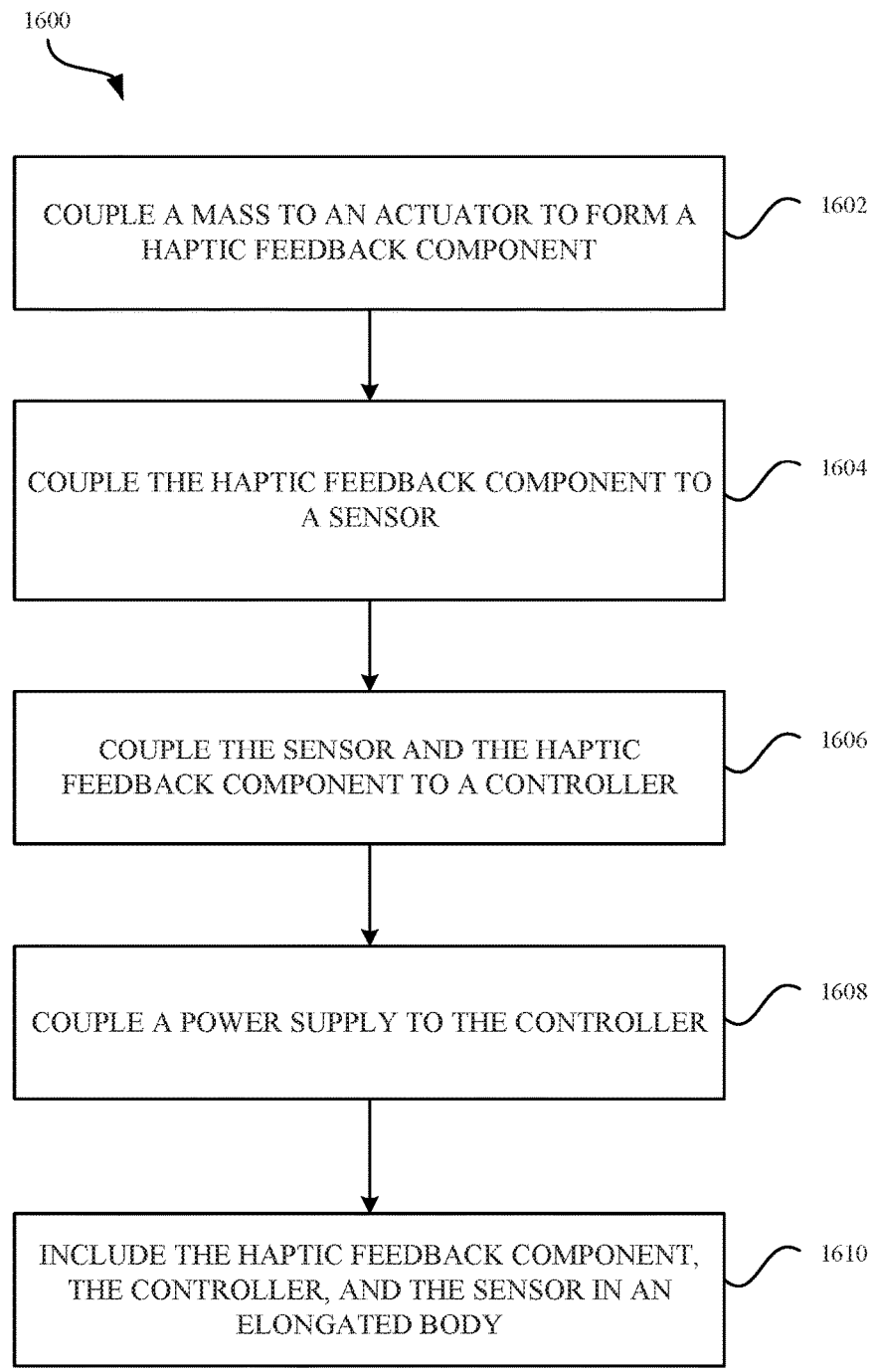
FIG. 16 illustrates a method for constructing a touch sensitive device that includes a haptic feedback component, in accordance with some embodiments.

FIG. 16 illustrates a method 1600 for constructing a touch sensitive device 110 according to some of the embodiments described herein. Although the method 1600 can be implemented to form at least the touch sensitive device 200, the touch sensitive device 900, and other embodiments described herein, the method 1600 is described with reference to the touch sensitive device 200. The method 1600 begins at step 1602 where a mass 250 is coupled to a piezoelectric element 222 to form at least an axial haptic feedback component 240. In some embodiments, the piezoelectric element 222 is coupled to the mass 250 via a spring 220. At step 1604, the axial haptic feedback component 240 is electrically coupled to a sensor (e.g., capacitive sensor 214). At step 1606, the capacitive sensor 214 and the axial haptic feedback component 240 are electrically coupled to the controller 230. At step 1608, the controller 230 is electrically coupled to a power supply 260. At step 1610, the axial haptic feedback component 240, capacitive sensor 214, and the controller 230 are included within an elongated housing 202 of the touch sensitive device 200. The method 1600 can be arranged in any suitable order or manner, and can be modified according to any of the embodiments described herein.

Figure 17:
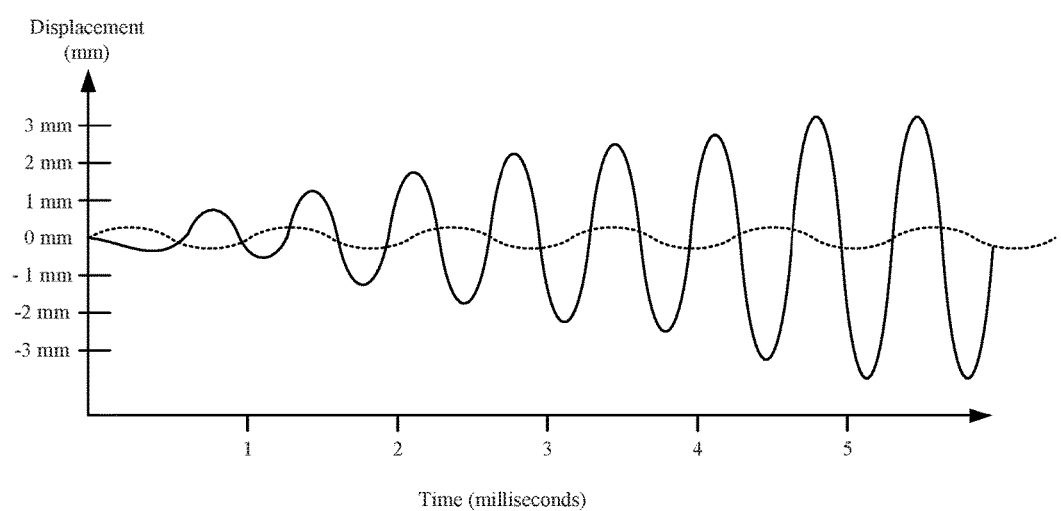
FIG. 17 illustrates a timing diagram of an actuation mode of the haptic feedback component, in accordance with some embodiments.

FIG. 17 illustrates a timing diagram of an actuation mode of the haptic feedback component 140 as a function of time (milliseconds) and displacement of a mass (millimeters), in accordance with some embodiments. Although the timing diagram of FIG. 17 can refer to operation of at least the axial haptic feedback component 240, cantilever haptic feedback component 910, or other haptic feedback components described herein, the timing diagram in FIG. 17 is described with reference to the axial haptic feedback component 240.

The actuation mode can also be described as an "in-phase" mode. In conjunction with the piezoelectric element 222 receiving the input voltage via a voltage cable (not illustrated), the piezoelectric element 222 can respond by resonating according to a predetermined frequency. In some examples, the resonance frequency is between e.g., about 300 Hz to about 700 Hz. Furthermore, the resonance frequency of the piezoelectric element 222 can be proportional to the input voltage. Resonation of the piezoelectric element 222 can cause the spring 220 and the mass 250 to oscillate in an axial direction along the longitudinal length of the elongated body 202. In some examples, the resonation of the piezoelectric element 222 has a period of about 1 millisecond. In some examples, the pulse duty cycle of oscillation of the piezoelectric element 222 depends on an amplitude of the input voltage. Furthermore, oscillation of the piezoelectric element 222 can depend upon the polarity (e.g., positive/negative) of the input voltage. For example, a positive input voltage can cause the piezoelectric element 222 to expand, while a negative input voltage can cause the piezoelectric element 222 to contract.

As shown in FIG. 17, during the actuation mode, the oscillation of the axial haptic feedback component 240 is characterized as having a saw tooth formation. Furthermore, the amount of displacement by the mass 250 of the axial haptic feedback component 240 increases rapidly during a short period of time. In some embodiments, the actuation mode and non-actuation mode can be characterized as having a rapid rise and a rapid fall, respectively. In some embodiments, the cantilever haptic feedback component 910 can be characterized as having an even sharper rise/fall compared to the axial haptic feedback component 240. As shown in FIG. 17, the mass 250 of the axial haptic feedback component 240 is configured to displace to a maximum range of about 8 mm after 5 milliseconds from the onset of the actuation mode. In some embodiments, the displacement of the mass 250 is amplified via the stacked configuration of the piezoelectric elements 400, as shown in FIG. 4A-4B. Subsequently, when the input voltage is no longer provided to the piezoelectric element 222, the electrical pathway between the power supply 260 and the piezoelectric element 222 is severed such that the piezoelectric element 222 and the mass 250 are prevented from displacing any further.

Figure 18:
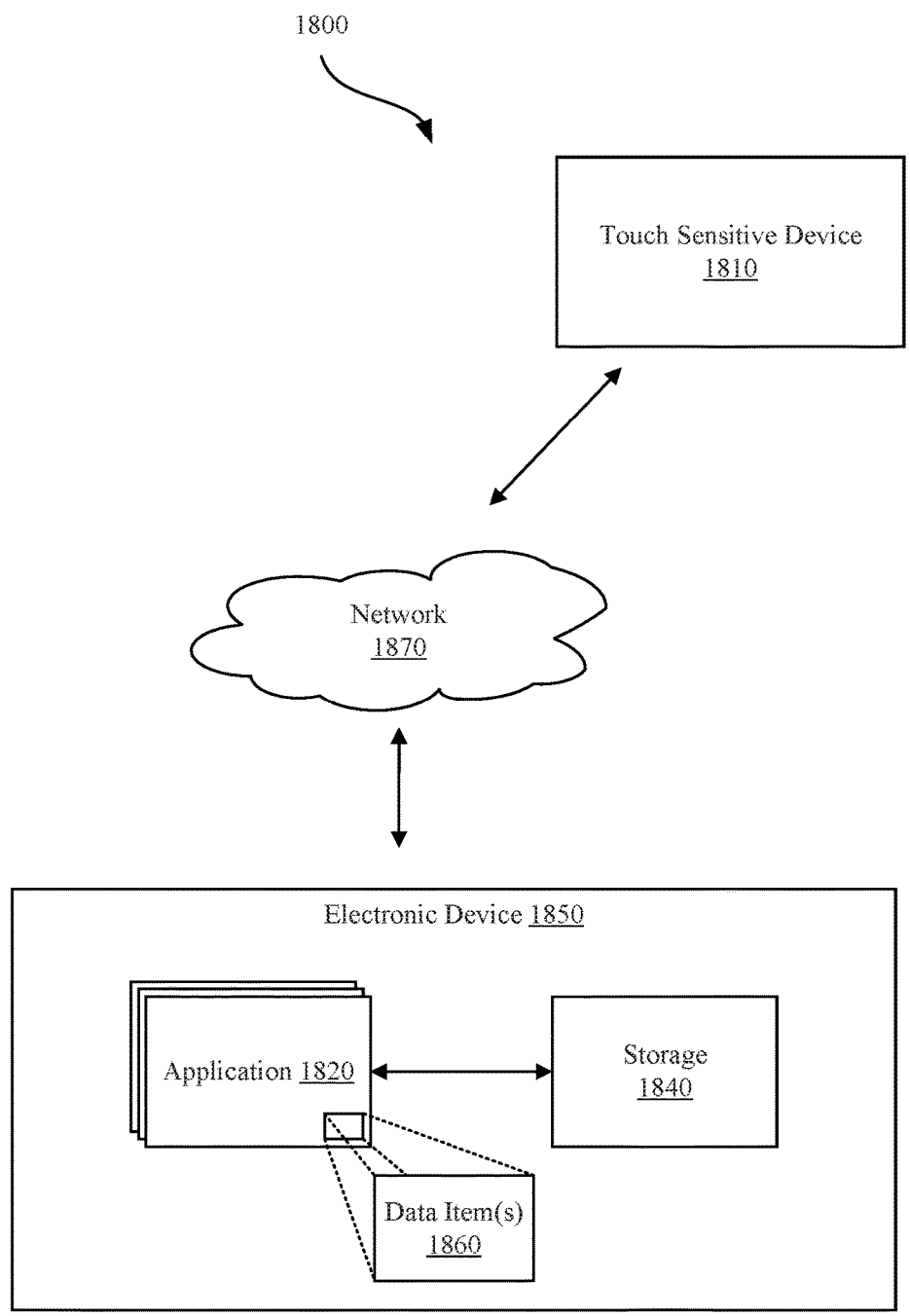
FIG. 18 illustrates a block diagram of different components of a system that is configured to provide audible feedback, in accordance with some embodiments.

FIG. 18 illustrates a block diagram of different components of a system 1800 that is configured to implement the various techniques described herein, such as generating audible feedback, according to some embodiments. More specifically, FIG. 18 illustrates a high-level overview of the system 1800, which includes an electronic device 1850 that can represent, for example, a portable computer, a tablet, a smartphone, or other electronic device with a touch screen display. According to some embodiments, the electronic device 1850 can be configured to execute (e.g., via an operating system installed on the electronic device 1850) various applications 1820. In one example, the application 1820 can represent a graphic presentation program, such as Apple Keynote, produced by Apple Inc. In other examples, the application 1820 can represent a multimedia program, an illustrator program, a music player, a word processor, a web development program, and the like. As shown in FIG. 18, the application 1820 and the storage device 1840 can be configured to directly communicate with one another. In some embodiments, the storage device 1840 can include a data item 1860 managed by the application 1820. In conjunction, the application 1820 can request the data item 1860 from the storage device 1840. In one example, the data item 1860 refers to an audible feedback preference that can be selected by the user, as described in more detail with reference to FIG. 20.

As described in greater detail herein, the application 1820 can be configured to execute a graphics presentation program. In some embodiments, the application 1820 is configured to receive a graphical input from physical contact between the touch sensitive device 1810 and the electronic device 1850. In some examples, the input can be provided by a user's finger(s), a stylus, or the touch sensitive device 1810 that corresponds to at least the touch sensitive device 110 of FIG. 1 or other embodiments of the touch sensitive device as described herein. For example, the application 1820 can receive a graphical input in conjunction with the electronic device 1850 detecting a change in capacitance via the touch sensitive device 1810. According to some embodiments, the electronic device 1850 includes a touch screen panel 152 that includes capacitive sensors, where each capacitive sensor includes electrodes. The electrodes of the capacitive sensors are configured to detect the capacitive input provided by the touch sensitive device 1810 and process different contact parameters of the capacitive input, including the speed of the input, the force of the input, the position of the input, the acceleration of the input, the angle of the input relative to the touch screen panel, and the like. The processor of the electronic device 1850 can process the different contact parameters detected by the capacitive sensors in conjunction with generating an audible feedback parameter. In some embodiments, the application 1820 can be configured to receive a user selection of audible feedback preferences. Subsequently, the processor of the electronic device 1850 is configured to generate an audible feedback parameter by combining an electrical signal associated with the different contact parameters with an electrical signal associated with the audible feedback preference, as described in greater detail with reference to FIG. 19.

As shown in FIG. 18, the electronic device is configured to communicate with the touch sensitive device 1810 via a network 1870, where the network 1870 can represent at least one of a global network (e.g., the Internet), a wide area network, a local area network, a wireless personal area network (WPAN), and the like. In some examples, the network 1870 can represent a WPAN for transmitting data between the electronic device 1850 and the touch sensitive device 1810. The WPAN network can represent Bluetooth (IEEE 802.15.1), ZigBee, Wireless USB, and the like. In some examples, the network can refer to Near-Field Communication (NFC). According to some embodiments, the electronic device 1850 can be configured to provide instructions to the touch sensitive device 1810 to enable an audible feedback component of the touch sensitive device 1810 to provide sound effects in conjunction with the capacitive signals.

Figure 19:
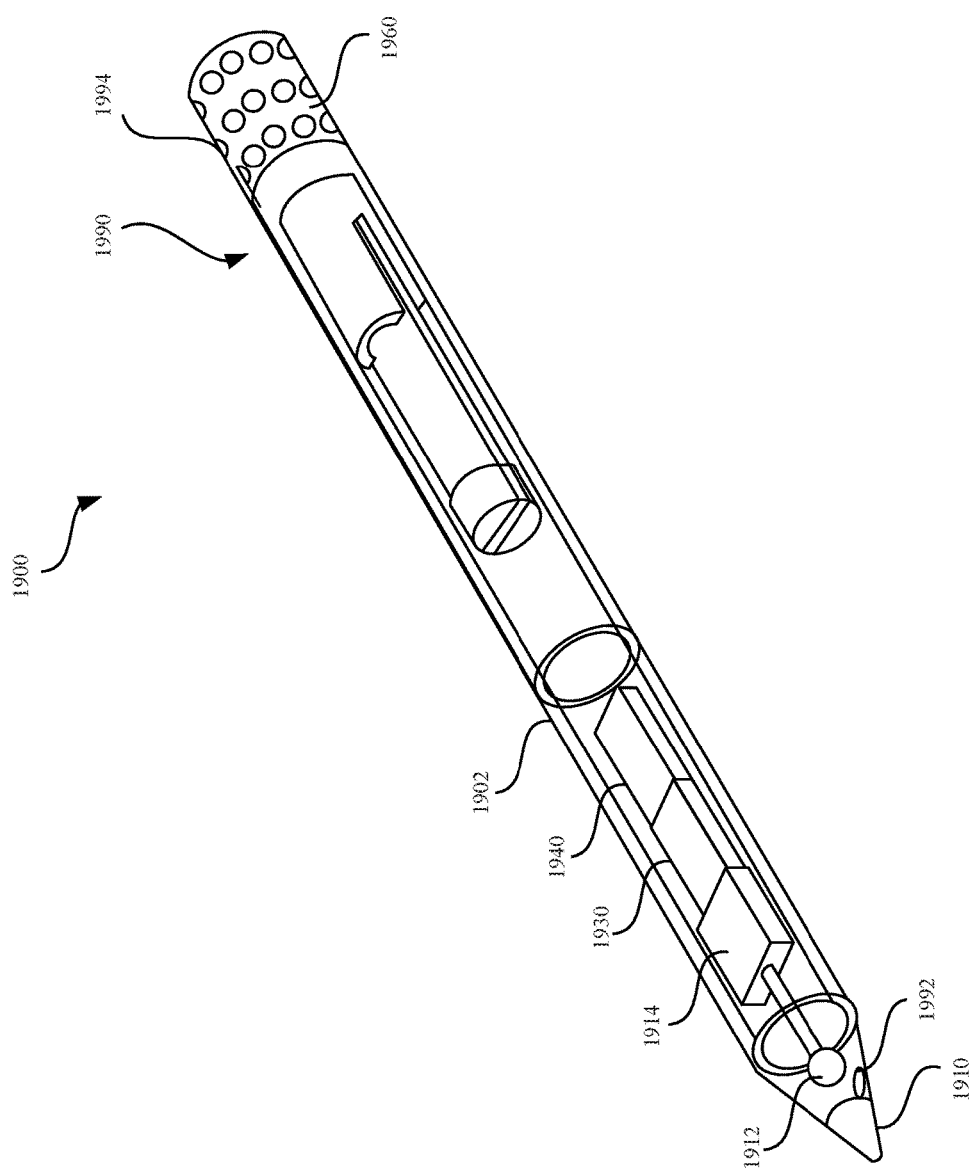
FIG. 19 illustrates a perspective view of a touch sensitive device that includes an audible feedback component, in accordance with some embodiments.

FIG. 19 illustrates a perspective view of a touch sensitive device 1900 including an audible feedback component 1990. In some embodiments, the audible feedback component 1990 can include at least one of piezoelectric element, electro-active substrate, magnetic resonant actuator, magnetic coil or linear resonant actuator. In some embodiments, the haptic feedback component can also be controlled to provide audible feedback. In this manner, the same feedback component can provide both haptic and audible feedback. By modifying the same feedback component to provide multiple types of feedback responses, the touch sensitive device 1900 can consume less power (relative to separate haptic and audible feedback components), requires fewer components within the cavity 1908 of the touch sensitive device 1900, and can be more cost-effective to manufacture.

Although the touch sensitive device 1900 is shown as including a cantilever feedback component, the touch sensitive device 1900 can include at least one of the axial feedback component 210, and other feedback components described herein. In some embodiments, the touch sensitive device 1900 does not include a haptic feedback component for generating haptic feedback. In some embodiments, the audible feedback component 1990 is configured to generate a sound effect in conjunction with receiving an audible feedback parameter from the electronic device 1850. For example, the audible feedback parameter can refer to instructions that are provided to generate a scratching sound to simulate the sound effect of bristles of a paint brushes against a canvas as displayed by the touch screen panel 152. In another example, the audible feedback parameter can refer to instructions to generate a rubbing sound effect to simulate erasing chalk on a chalkboard as displayed by the touch screen panel 152.

In some embodiments, the touch sensitive device 1900 includes a wireless transceiver or communications unit 1940 to receive audible feedback parameter instructions from the electronic device 1850 via the wireless transceiver 1940 according to a variety of wireless communication protocols, including Wi-Fi, Bluetooth, Wireless USB, NFC, and the like.

In some embodiments, the touch sensitive device 1900 includes a capacitive sensor 1914 for generating an audible feedback parameter without requiring interaction with the electronic device 1850. For example, the capacitive sensor 1914 can be configured to detect a change in capacitance in response to the conductive tip 1910 being in contact with the touch screen panel 152 of the electronic device 1850. In some embodiments, the conductive tip 1910 can be referred to as a distal interface unit or interface component. The conductive tip can include an electrode 1912 coupled to the capacitive sensor 1914. The capacitive sensor 1914 is configured to generate an electrical signal that is associated with a contact parameter (e.g., force), and subsequently the capacitive sensor 1914 can transmit the contact parameter or movement property to a controller 1930. The controller 1930 can be configured to convert the contact parameter or movement property to an audible feedback parameter based upon the contact parameter. For example, if the capacitive sensor 1914 detects a sudden deceleration of the conductive tip 1910 that is characterized by a high gravitational force, the controller 1930 can be configured to generate an audible feedback parameter to simulate the sound of a screeching sound akin to a car slamming its brakes. The audible feedback parameter can be provided to the audible feedback component 1990 to produce a sound effect. Notably, in this manner, the touch sensitive device 1900 can be configured to generate a sound effect independent of the electronic device 1850. Although in some embodiments, the touch sensitive device 1900 can be configured to generate a sound effect by interacting with the electronic device 1850.

In some embodiments, the touch sensitive device 1900 can be configured to generate the sound effect in coordination with the electronic device 1850. The controller 1930 can generate a first audible feedback parameter based on a contact parameter, whereupon the first audible feedback parameter can be transmitted to the electronic device 1850 via the wireless transceiver 1940. Subsequently, the processor of the electronic device 1850 can be configured to receive the first audible feedback parameter and combine the first audible feedback parameter provided by the touch sensitive device 1900 with a second audible feedback parameter generated by the electronic device 1850 to form a combined audible feedback parameter.

In some embodiments, the electronic device 1850 can generate a sound effect based on the combined audible feedback parameter.

In other embodiments, the combined audible feedback parameter can be transmitted to the touch sensitive device 1900 to generate a sound effect by the audible feedback component 1990. For example, if the second audible feedback parameter generated by the electronic device 1850 refers to simulating a sound effect of chalk against a chalkboard, and the first audible feedback parameter provided by the touch sensitive device 1900 refers simulating a sound effect of a screeching sound, the controller 1930 can generate a combined audible feedback parameter characterized by a new sound effect such as the sound of the chalk snapping or breaking into pieces.

In some embodiments, the capacitive sensor 1914, the controller 1930, and the wireless transceiver 1940 can be electrically coupled via wires, buses, or data lines.

In some embodiments, the touch sensitive device 1900 includes a power supply 1960 that is configured to supply energy to the controller 1930, wireless transceiver 1940, and to the audible feedback component 1990. In some examples, the power supply 1960 is a rechargeable battery. The housing can include a speaker 1994 for outputting the sound effect generated by the audible feedback component 1990.

In some embodiments, the touch sensitive device 1900 can optionally include an audio detection component (e.g., microphone) 1992 that can be configured to measure ambient sound that is associated with the contact between the conductive tip 1910 of the touch sensitive device 1900 and the touch screen panel 152. For example, the microphone 1992 can measure the amount of ambient sound associated with tapping the conductive tip 1910 against the touch screen panel 152, pressing the conductive tip 1910 against the touch screen panel 152, sliding the conductive tip 1910 against the touch screen panel 152, and the like. The microphone 1992 can associate a waveform of the ambient sound with an initial digital signal. The controller 1930 can be configured to analyze the waveform of the ambient sound to generate an inverted digital signal (or phase shift digital signal). Subsequently, the inverted digital signal can be amplified, where the audible feedback component 1990 can be configured to generate a sound effect that is directly proportional to the amplitude of the waveform of the initial digital signal.

In some embodiments, the audible feedback component 1990 can be configured to perform noise-canceling of the ambient sound through a destructive interference process. In this manner, the touch sensitive device 1900 can be configured to minimize or eliminate the ambient sound associated with the physical input such that the sound effect based on the audible feedback parameter is more clearly perceived by the user.

In some embodiments, the vibrations generated by the audible feedback component 1990 can counteract the ambient sound that is generated by the touch sensitive device 1900 interacting with the touch screen panel 152. In some examples, the controller 1930 can be capable of analyzing the waveform of the frequency of the ambient sound. Based on this waveform, the controller 1930 can cause the audible feedback component 1990 to oscillate at a predetermined resonant frequency that is proportional to the waveform so as to minimize, counteract, or eliminate the ambient sound.

In this manner, the controller 1930 can be capable of dynamically adjusting the harmonic frequency output of the audible feedback component 1990 for purposes that can include generating sound effects so as to counteract the ambient sound.

In some embodiments, the conductive tip 1910 can be constructed of different types of materials that can facilitate in attenuating or counteracting the ambient sound generated by the interaction with the touch screen panel 152. In some examples, the hardness or deformability of the conductive tip 1910 can be adjusted by manufacturing the conductive tip 1910 and/or housing 1902 from one or more types of sound-muffling materials. For example, although the conductive tip 1910 and/or housing 1902 can be comprised of plastics such as polyethylene terephthalate (PET), high-density polyethylene (HDPE), polyvinyl chloride (PVC), polypropylene (PP), or polystyrene (PS), additional materials such as rubber or elastomers (e.g., polybutadiene, isobutylene isoprene rubber, etc.) can be combined with the plastics or substituted for the hard plastics in order to minimize or deaden the ambient sound that is generated.

In some embodiments, the conductive tip 1910 can include a spring disposed in the conductive tip. Load generated by pressing the conductive tip 1910 against the touch screen panel 152 can cause the spring to compress, so as to absorb vibrations or pressure generated by the interaction. In some embodiments, the conductive tip 1910 can also flex in a predetermined manner, such as when sliding the conductive tip 1910 against the touch screen panel 152 so as to absorb vibrations generated by the interaction.

In some embodiments, the audible feedback component 1990 can refer to an electroactive substrate. In response to being stimulated by an electrical current transmitted by the power supply 1960, the shape, size, or a physical characteristic of the electroactive substrate can altered.

In some embodiments, the audible feedback component 1990 can refer to a speaker having an actuator that converts electrical energy into mechanical energy.

In some embodiments, the audible feedback component 1990 can refer to a voice coil that is configured to generate a sound pressure wave. The voice coil includes a magnetic coil element or wire that is attached to a loudspeaker cone. As an electrical current, transmitted by the power supply 1960, is driven through the magnetic coil element, a magnetic field can be generated by the magnetic coil element. Subsequently, the magnetic field can cause a mass that is coupled to the permanent magnetic element to displace relative to the magnetic coil element. Displacement of the mass relative to the magnetic coil element can cause the voice coil to generate a sound pressure wave that corresponds to the electrical current that is driven to the magnetic coil element.

In some embodiments, where the audible feedback component 1990 refers to a voice coil, the audible feedback component 1990 can be configured to generate a plurality of different sound pressure waves having different frequencies that correspond to the changes in capacitance that are detected by the capacitive sensor 1914. In some embodiments, the magnetic field that is generated by the magnetic coil element can affect at least one of a position, velocity, acceleration, momentum, or frequency of the displacement of the mass. In some embodiments, the power supply 1960 can be configured to adjust the type of electrical current (e.g., polarity, strength) that can affect the magnetic field generated by the magnetic coil element. In some embodiments, the sound effect generated by the voice coil can be based on the change in capacitance and an audible feedback preference that is selected in conjunction with use of the application 1820, as described in further detail with reference to FIGS. 21A-21B. For example, the controller 1930 can be configured to cause different sound pressure waves to be associated with different changes in capacitance and/or the audible feedback preference, whereupon the voice coil can generate sound pressure waves that correspond to the sound effect.

In some embodiments, the audible feedback component 1990 refers to a piezoelectric speaker that utilizes a piezoelectric effect to generate a sound effect. The piezoelectric speaker includes a piezoelectric element that can be configured to receive an input voltage. The piezoelectric element includes a metal disc that is coupled to a diaphragm. As the piezoelectric element receives an input voltage, the input voltage can cause the metal disc to displace relative to the diaphragm. Displacement of the metal disc relative to the diaphragm can cause the piezoelectric speaker to generate a sound pressure wave that corresponds to the input voltage provided to the piezoelectric element.

The piezoelectric speaker can be configured to generate a plurality of different sound pressure waves having different frequencies that correspond to the changes in capacitance that are detected by the capacitive sensor 1914. In some embodiments, the power supply 1960 can adjust at least one voltage parameter that is provided to the piezoelectric disc. For example, the at least one voltage parameter can include amplitude, polarity, pulse width, duty cycle, and the like. By adjusting the at least one voltage parameter, the controller 1930 can be configured to cause different types of sound effects to be generated by the piezoelectric speaker. In some embodiments, the sound effect that is generated by the piezoelectric speaker can correspond to the change in capacitance that is detected. In some embodiments, the sound effect generated by the piezoelectric speaker can be based on the change in capacitance and an audible feedback preference that is selected in conjunction with use of the application 1820, as described in further detail with reference to FIGS. 21A-21B. For example, the controller 1930 can be configured to cause different sound effects to be associated with different changes in capacitance and/or the audible feedback preference, whereupon the piezoelectric speaker can generate sound pressure waves that correspond to the sound effect.

In some embodiments, the audible feedback component 1990 can refer to an eccentric rotating mass vibration component. The eccentric rotating mass vibration component can include a motor that includes an offset (asymmetric) mass that is coupled to a shaft of the motor. The eccentric rotating mass vibration component can receive an input voltage from the power supply 1960 that causes the motor to rotate, whereupon the mass also rotates to generate centripetal force. Since the centripetal force generated by the offset mass is also asymmetric, the centripetal force can displace the motor. Repeated displacement of the motor can cause vibrations that can be translated from the audible feedback component 1990 to the housing 1902 of the touch sensitive device 1900. In this manner, motion generated by the vibration of the motor can be perceived by the user. In addition, the controller 1930 can cause the motor to vibrate at a predetermined frequency. In some embodiments, the eccentric rotating mass vibration component can generate different sound pressure waves having different frequencies. For example, the controller 1930 can be configured to cause different sound effects to be associated with different changes in capacitance and/or the audible feedback preference, whereupon the eccentric rotating mass vibration component can generate sound pressure waves that correspond to the sound effect.

In some embodiments, the controller 1930 can cause the power supply 1960 to adjust at least one voltage parameter that is provided to the eccentric rotating mass vibration component. For example, the at least one voltage parameter can include amplitude, polarity, pulse width, duty cycle, and the like. By adjusting the at least one voltage parameter, the controller 1930 can be configured to adjust the moment of the displacement of the motor.

In some embodiments, the eccentric rotating mass vibration component can be configured to generate haptic feedback and audible feedback. In some examples, in conjunction with receiving an input voltage from the power supply 1960, the eccentric rotating mass vibration component can generate haptic feedback as well as generate a sound effect via vibration of the motor.

In some embodiments, the audible feedback component 1990 can refer to a linear resonant actuator. The linear resonant actuator can include a mass (e.g., magnetic mass) that is coupled to a spring. The linear resonant actuator further includes a voice coil that can be fixed in place within the audible feedback component 1990. The linear resonant actuator can receive an input voltage or control signal from the power supply 1960 to generate an oscillating force along a single axis. The input voltage drives the voice coil at a resonant frequency of the spring, thus causing the mass to oscillate at a predetermined manner. Repeated oscillation of the mass can cause vibrations that can be translated from the linear resonant actuator to the housing 1902 of the touch sensitive device 1900. In this manner, motion generated by the vibration of the mass can be perceived by the user. In addition, the controller 1930 can cause the mass to vibrate at a predetermined resonant frequency. In some embodiments, the voice coil is driven at the resonant frequency of the spring. By driving the mass, which can be magnetic, relative to the spring, the linear resonant actuator is displaced so as to produce vibrations. Air is displaced by the vibrations of the linear resonant actuator, and the air can be displaced at different frequencies so as to produce different sound frequencies. For example, the controller 1930 can be configured to cause different sound effects to be associated with different changes in capacitance and/or the audible feedback preference.

In some embodiments, the audible feedback component 1990 can refer to a magnetic assembly having a magnetic coil element and a permanent magnetic element that is coupled to a mass (e.g., magnetic mass). As current is driven through the magnetic coil element, a magnetic field can be generated by the magnetic coil element. The magnetic field can cause the mass that is coupled to the permanent magnetic element to displace. Displacement of the mass can generate frictional sound and impact sound. In some examples, frictional sound can be generated in conjunction with rotating or displacing the mass within the magnetic coil element and causing friction to be generated between the mass and the magnetic coil element, whereupon a sound effect is generated via the friction. In some examples, impact sound can be generated in conjunction with rotating or displacing the mass within the magnetic coil element with sufficient force and/or moment so that the mass strikes against the magnetic coil element causing a tapping or impact sound via the friction.

The magnetic assembly can be configured to generate different types of sound pressure waves in accordance with the frictional sound and the impact sound. In some embodiments, the controller 1930 can be configured to adjust the type of electrical current (e.g., polarity, strength) provided by the power supply 1960 so as to affect the magnetic field generated by the magnetic coil element. In some embodiments, the magnetic assembly can generate a sound effect that is based on the change in capacitance. In some embodiments, the magnetic assembly can generate a sound effect that is based on the change in capacitance and an audible feedback preference that is selected in conjunction with use of the application 1820, as described in further detail with reference to FIGS. 21A-21B. For example, the controller 1930 can be configured to cause different sound effects to be associated with different changes in capacitance and/or the audible feedback preference, whereupon the magnetic assembly can generate sound pressure waves that correspond to the sound effect.

Additionally, in the various embodiments of the audible feedback component 1990 described, the controller 1930 can reduce the amount of power consumption at the power supply 1960 by taking advantage of the resonant frequency of the spring. For example, if the voice coil oscillates the mass against the spring at a rate that matches the spring's resonant frequency, then the audible feedback component 1990 can produce vibrations at a higher amplitude at a high efficiency.

In some examples, implementing the audible feedback component 1990 as a linear resonant actuator may be preferable over an eccentric rotating mass, in that oscillation of the linear resonant actuator can generate a precise waveform with a fixed resonant frequency, while oscillation of the eccentric rotating mass can produce a varying frequency of vibration.

Figure 20:
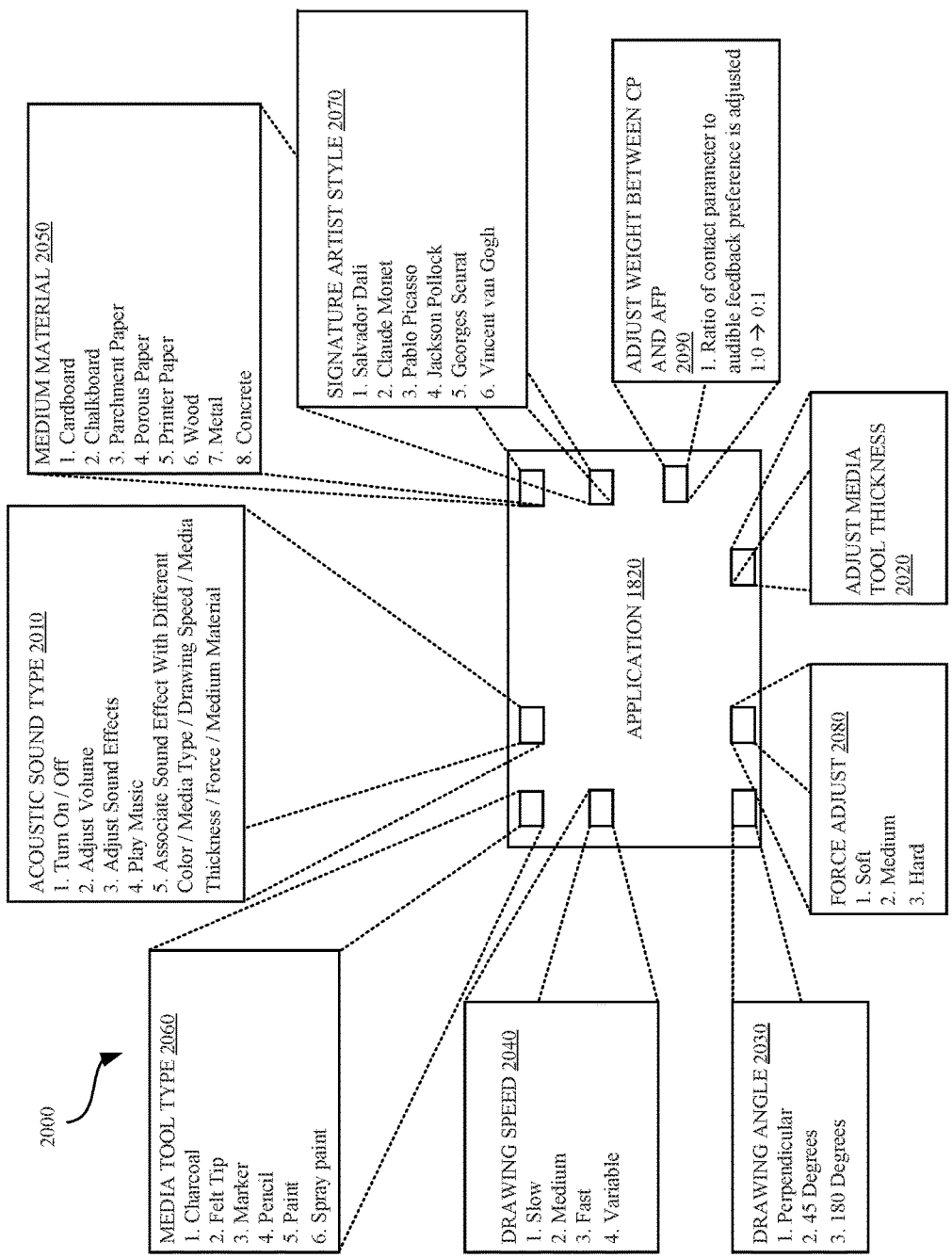
FIG. 20 illustrates a block diagram of an exemplary list of audible feedback preferences associated with an application, in accordance with some embodiments.

FIG. 20 illustrates a system view of an exemplary list of audible feedback preferences associated with data items 1860 that can be executed by the application 1820. The audible feedback preferences can be selected by a user. In some embodiments, the user can select one of several audible feedback preferences via the application 1820. As shown in FIG. 20, the exemplary list of audible feedback preferences includes: "Acoustic Sound Type" 2010, "Adjust Media Tool Thickness" 2020, "Drawing Angle" 2030, "Drawing Speed" 2040, "Medium Material" 2050, "Media Tool Type" 2060, "Signature Artist Style" 2070, "Force Adjust" 2080, and "Adjust Weight 2090". The processor is configured to generate a digital signal associated with the audible feedback preference. In some embodiments, the electronic device 1850 can transmit the audible feedback preference to the touch sensitive device 1900. In some embodiments, the controller 1930 of the touch sensitive device 1900 can combine a digital signal associated with the audible feedback preference with a digital signal associated with a contact parameter (generated by the touch sensitive device 1900) into an audible feedback parameter, as described in more detail with reference to FIGS. 21A-21B. Accordingly, the application 1820 can cause a specific sound to be associated with the specific type of audible feedback preference that is selected. In some embodiments, upon receiving a contact parameter, the electronic device 1850 or the touch sensitive device 1900 can associate the selected audible feedback preference with the contact parameter to generate an audible feedback parameter.

In some embodiments, the application 1820 provides a graphical user interface (GUI) that permits for the user to select the audible feedback preferences. Each audible feedback preference can be associated with a list of options, where each option is associated with a unique sound effect that can be paired with the contact parameter to generate an audible feedback parameter.

In one example, the user can select "Acoustic Sound Type" 2010, whereupon the application 1820 provides a list of options for modifying: 1) the type of sound; 2) modifying the length of a sound; 3) adjusting at least one of a bass, treble, or mid-range of a sound; or 4) switching the sound on/off.

In one example, the user can select "Drawing Speed" 2040, whereupon the application 1820 provides a list of options for generating various sounds that correspond to the drawing speed. For example, selection of the "Drawing Speed" can provide options for selecting a sound associated with the drawing speed, including: 1) slow; 2) medium; 3) fast; or 4) variable. In one example, a selection of a fast drawing speed can cause a sound effect to be generated that has a shorter frequency than the selection of a slow drawing speed.

In one example, a user can select "Medium Material" 2050, whereupon the application 1820 provides a list of options for generating various sounds that corresponds to different medium materials. For example, selection of the "Medium Material" can provide options for selecting a sound associated with using various types of mediums, including: 1) cardboard; 2) chalkboard; 3) parchment paper; 4) porous paper; 5) printer paper; 6) wood; 7) metal; and 8) concrete. In one example, drawing on metal can generate a sound that is significantly different from drawing on a chalkboard. Thus, by associating the contact parameter with the audible feedback preference of a metal medium can generate an audible feedback parameter that simulates drawing on metal, where the audible feedback parameter can be output on the touch screen panel 1852.

In one example, the user can select "Media Tool Type" 2060, whereupon the application 1820 provides a list of options for generating various sounds that correspond to various media tools. For example, selection of the "Media Tool Type" can provide options for selecting a sound associated with using various types of medias, including: 1) charcoal; 2) felt tip; 3) marker; 4) pencil; and 5) paint. In one example, drawing with charcoal can generate a sound that is significantly different from drawing with paint. Thus, by associating the media tool type of paint with the sound of paint drops can generate an audible feedback parameter that combines the detected change in capacitance with the audible feedback preference selected, where the audible feedback parameter can be output on the touch screen panel 1852.

In another example, the user can select "Force Adjust" 2080, whereupon the user is provided with a list of options, including: 1) soft; 2) medium; or 3) hard. Each force adjustment option is associated with a different type of sound. In some embodiments, the "Force Adjust" 2080 option can be performed in conjunction with the capacitive sensor 1914 of the touch sensitive device 1900. For example, the capacitive sensor 1914 can be configured to detect an amount of force that is applied against the touch screen panel 152. Subsequently, a feedback characteristic that indicates the amount of force applied can be transmitted by the touch sensitive device 1900 to the electronic device 1850, whereupon a processor of the electronic device 1850 can combine the audible feedback preference selected by the user with the feedback characteristic. For example, if the force detected by the capacitive sensor 1914 is strong, but the "pencil" media tool type 2060 and the "soft" force adjustment 2080 are selected, then the electronic device 150 can generate a sound effect that is more akin to a "soft" stroke of a pencil rather than a "hard" stroke of the pencil.

In some embodiments, since the controller 1930 of the touch sensitive device 1900 or processor (see e.g., 2430) of the electronic device 2400 can be configured to combine the electrical signals associated with the audible feedback preference (AFP) with the electrical signals associated with the contact parameter (CP), the controller 1930 and/or processor 2430 can be configured to adjust the amount of weight for each set of electrical signals. In some embodiments, the application 1820 can provide an audible feedback preference that can be selected to allow a user to adjust between the ratio of the audible feedback preference to the contact parameter that corresponds to the detected change in capacitance. For example, a user may want to place more weight on the audible feedback preference by assigning the AFP with a higher weighted value than the contact parameter. The ratio between AFP and CP can have a ratio ranging between 1:0 to 0:1. To adjust the weight between AFP and CP, the user can select the "Adjust Weight Between CP and AFP" 2090 to cause the application 1820 to adjust the amount of weight that the controller 1930/processor 2430 is configured to assign to the AFP and to the CP. For example, the application 1820 can assign a ratio 1:9 to assign more weight to the audible feedback preference. In another example, the application 1820 can adjust the ratio to 5:5 to assign an equal amount of weight to the audible feedback preference and the contact parameter.

In some embodiments, the processor can transmit the adjusted ratio to the controller 1930 of the touch sensitive device 1900 to cause the controller 1930 to adjust the amount of weight assigned to the AFP and to the CP, as described with reference to FIGS. 22-23.

In some examples, each of the audible feedback preferences shown in FIG. 20 can be stored in the storage device 1840. In some examples, the application 1820 can rely upon machine-learning algorithm to learn a user's preferences and adjust a default preference to align more similarly to the user's preference so that the settings of each of the audible feedback preferences is adjusted to more closely correspond to a user's preferences. For example, if the application 1820 learns over time that the user selects the "Metal" selection of the "Medium Material" 2050, but then modifies the settings of the specific sound associated with the "Metal" selection to more similarly correspond to brushed metal instead of a textured metal, then the application 1820 can dynamically apply the user settings to future selection of the "Metal" selection.

Figure 21A:
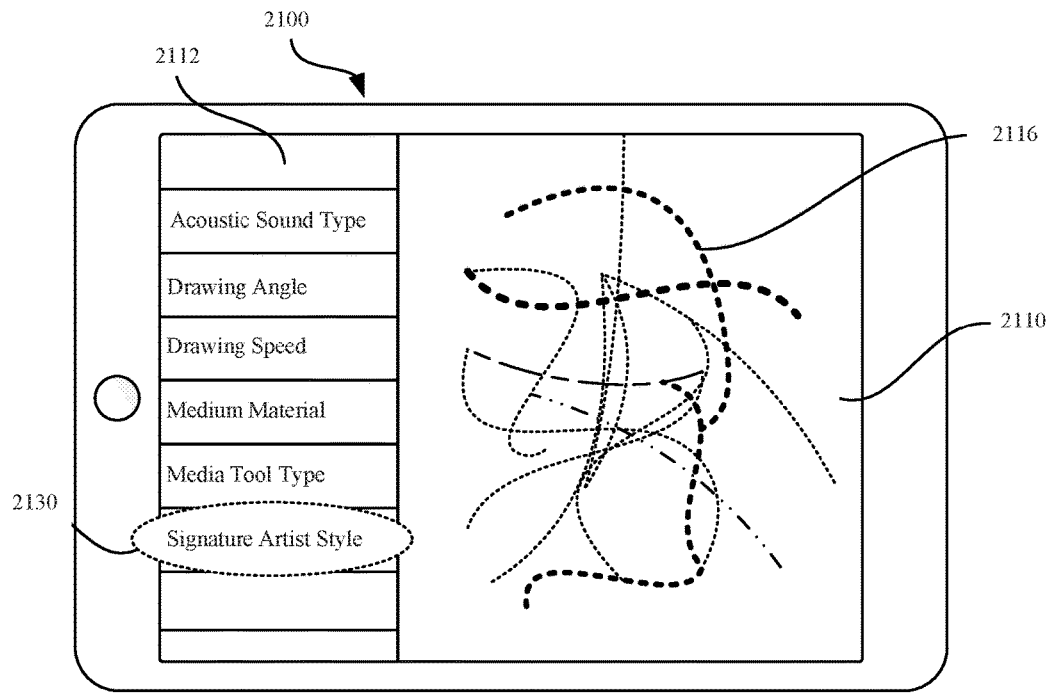
FIGS. 21A-21B illustrate a sequence diagram for selecting an audible feedback parameter, in accordance with some embodiments.
Figure 21B:
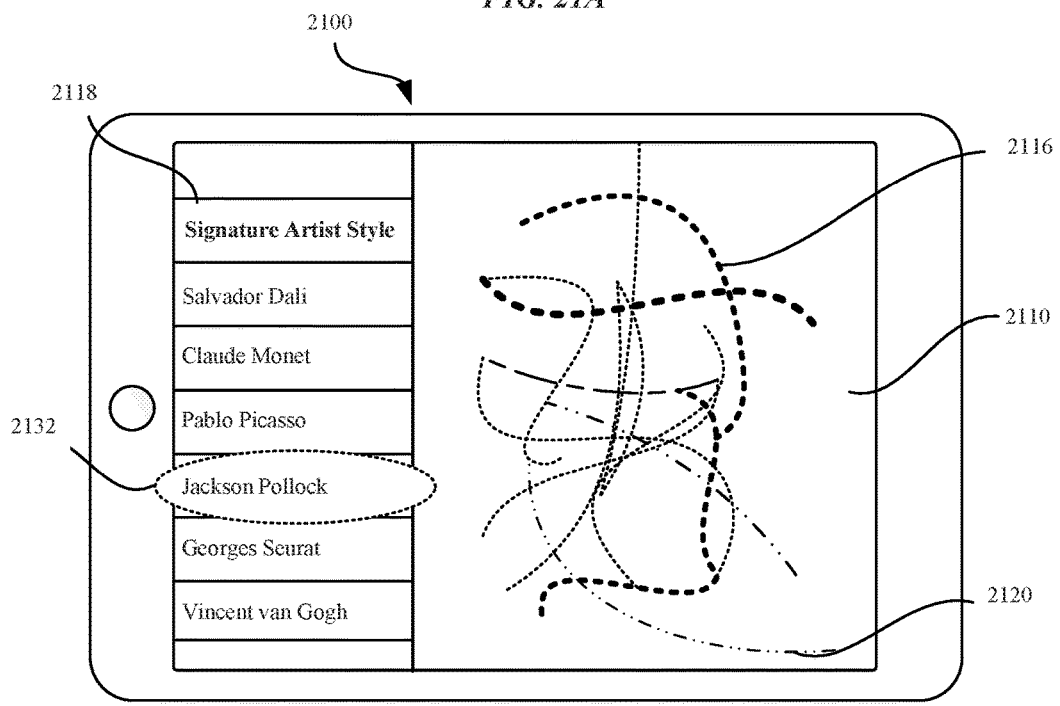

FIGS. 21A-21B illustrate a sequence diagram 2100 for associating an audible feedback preference with an input associated with a contact parameter associated with contact between the touch sensitive device 1810 and the electronic device 1850, as described above in conjunction with the block diagram of FIG. 20. In particular, a user interface 2110 of the application 1820 can be configured to receive a selection of an audible feedback preference. As shown in FIG. 21A, an audible feedback preference menu 2112 is provided within the user interface 2110. The user can browse through the various types of audible feedback preferences, such as "Drawing Speed", "Medium Tool", or "Signature Artist Style" displayed by the audible feedback preference menu 2112. As shown in FIG. 21A, the user interface 2110 includes a media item 2116 (e.g., a sketch). As shown in FIG. 21A, an audible feedback preference 2130 labeled "Signature Artist Style" is selected by the user, which causes the application 1820 to generate a detailed window 2118 that illustrates the different types of artists associated with the "Signature Artist Style", which is illustrated in FIG. 21B.

As shown in FIG. 21B, the detailed window 2118 displays the different types of artists associated with the "Signature Artist Style". As shown in FIG. 21B, "Jackson Pollock" 2132 is selected, which causes the application 1820 to associate the media item 2116 with the "Jackson Pollock" selection. For example, any subsequent input 2120 (e.g., additional drawn lines) to the media item 2116 in the user interface 2110 that is received by the application 1820 is associated with the "Jackson Pollock" selection. As an example, selection of the "Jackson Pollock" style can cause the subsequent input 2120 to the media item 2116 to simulate the sound effect of zero-friction that corresponds to dripping, drizzling, or pouring paint onto a canvas. This is in contrast to the "Claude Monet" style which can be attributed to a sound effect of repeatedly painting over previously applied strokes of paint so that there is more simulation of abrasion or friction between the paint brush and the canvas.

Additionally, any subsequent input to the media item 2116 is detected by the capacitive sensors of the touch screen panel 152 of the electronic device 1850 in order to form a contact parameter. Examples of the contact parameter include angle, orientation, force, speed, acceleration, and the like. In conjunction with generating an audible feedback parameter, a processor of the electronic device 1850 is configured to combine the contact parameter with the audible feedback preference. Because the electric signal generated by the capacitive sensor of the touch screen panel 152 can be an analog signal, the electronic device 1850 can optionally include an A/D converter that is configured to convert the analog signal into a digital signal. Accordingly, the processor of the electronic device 1850 is configured to combine the digital signal associated with the contact parameter and the digital signal associated with the audible feedback preference into an audible feedback parameter. In some examples, the ratio between the contact parameter and the audible feedback preference is 50:50. In other examples, the audible feedback parameter can include between about 0% contact parameter and 100% of the audible feedback preference to 100% contact parameter and 0% of the audible feedback preference. In some embodiments, the weight/ratio between the contact parameter and the audible feedback preference can be adjusted by the user. The processor of the electronic device 1850 is configured to generate the audible feedback parameter, whereupon the audible feedback parameter can be provided to an antenna in the form of an electronic signal. Subsequently, the antenna is configured to transmit the audible feedback parameter to the touch sensitive device 1900 so that the audible feedback parameter can be implemented as a sound effect by the audible feedback component 1990 of the touch sensitive device 1900. For example, in association with the selection of the "Jackson Pollock" style, the sound effect generated by the audible feedback component 1990 can replicate the sound of dropping or drizzling paint onto a canvas.

Figure 22A:
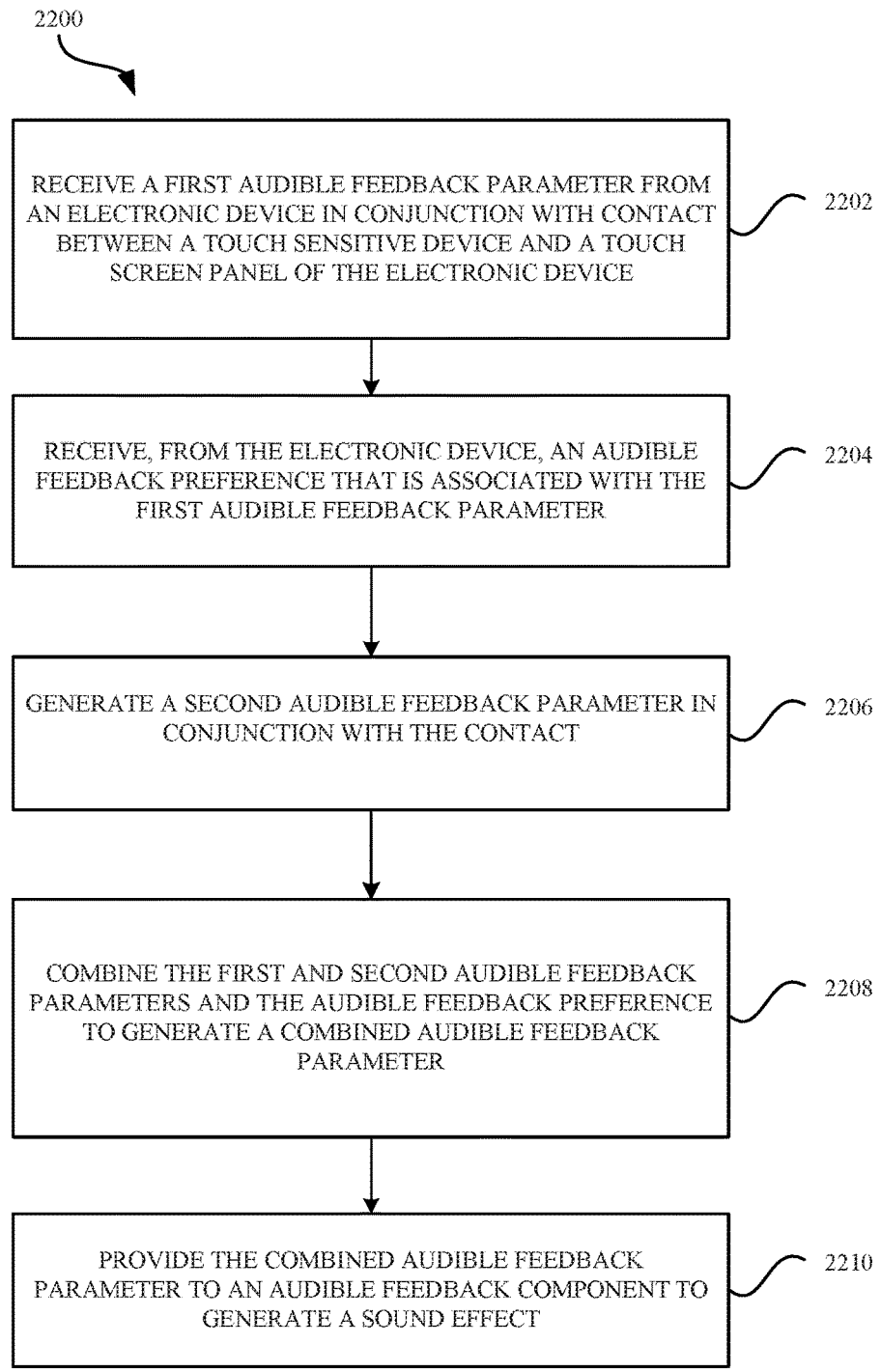
FIG. 22A illustrates a method for generating a sound effect by the touch sensitive device, in accordance with some embodiments.

FIG. 22A illustrates a method 2200 for generating a sound effect by the touch sensitive 1900 that includes the audible feedback component 1990, according to some embodiments. As shown in FIG. 22A, the method 2200 begins at step 2202, where in conjunction with the conductive tip 1910 of the touch sensitive device 1900 coming into contact/changing the type of contact/separating from contact with the touch screen panel 152 of the electronic device 1850, the touch sensitive device 1900 receives a first audible feedback parameter from the electronic device 1850. The first audible feedback parameter can be received via a transceiver 1940 of the touch sensitive device 1900. At step 2204, the controller 1930 of the touch sensitive device 1900 receives an audible feedback preference from the electronic device 1850. The audible feedback preference can be associated with the first audible feedback parameter.

At step 2206, the controller 1930 of the touch sensitive device 1900 can generate a second audible feedback parameter in conjunction with the conductive tip 1910 of the touch sensitive device 1900 coming into contact/changing the type of contact/separating from contact with the touch screen panel 152 of the electronic device 1850.

At step 2208, the controller 1930 of the touch sensitive device 1900 can combine the electrical signals corresponding to the first and second audible feedback parameters with an electrical signal that corresponds to the audible feedback preference to generate a combined audible feedback parameter.

At step 2210, the controller 1930 of the touch sensitive device 1900 can provide the combined audible feedback parameter to an audible feedback component 1990 of the touch sensitive device 1900 to generate a sound effect.

Figure 22B:
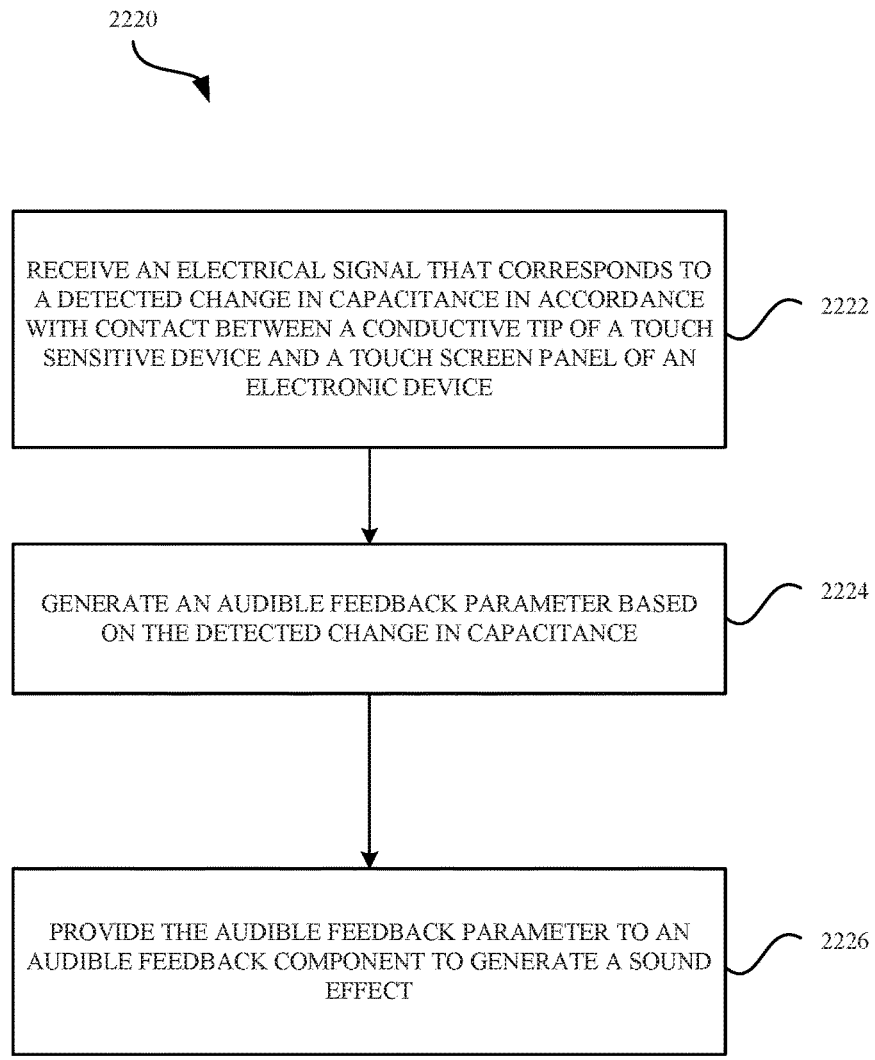
FIG. 22B illustrates a method for generating a sound effect by the touch sensitive device, in accordance with some embodiments.
Figure 22C:
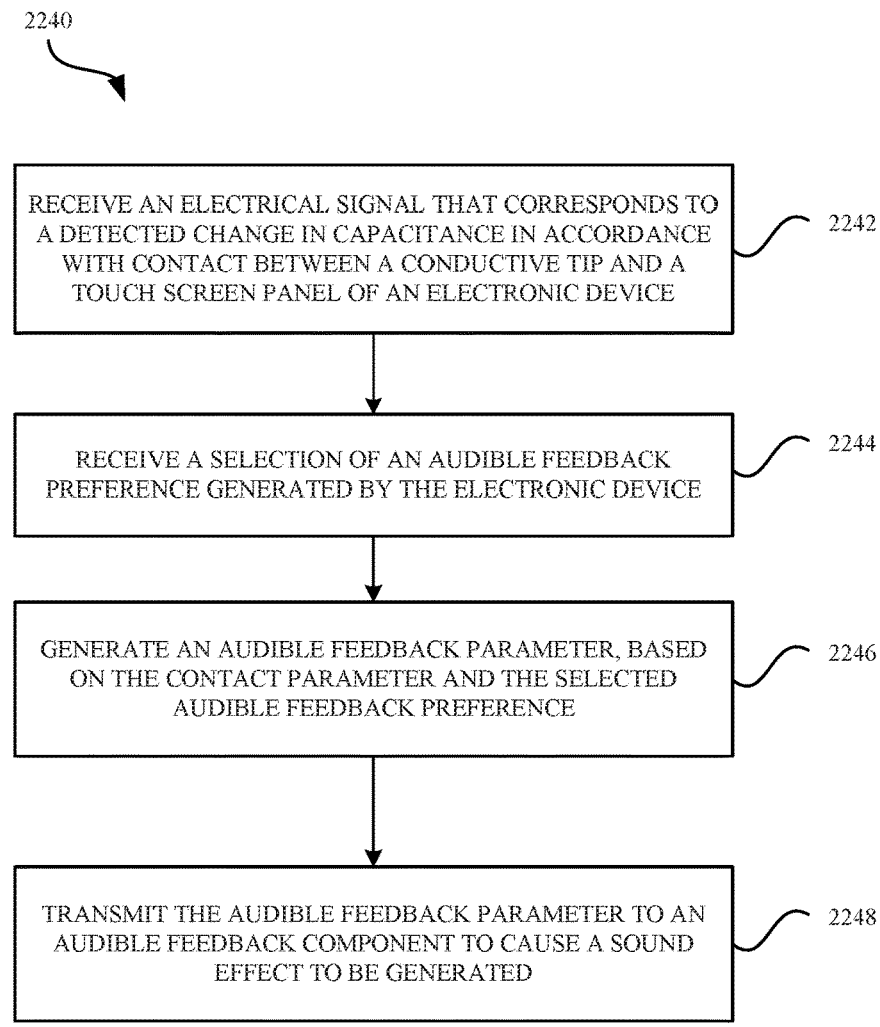
FIG. 22C illustrates a method for generating a sound effect by the touch sensitive device, in accordance with some embodiments.

FIG. 22B illustrates a method 2220 for generating a sound effect by the touch sensitive device 1900 that includes the audible feedback component 1990, in accordance with some embodiments. As shown in FIG. 22B, the method 2220 begins at step 2222, where in conjunction with the conductive tip 1910 of the touch sensitive device 1900 coming into contact/changing the type of contact/separating from contact with the touch screen panel 152 of the electronic device 1850, the controller 1930 receives an electrical signal that corresponds to a detected change in capacitance in conjunction with the contact.

At step 2224, the controller 1930 of the touch sensitive device 1900 can generate an audible feedback parameter that is based on the detected change in capacitance.

At step 2226, the controller 1930 can provide the audible feedback parameter to the audible feedback component 1990 of the touch sensitive device 1900 to generate a sound effect.

FIG. 23C illustrates a method 2240 for generating a sound effect by the touch sensitive device 1900 that includes the audible feedback component 1990, in accordance with some embodiments. As shown in FIG. 23C, the method 2240 begins at step 2242, where in conjunction with the conductive tip 1910 of the touch sensitive device 1900 coming into contact/changing the type of contact/separating from contact with the touch screen panel 152 of the electronic device 1850, the controller 1930 receives an electrical signal that corresponds to a detected change in capacitance in conjunction with the contact.

At step 2244, the controller 1930 receives a selection of an audible feedback preference that is generated by the electronic device 1850. In some embodiments, the audible feedback preference can be associated with the electrical signal that corresponds to the change in capacitance. The audible feedback preference can be at least one of selected by the user or selected by the application 1820.

At step 2246, the controller 1930 can generate an audible feedback parameter that is based on the detected change in capacitance and the selected audible feedback preference.

At step 2248, the controller 1930 can transmit the audible feedback parameter to an audible feedback component 1990 to cause a sound effect to be generated.

Figure 22D:
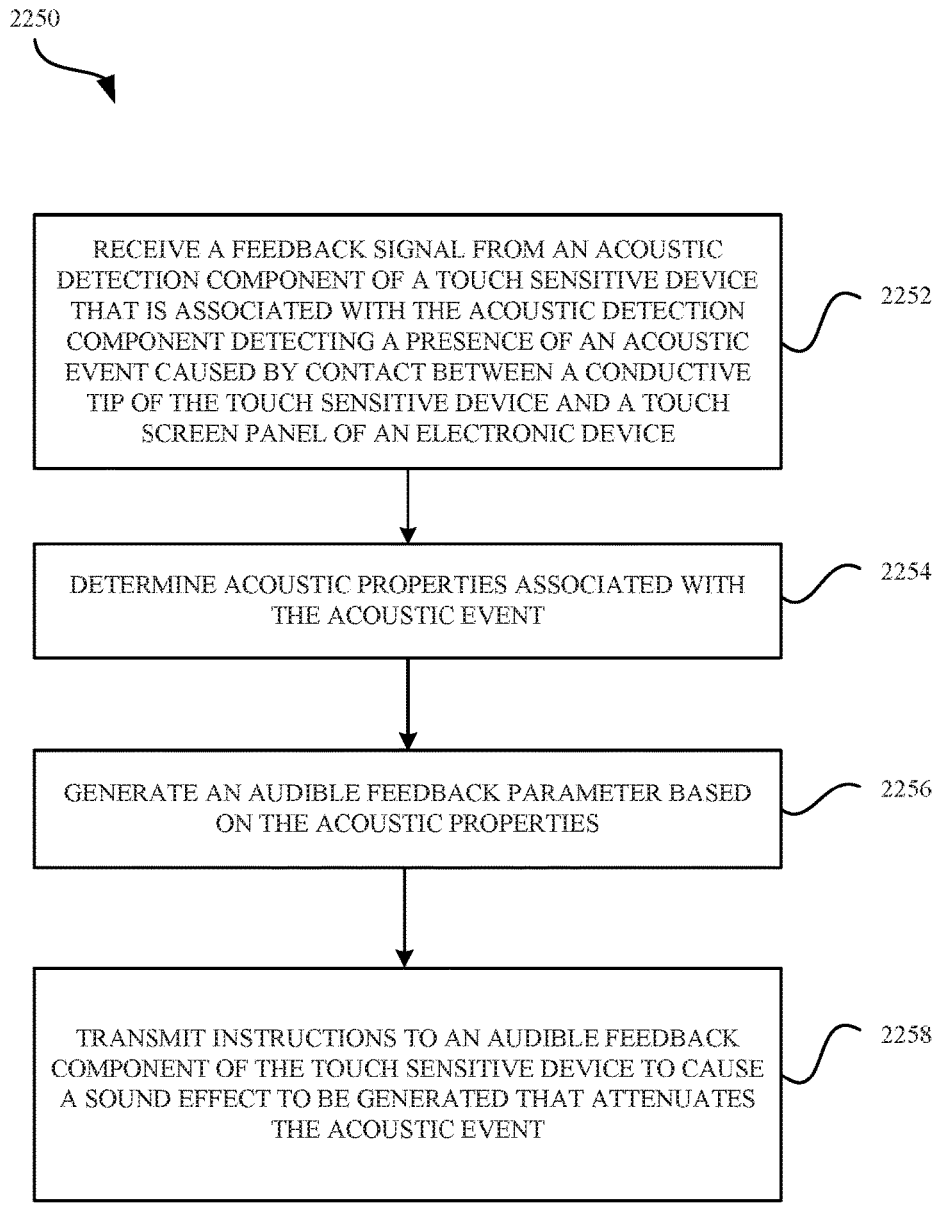
FIG. 22D illustrates a method for generating a sound effect by the touch sensitive device that attenuates an acoustic event that is detected, in accordance with some embodiments.

FIG. 22D illustrates a method 2250 for generating acoustic feedback by the touch sensitive device 1900 for attenuating or canceling the presence of an acoustic event, according to some embodiments.

At step 2252, the controller 1930 receives a feedback signal from the acoustic detection component 1992 that is associated with the acoustic detection component 1992 detecting the presence of an acoustic event caused by the touch sensitive device 1900 coming into contact/changing the type of contact/separating from contact with the touch screen panel 152 of the electronic device 1850. The acoustic detection component 1992 can determine acoustic properties associated with the acoustic event, such as frequency, wavelength, amplitude, sound decibels, origination and direction of the acoustic event, and the like at step 2254. The acoustic properties can be included in the feedback signal that is provided to the controller.

At step 2256, the controller 1930 can generate an audible feedback parameter that is based on the detected acoustic properties of the presence of the acoustic event. In some embodiments, the audible feedback parameter can additionally be based on the audible feedback preference selected by the user.

At step 2258, the controller 1930 can transmit the audible feedback parameter as instructions to an audible feedback component 1990 to cause a sound effect to be generated. In contrast to some of the other embodiments described, the sound effect that is generated purposefully attenuates or minimizes the presence of the acoustic event. In some embodiments, the sound effect can achieve noise cancellation of the acoustic event.

Figure 23A:
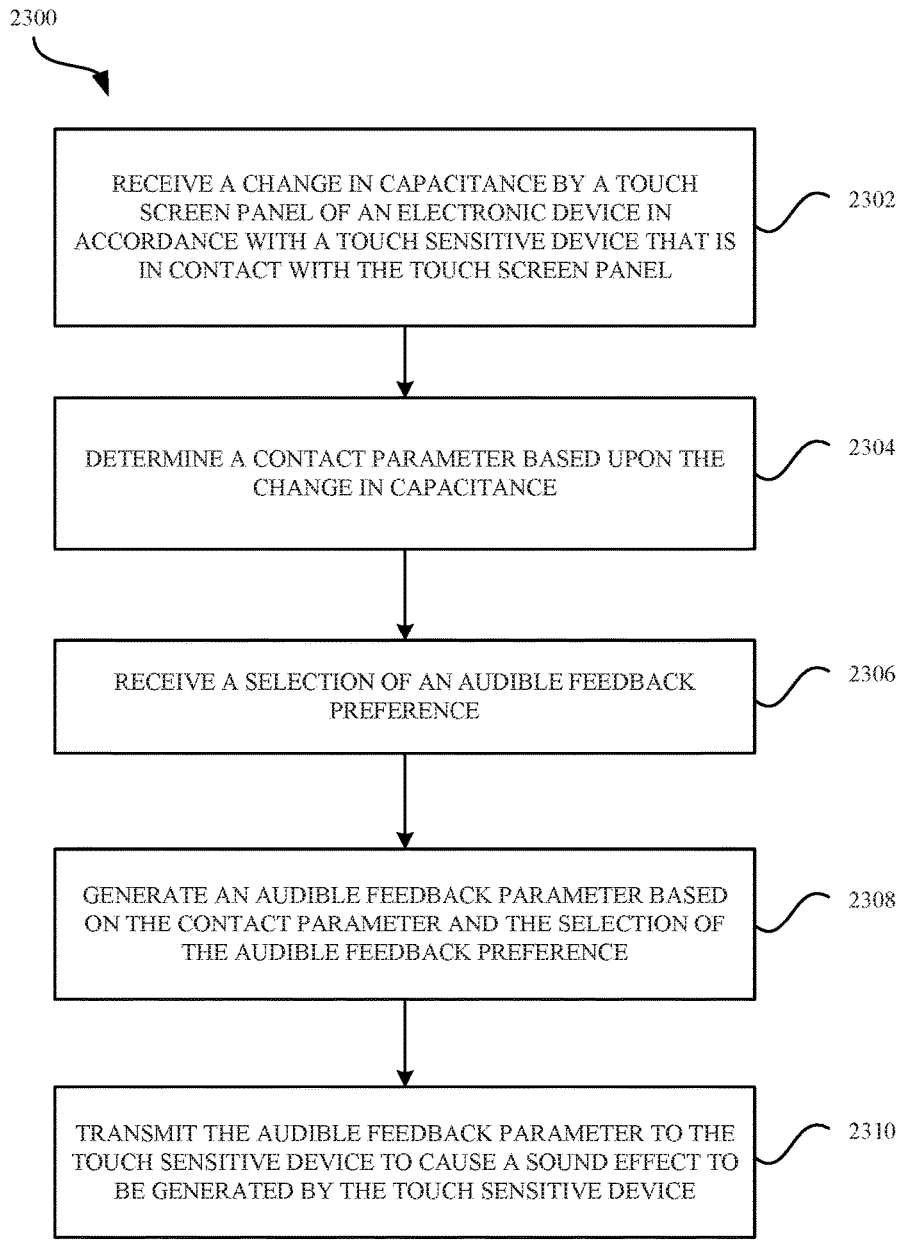
FIG. 23A illustrates a method for generating a sound effect by the electronic device, in accordance with some embodiments.

FIG. 23A illustrates a method 2300 for generating an audible feedback parameter by the electronic device 1850. As shown in FIG. 23A, the method begins at step 2302, where in conjunction with the conductive tip 1910 of the touch sensitive device 1900 coming into contact/changing the type of contact/separating from contact with the touch screen panel 152 of the electronic device 1850, a capacitive sensor of the touch screen panel 152 detects a change in capacitance (e.g., change in voltage). At step 2304, the processor can determine a contact parameter based upon the detected change in capacitance. The contact parameter can be derived by the controller 1930 from the change in capacitance, where the contact parameter can refer to at least one of a distance ($D_1$) traveled by the conductive tip 310, acceleration ($A_1$) of the conductive tip 1910, velocity ($V_1$) of the conductive tip 1910, force ($F_1$) applied by the conductive tip 1910 against the touch screen panel 152, and an angle ($\theta_1$) between the conductive tip 1910 and the touch screen panel 152.

At step 2306, the processor (see e.g., ref 2430 of FIG. 24) of the electronic device 1850 receives a selection of an audible feedback preference in conjunction with the application 1820 receiving a selection of the audible feedback preference. Subsequently, at step 2308, the processor can generate an audible feedback parameter that combines the electrical signal associated with the selection of the audible feedback preference and the electrical signal associated with the contact parameter. The audible feedback parameter can be subsequently transmitted to the touch sensitive device 1900 via an antenna (see e.g., ref 2470 of FIG. 24) at step 2310.

Figure 23B:
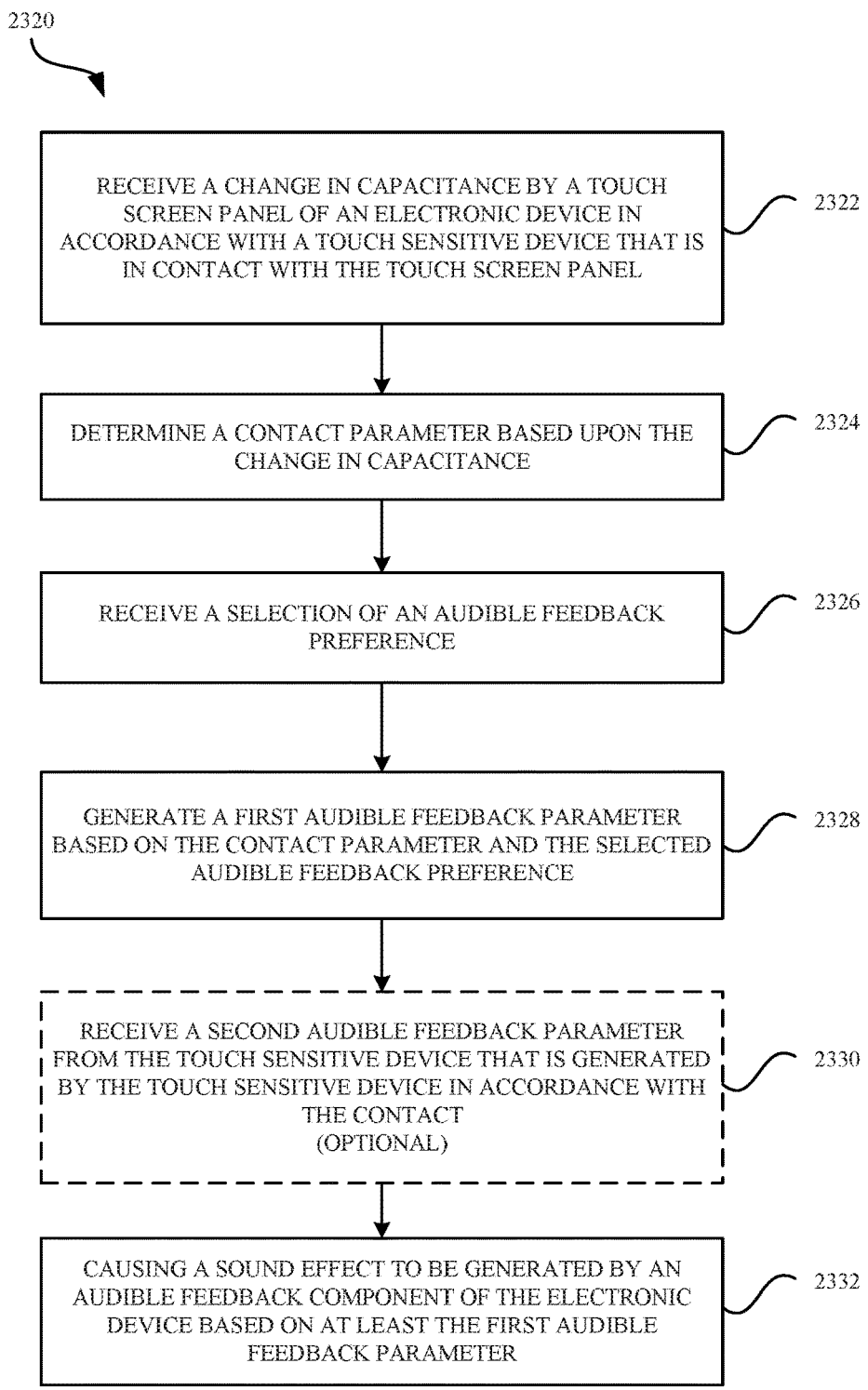
FIG. 23B illustrates a method for generating a sound effect by the electronic device, in accordance with some embodiments.

FIG. 23B illustrates a method 2320 for generating an audible feedback parameter by the electronic device 1850. As shown in FIG. 23B, the method begins at step 2322, where in conjunction with the conductive tip 1910 of the touch sensitive device 1900 coming into contact/changing the type of contact/separating from contact with the touch screen panel 152 of the electronic device 1850, a capacitive sensor of the touch screen panel 152 detects a change in capacitance (e.g., change in voltage). At step 2324, the processor can determine a contact parameter based upon the detected change in capacitance. The contact parameter can be derived by the controller 1930 from the change in capacitance, where the contact parameter can refer to at least one of a distance ($D_1$) traveled by the conductive tip 310, acceleration ($A_1$) of the conductive tip 1910, velocity ($V_1$) of the conductive tip 1910, force ($F_1$) applied by the conductive tip 1910 against the touch screen panel 152, and an angle ($\theta_1$) between the conductive tip 1910 and the touch screen panel 152.

At step 2326, the processor (see e.g., ref 2430 of FIG. 24) of the electronic device 1850 receives a selection of an audible feedback preference in conjunction with the application 1820 receiving a selection of the audible feedback preference. Subsequently, at step 2328, the processor can generate a first audible feedback parameter that combines the electrical signal associated with the selection of the audible feedback preference and the electrical signal associated with the contact parameter. Thereafter, at step 2330, the processor can optionally receive a second audible feedback parameter that is generated by the touch sensitive device 1900 in accordance with the contact. In some embodiments, the second audible feedback parameter is generated independently by the touch sensitive device 1900 (i.e., without receiving instructions/electrical signals from the electronic device 1850).

At step 2332, the processor can cause a sound effect to be generated by the audible feedback component (see e.g., 2480 of FIG. 4), where the sound effect is based on at least the first audible feedback parameter. In some examples, the sound effect is based on both the first audible feedback parameter and the second audible feedback parameter. In some embodiments, the sound effect can be generated based on instructions generated by the processor. In the embodiments described in FIGS. 22-23, both the electronic device 1850 and the touch sensitive device 1900 can generate a sound effect that is based on the contact between the electronic device 1850 and the touch sensitive device 1900.

Figure 24:
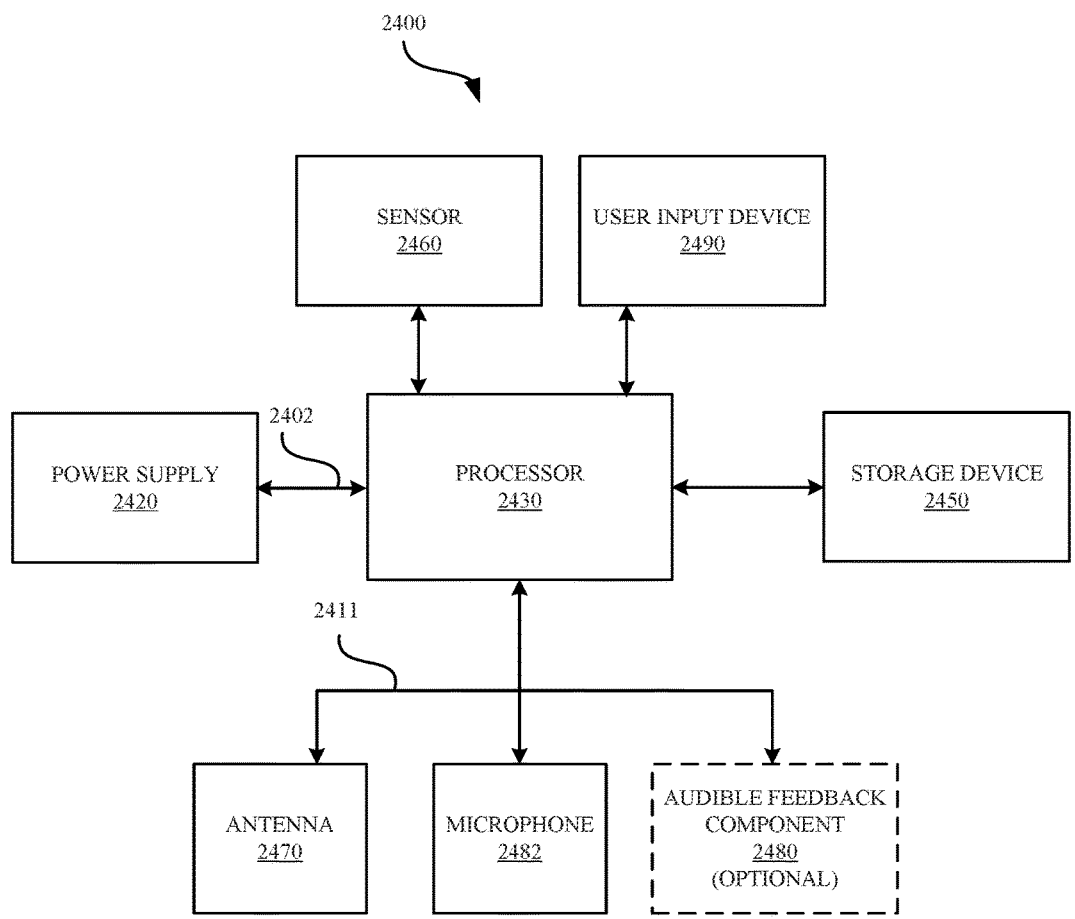
FIG. 24 illustrates a block diagram of an electronic device that can be used to implement the various components described herein, in accordance with some embodiments.

FIG. 24 illustrates a block diagram of an electronic device 2400 that can be used to implement the various components described herein, according to some embodiments. In particular, the detailed view illustrates various components that can be included in the electronic device 1850 illustrated in FIG. 18. As shown in FIG. 24, the electronic device 2400 can include a processor 2430 for controlling the overall operation of the electronic device 2400. The electronic device 2400 can also include a user input device 2490 that allows a user of the electronic device 2400 to interact with the electronic device 2400. For example, the user input device 2490 can take a variety of forms, such as a touch screen panel 152. The user input device 2490 can include a sensor 2460 (e.g., capacitance sensor). Still further the user input device 2490 can include a touch screen panel 152 that can be controlled by the processor 2430 to display information to the user. A data bus 2402 can facilitate data transfer between at least a storage device 2450 and the processor 2430. The electronic device 2400 can also include a network/bus interface 2411 that couples a wireless antenna 2470 (communications unit) to the processor 2430.

In some embodiments, the electronic device 2400 can optionally include an audible feedback component 2480 that is configured to generate a sound effect based on the audible feedback parameter. In some examples, the audible feedback parameter can be generated by the processor 2430 of the electronic device 2400 in conjunction with the contact. In some embodiments, where the audible feedback component 2480 includes a plurality of speakers that each include transducers that are independently actuatable and positioned about the periphery of the user input device 1490 (e.g., touch screen panel 152), the processor 2430 can cause the sound effect to be localized to a specific speaker. The localization of the sound effect can be based upon the position of the physical input associated with the contact between the conductive tip 1910 of the touch sensitive device 1900 and the touch screen panel 152. For example, if contact takes place at the touch screen panel 152 at a lower, right hand corner of the touch screen panel 152, then the processor 2430 can generate instructions that causes the electronic signal associated with a sound effect to be transmitted to only the speaker adjacent to the lower, right hand corner of the touch screen panel 152. In this manner, the user only perceives a sound from the lower, right hand corner that is consistent with the position of the physical input of the conductive tip 1910.

In some embodiments, the electronic device 2400 can optionally include an acoustic detection unit or microphone 2482 that can be configured to measure ambient sound that is associated with the acoustic event caused by contact between the conductive tip 1910 of the touch sensitive device 1900 and the touch screen panel 152. For example, the microphone 2482 can measure the amount of ambient sound associated with tapping against the touch screen panel 152, pressing against the touch screen panel 152, sliding against the touch screen panel 152, and the like. The microphone 2482 can associate a waveform of the ambient sound with an initial digital signal. The processor 2430 can be configured to analyze the waveform of the ambient sound to generate an inverted digital signal (or phase shift digital signal). Subsequently, the inverted digital signal can be amplified, where the audible feedback component 2480 can be configured to generate a sound effect that is proportional to the amplitude of the waveform of the initial digital signal. In this configuration, the audible feedback component 2480 can be configured to perform noise-canceling, attenuation, or minimization of the ambient, such as through a destructive interference process. In this manner, the electronic device 2400 can be configured to minimize or eliminate the ambient sound associated with the physical input such that the sound effect based on the audible feedback parameter is more clearly perceived by the user or to minimize ambient sound associated with tapping or slide the conductive tip 1910 against the touch screen panel 152. In some embodiments, the audible feedback component 2480 can counteract the ambient sound by adjusting the harmonic frequency of the oscillation or vibration of the mass of the audible feedback component 2480. In some embodiments, the audible feedback component 2480 is disposed at the conductive tip 1910, and oscillation or vibration of the mass of the audible feedback component 2480 against the conductive tip 1910 can counteract or minimize the ambient sound.

The electronic device 2400 also includes a storage device 2450, which can comprise a single disk or multiple disks (e.g., hard drives), and includes a storage management module that manages one or more partitions within the storage device 2450. In some embodiments, the storage device 2450 can include flash memory, semiconductor (solid state) memory or the like. The computing device 2450 can also include a Random Access Memory (RAM) and a Read-Only Memory (ROM). The ROM can store programs, utilities or processes to be executed in a non-volatile manner. The RAM can provide volatile data storage, and stores instructions related to the operation of the electronic device 2400.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

Figure 25:
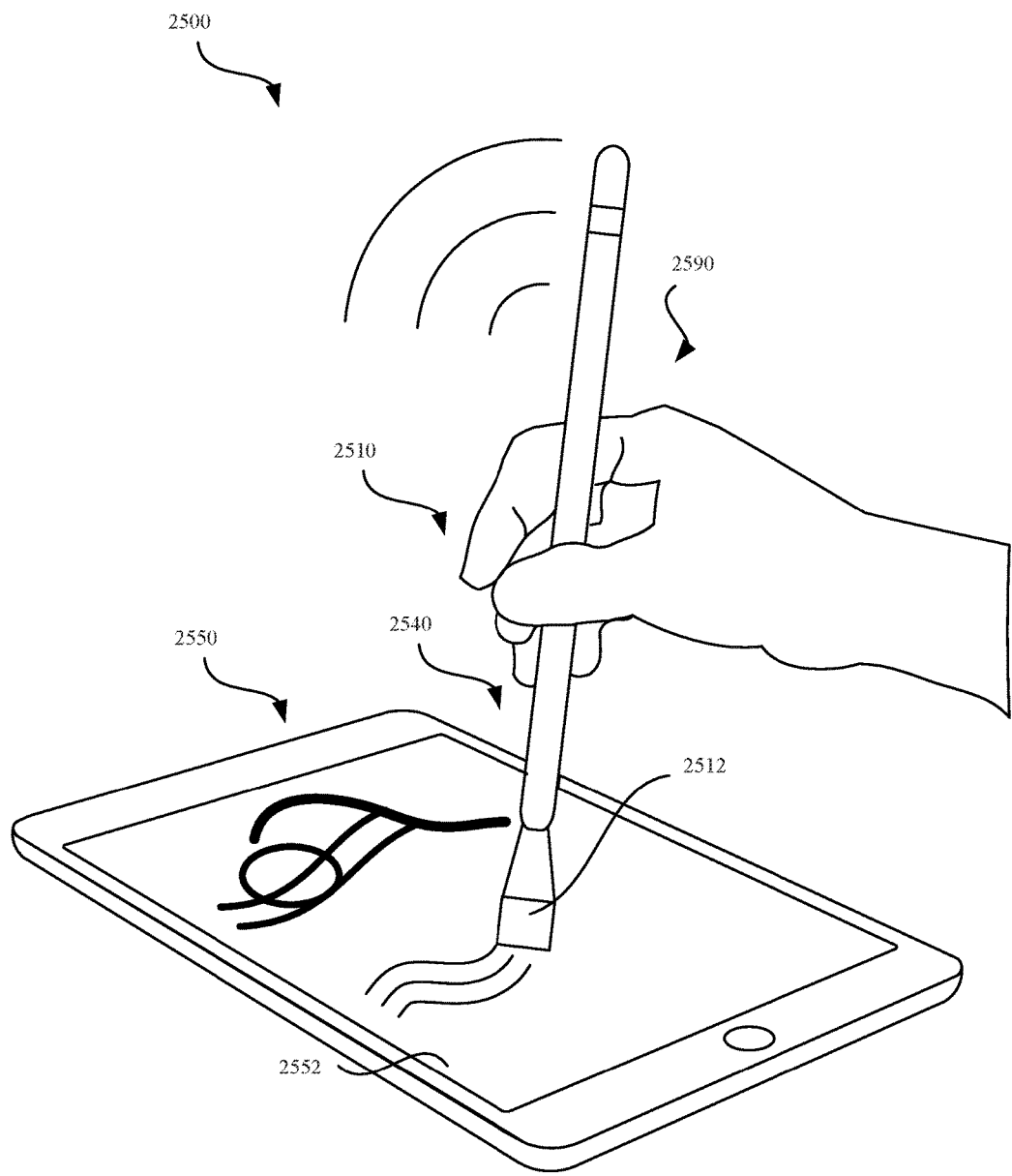
FIG. 25 illustrates a perspective view of a system for generating feedback characteristics by a touch sensitive device, in accordance with some embodiments.

FIG. 25 illustrates a perspective view of a system 2500 for generating feedback characteristics in conjunction with contact between the touch sensitive device 2510 and an electronic device 2550. The touch sensitive device 2510 is configured to be physically manipulated by a user to contact a touch screen panel 2552 of the electronic device 2550. In some embodiments, the touch sensitive device 2510 includes a plurality of strands 2512. In some embodiments, the strands 2512 can also be referred to as tips, contact members, or conductive tips. Each of the strands 2512 can be comprised of a material that is flexible and elastic, such as a shape memory metal. The strands 2512 can be referred to as flexible strands, flexible contact members, or flexible tips. Each strand 2512 includes a conductive component (e.g., electrode) at a distal end of the strand 2512 that is configured to independently receive an capacitive current to detect a change in capacitance. In some embodiments, the touch sensitive device 2510 includes a capacitive sensor. In some examples, an amount of the capacitive current corresponds to an amount of physical force applied by the touch sensitive device 2510 against the touch screen panel 2552. In some embodiments, the touch sensitive device 2510 includes both a capacitive sensor and a strain gage. The strain gage can be configured to detect a strain measurement of each strand 2512. In some embodiments, the strain gage can utilize the strain measurement to detect a position of the strand 2512. In this manner, each strand 2512 can be associated with a different capacitance/strain measurement. In some embodiments, the change in flex, bend, or deformation of the strands 2512 can be defined as contact properties or physical properties. Subsequently, a controller of the touch sensitive device 2510 can generate a feedback characteristic that is based on the capacitive/strain measurement. The touch sensitive device 2510 can be configured to transmit a feedback characteristic to the electronic device 2550 via an antenna, where the feedback characteristic can be implemented by a processor 2430 of the electronic device 2400 as a digital input to be displayed by the touch screen panel 2552. By utilizing the embodiments of the touch sensitive device 2510 described herein, the touch screen panel 2552 can be configured to generate digital input that is more accurate and realistic of the user's intentions when compared to conventional software means.

In some embodiments, the touch sensitive device 2510 can include a haptic feedback component 2540 (e.g., 140 of FIG. 1) and an audible feedback component 2589 (e.g., 190 of FIG. 1) that can be configured to generate haptic feedback and a sound effect based on the feedback characteristic that is generated. In some embodiments, the haptic feedback and sound effect can be generated independently of the feedback characteristic.

In some embodiments, the processor of the electronic device 2550 can combine the user feedback preference with the feedback characteristic to generate the digital input. For example, if the feedback characteristic corresponds to a wide stroke, but the user feedback preference dictates that the user-selected media preference is a fine-tip pencil, then the application can cause the digital input to resemble a thin line. This is in contrast to an application that only relies upon the feedback characteristic to execute the digital input, whereupon the application would cause the digital input to resemble a wide stroke.

In some embodiments, the electronic device 2550 can be configured to run an application that executes a graphic presentation program. In some embodiments, the application can be configured to store one or more specific user profiles. The application can be configured to learn from a specific user's physical input of the touch sensitive device 2510 in conjunction with the touch screen panel 2552, whereupon the application can adapt the physical input provided by the touch sensitive device 2510 to execute digital input that is particular to the specific user. For example, if a specific user consistently executes forceful gestures of the strand 2512 against the touch screen panel 2552, the capacitive sensor of the touch sensitive device 2510 can consistently detect a large amount of force. Subsequently, the controller of the touch sensitive device 2510 can provide instructions to the electronic device 2550 that correspond to drawing a wide brush stroke in the application. However, over time, the application can adapt to the specific user's preferences and provide granularity between different types of forceful gestures that are detected. For example, over time, the application can determine that a minimal physical input by a specific user is approximately 3 N, while a maximal physical input is approximately 10 N. Initially, 3 N of force can correspond to a wide brush stroke in the application. Over time, the application can establish 3 N of force as a baseline input, which can correspond to a thin brush stroke in the application. In this manner, the application can associate a user feedback preference with each specific user that can be combined with the feedback characteristic in conjunction with generating a digital input.

Figure 26:
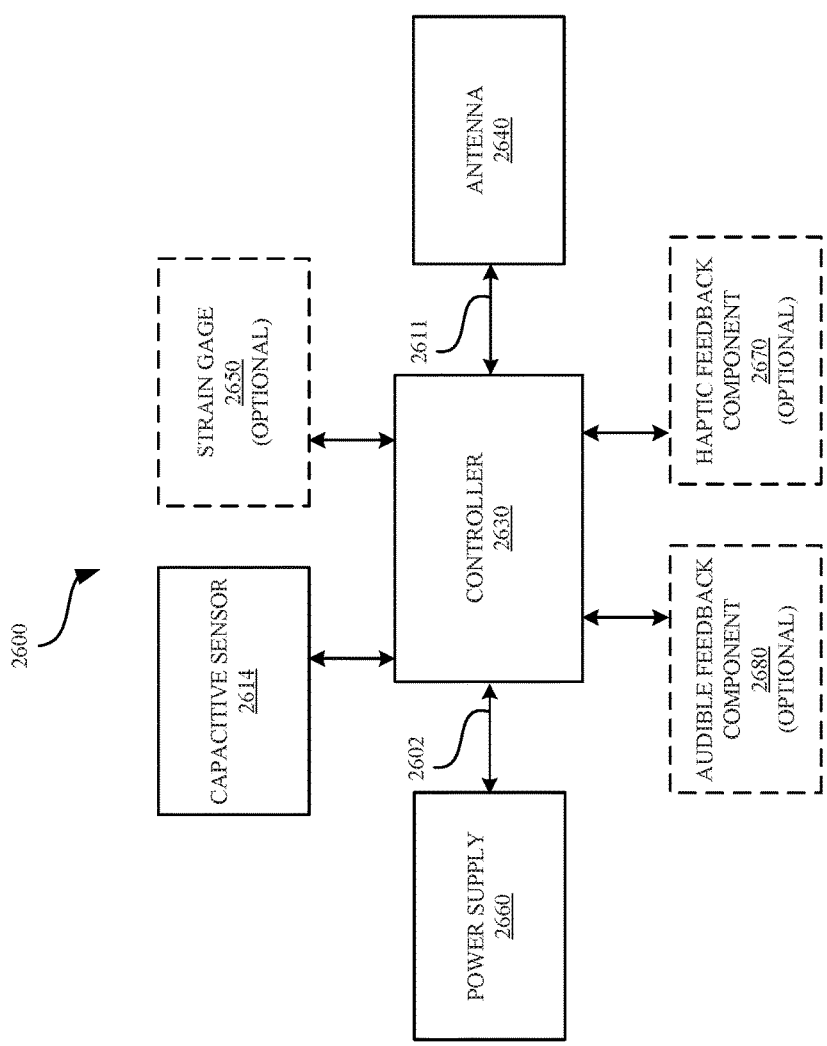
FIG. 26 illustrates a block diagram of a touch sensitive device, in accordance with some embodiments.

FIG. 26 illustrates a block diagram of a touch sensitive device 2600 that can be used to implement the various components described herein, according to some embodiments. In particular, the detailed view illustrates various components that can be included in the touch sensitive device 2600 as illustrated in FIG. 25. In some embodiments, the touch sensitive device 2600 can incorporate or include any of the elements of any of the touch sensitive devices described throughout this specification. For example, the touch sensitive device 2600 can incorporate the haptic feedback component 140 as described in FIG. 1. As shown in FIG. 26, the touch sensitive device 2600 can include a controller 2630 for controlling the overall operation of the touch sensitive device 2600. The controller 2630 can be configured to receive a capacitance signal detected by a capacitive sensor 2614. The capacitive sensor 2614 can receive a capacitance signal from a conductive component (e.g., electrode) included in each individual strand 2512 of the touch sensitive device 2600. In some embodiments, the touch sensitive device 2600 optionally includes a strain gage 2650 that can be configured to detect a strain measurement provided by each strand 2512. Accordingly, the controller 2630 can be configured to combine at least the capacitance signal (and the strain measurement) to generate a feedback characteristic. The feedback characteristic can be transmitted by a wireless antenna 2640 to the electronic device 2400, whereupon the electronic device 2400 can receive the feedback characteristic via antenna 2470. The processor 2430 of the electronic device 2400 can generate a digital input in an application (e.g., graphics presentation program) that is based on the feedback characteristic. In some embodiments, the processor 2430 of the electronic device 2400 can be configured to receive a user feedback preference via the application. In some embodiments, the change in flex, bend, or deformation of the strands 2512 can be defined as contact properties or physical properties.

The touch sensitive device 2610 can also include a network/bus interface 2611 that couples the wireless antenna 2640 to the controller 2630. The controller 2630 can be electrically coupled to a power supply 2660 via a bus 2602. The wireless antenna 2640 can be configured to provide electrical signals that are associated with the feedback characteristic to the electronic device 2400.

In some embodiments, the touch sensitive device 2510 also includes a haptic feedback component 2670 and an audible feedback component 2680. The controller 2630 can be configured to convert the feedback characteristic to a haptic feedback parameter to be provided to the haptic feedback component 2670 to generate haptic feedback. The controller 2630 can be configured to convert the feedback characteristic to an audible feedback parameter to be provided to the audible feedback component 2680 to generate audible feedback.

FIGS. 27A-27F illustrate perspective views of various embodiments of the plurality of strands 2712 that can be included in the touch sensitive device 2700. In some embodiments, the strand 2712 are provided in a swappable tip 2710 that is releasably coupled to a distal end of an elongated body 2702 of the touch sensitive device 2700. In some embodiments, the strand 2712 is provided as part of a swappable tip 2710 that extends through an opening 2708 of a distal end of the elongated body 2702. The elongated body 2702 can include walls that define a cavity. In this configuration, a variety of swappable tips 2710 can be utilized in the touch sensitive device 2700, where each swappable tip 2710 includes a plurality of strands 2700 and each strand 2712 having a different size, pattern, dimension, shape, and the like. In one example, the swappable tip 2710 can have a single conductive tip. In another example, the swappable tip 2710 can have a plurality of conductive tips that can be each individually configured to provide a respective capacitive measurement.

Figure 27A:
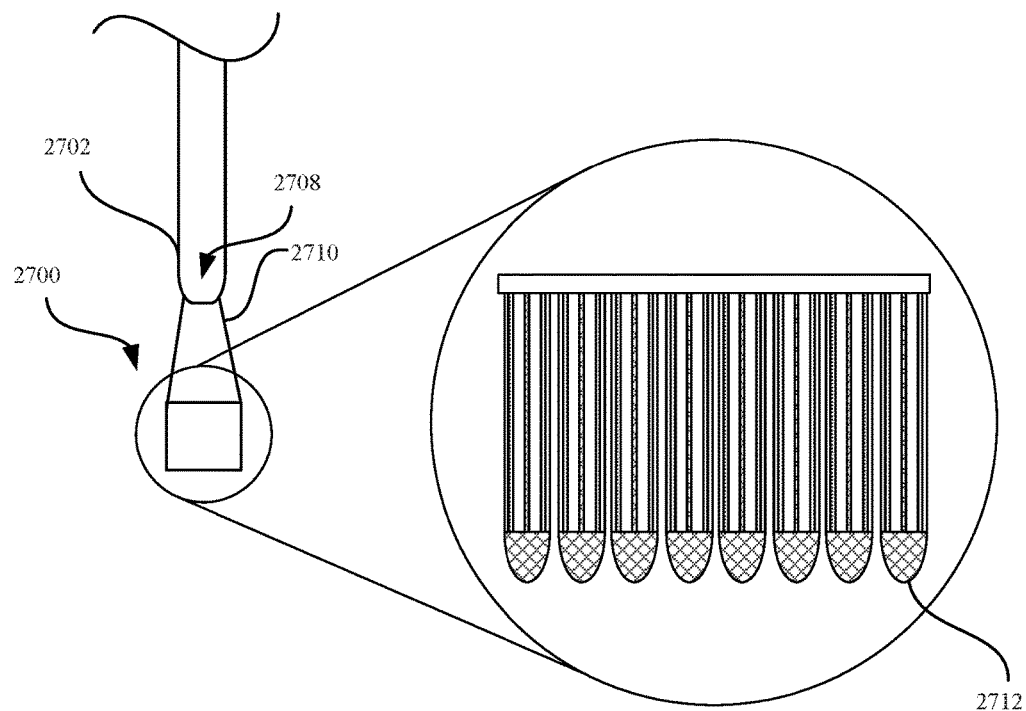
FIGS. 27A-27F illustrate perspective views of strands that can be included in the touch sensitive device, in accordance with various embodiments.

FIG. 27A shows a plurality of strands 2712 that are included at a distal end of the touch sensitive device 2700. FIG. 27A shows that each strand 2712 is substantially elongated. Moreover, each strand 2712 is substantially similar in length, width, shape, size, and the like. In this configuration, each strand 2712 can be characterized as having a similar cross-sectional area. In addition, each strand 2712 can be comprised of similar flexible and elastic materials, which can be characterized according to Young's modulus, which refers to the relationship between stress (force per unit area) and strain (proportional deformation) in the material.

Figure 27B:
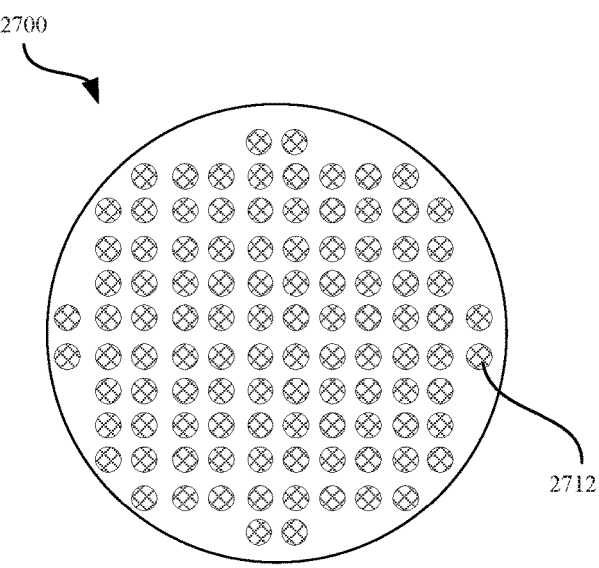

FIG. 27B illustrates a bottom view of the touch sensitive device 2700 of FIG. 27A, in conjunction with showing that the plurality of strands 2712 can be arranged in a substantially uniform pattern. In other examples, the plurality of strands 2712 can be arranged in non-uniform pattern or irregular pattern. In some other examples, the plurality of strands 2712 can be arranged in a polygonal shape, elliptical shape, and the like.

Figure 27C:
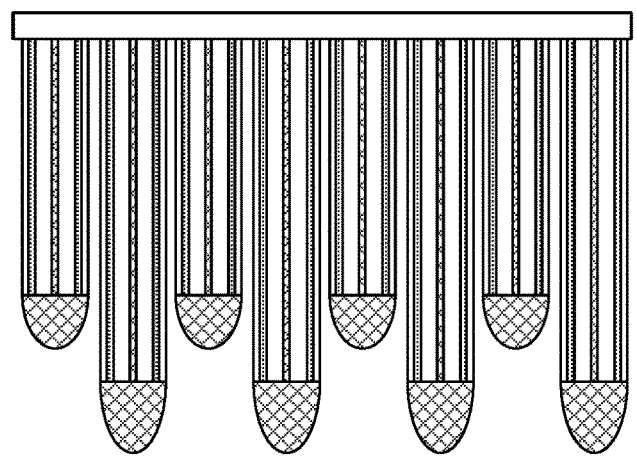

FIG. 27C illustrates a perspective view of a plurality of strands 2712 that are included at a distal end of the touch sensitive device 2700, in accordance with some embodiments. FIG. 28C shows that each strand 2712 is substantially elongated. Furthermore, FIG. 28C shows that each of the plurality of strands 2712 can have varying lengths.

Figure 27D:
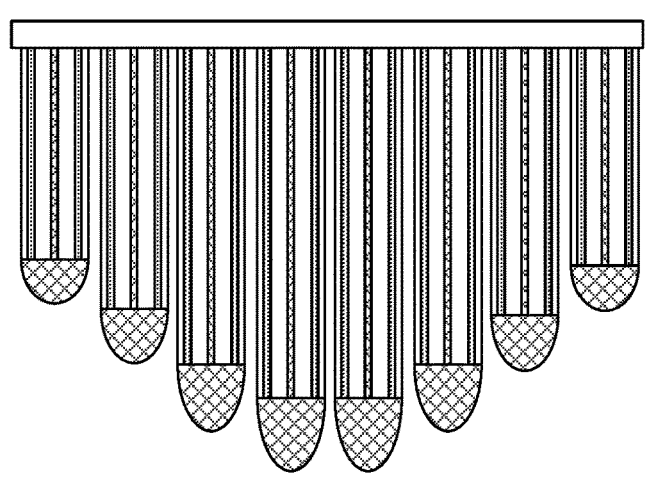

FIG. 27D illustrates a perspective view of the plurality of strands 2712 that are included at a distal end of the touch sensitive device 2700, in accordance with some embodiments. FIG. 27D shows that each strand 2712 is substantially elongated. In addition, adjacent strands 2712 can be of varying lengths such that the plurality of strands 2712 become substantially more tapered along a medial axis of the touch sensitive device 2700.

Figure 27E:
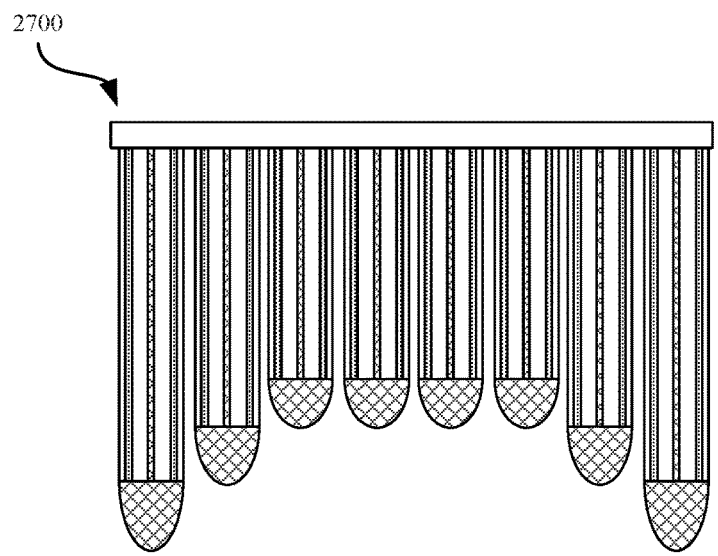

FIG. 27E illustrates a perspective view of the plurality of strands 2712 that are included at a distal end of the touch sensitive device 2700, in accordance with some embodiments. FIG. 27E shows that each strand 2712 is substantially elongated. In addition, adjacent strands 2712 can be of varying lengths such that the plurality of strands become progressively longer away from a medal axis of the touch sensitive device 2700.

Figure 27F:
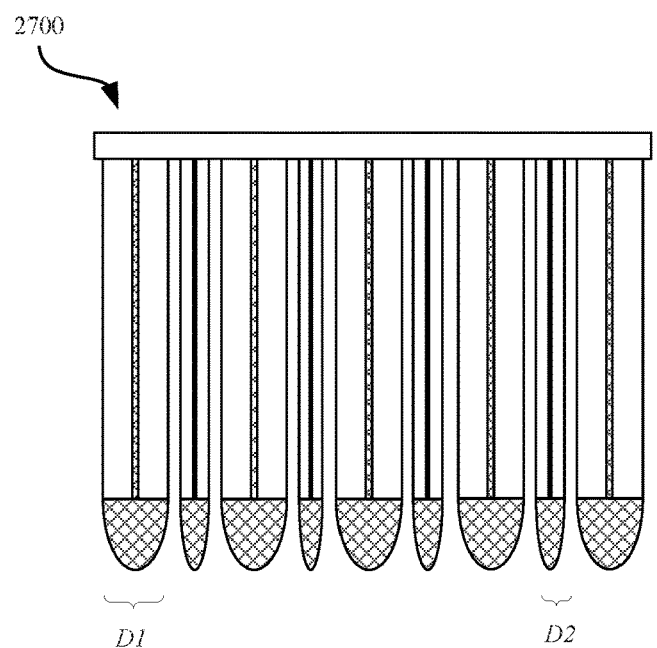
Figure 29A:
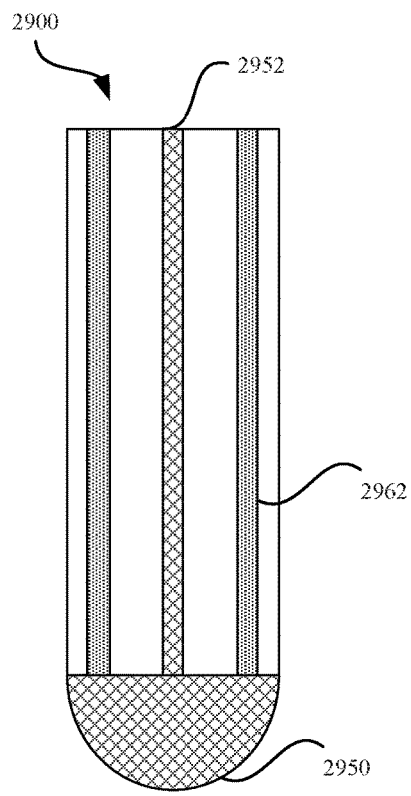
FIGS. 29A-29B illustrate a cross-sectional view and a top view of a strand of the touch sensitive device, in accordance with some embodiments.

FIG. 27F illustrates a perspective view of the plurality of strands 2712 that are included at a distal end of the touch sensitive device 2700, in accordance with some embodiments. FIG. 27F shows that adjacent strands 2712 can be of varying widths (D1) and (D2). In some examples, the adjacent strands 2712 can be of varying widths in a repeating pattern.

FIGS. 28A-28B illustrate perspective views of the touch sensitive device 2800 in contact with the electronic device 2550, in accordance with some embodiments as shown in FIG. 25. FIG. 28A illustrates a perspective view of the touch sensitive device 2800, where each of the plurality of strands 2812 are being dragged across the touch screen panel 2852 according to a similar direction and under a similar amount of force. FIG. 28A illustrates that when the strands 2812 of the touch sensitive device 2800 make contact with the touch screen panel 2852 of the electronic device 2550, a capacitive component (e.g., electrode) 2814 included on each strand 2812 can be configured to detect a change in capacitance. The change in capacitance can be transmitted to a capacitive sensor 2614 via a capacitive sensor wire. The change in capacitance can be provided in an electrical signal. The capacitive component 2814 can be configured to determine a change in capacitance that corresponds to an amount of force ($F_1$) that is applied by the strand 2812 against the touch screen panel 2852. In some examples, the capacitive component 2814 is configured to utilize the change in capacitance to determine when the strand 2812 makes contact with the touch screen panel 2852 to create an electrical pathway, when the strand 2812 changes position on the touch screen panel 2852, and when the strand 2812 breaks contact from the touch screen panel 2852 to sever the electrical pathway. Accordingly, the capacitive sensor 2614 can provide the electrical signal that corresponds to the change in capacitance to the controller 2630, whereupon the controller 2630 can generate a feedback characteristic. In some embodiments, the amount of force that is detected by the capacitive sensor 2614 can be proportional to the digital input that is provided by the application of the electronic device 2550. For example, a greater amount of force that is detected by the capacitive sensor 2614 can correlate with a wide brush stroke, while a smaller amount of detected force can indicate a thinner brush stroke. In another example, the amount of force that is detected by the capacitive sensor 2614 can correspond to lifting the strand 2812 from the touch screen panel 2852 (e.g., lifting a brush stroke).

In some embodiments, each strand 2812 includes a strain wire that is electrically coupled to a strain gage, as described in more detail with reference to FIGS. 29-32. Each strain wire is configured to elongate in response to deforming or bending the strand 2812 in conjunction with contact between the touch sensitive device 2800 and the touch screen panel 2852. The strain gage can generate a strain measurement that corresponds to an amount of load that is exerted against the strain wire. For example, an electrical resistance of the strain gage varies in proportion to the amount of strain in each strain wire. The controller 2630 can receive an electrical signal that is based on the strain measurement. In some embodiments, the strain measurement can indicate a directionality of the position of the strand 2812. For example, the strain measurement can provide X-axis/Y-axis directionalities. In some embodiments, the position and direction of the digital input that is provided by the application of the electronic device 2550 can be proportional to the strain measurement that is detected. Where the strain gage 2650 receives multiple strain measurements from the plurality of strain wires, the strain gage 2650 can generate more detailed strain measurement feedback. For example, a positive strain measurement can correspond to elongate of a first strain wire, while a negative strain measurement can correspond to compression of a second strain wire. Subsequently, the different strain measurements can indicate a change in directionality/position of a digital input on the touch screen panel 2852 that corresponds to each change in physical input of the first and second strain wires.

In some embodiments, where the touch sensitive device 2800 includes a strand 2812 having both a capacitive sensor wire and a strain wire, the controller 2630 can generate a texture feedback characteristic by combining force with x-axis/y-axis directionality.

The strain measurement generated by the strain gage 2650 can refer to a ratio between the amount of change in a length of material relative to an initial length of the material in response to deformation of the material, or represented by the formula: $\varepsilon = \Delta L/L$. A positive strain measurement corresponds to elongation of the material, while a negative strain measurement corresponds to compression of the material. In some embodiments, the strain wire can provide a measurement of various types of strain, including axial, bending, shear, and torsional strain. Axial strain can refer to how much the material stretches or compresses as a result of force that is applied in a linear direction. Bending strain can refer the amount of stretch on one side of the material and the amount of contraction on an opposite side of the material. Shear strain can refer to an amount of deformation that occurs from a linear force. Torsional strain can refer to an amount of deformation that occurs from a circular force.

In some embodiments, the amount of strain that is measured by the strain wire can be calculated according to the formula: $\varepsilon = F*L*y/I*E$. In some embodiments, the amount of strain that is measured by the strain wire can be calculated according to the formula: $\varepsilon = F/A*E$. In some embodiments, c (strain measurement), F (force from usage), A (cross-sectional area), y (distance from neutral axis), L (length of strand), E (Young's Modulus of strand material), and I (moment of inertia).

FIG. 28B illustrates a perspective view of the touch sensitive device 2800 that shows that each strand 2812 can be actuated to independently deflect or deform in a manner that is substantially different from each other. For example, FIG. 28B shows that each of strands 2812a, 2812b, 2812c, 2812*d* can be individually deflected such that a corresponding strain wire/capacitive sensor wire of each strand 2812*a*, 2812*b*, 2812*c*, 2812*d* can provide an independent strain measurement/capacitive change, respectively.

FIGS. 29-32 illustrate various embodiments of the strands 2512 of the touch sensitive device 2510. FIGS. 29A-29B illustrate a cross-sectional view and a top view of a strand 2900 of the touch sensitive device 2510 in accordance with some embodiments, respectively. As shown in FIG. 29A, the strand 2900 includes a capacitive component 2950 that is positioned at a distal end of the strand 2900. The capacitive component 2950 is electrically coupled to the capacitive sensor 2614 via an inner capacitive sensor wire 2952, where the inner capacitive sensor wire 2952 is surrounded by flexible substrate material 2912. The inner capacitive sensor wire 2952 is surrounded by flexible substrate material 2912 which enables the strand 2900 to flex or deform in response to a load that is applied to the strand 2900. FIG. 29B illustrates that the strand 2900 includes a plurality of strain wires 2962 that are positioned along the periphery of the strand 2900. Each strain wire 2962 extends from a proximal end of the strand 2900 to the capacitive component 2950. In response to bending or deforming the strand 2900 under load, each strain wire 2962 can be configured to elongate. Each strain wire 2962 can be configured to detect strain measurements that are proportional to the amount of force that deforms the strand 2900. FIG. 29A illustrates that the plurality of strain wires 2962 are equally positioned relative to one another and from the inner capacitive sensor wire 2952. For example, FIG. 29B illustrates that the strain wires 2962 are positioned opposite one another to facilitate providing equal and opposite strain fields in the strand 2900. Under normal loading conditions (e.g., the strand 2900 is not bent), each strain wire 2962 is subjected to an equal amount of compression. However, under non-axial or side-loading compressions (e.g., deforming the strand 2900), each strain wire 2962 can provide a different strain measurement that translates to an amount of load that is applied to the corresponding surface of the strand 2900. In this configuration, each strain wire 2962 can provide a different strain measurement to the controller 2630 that is indicative of the amount of deformation of the corresponding surface of the strand 2900.

Figure 30A:
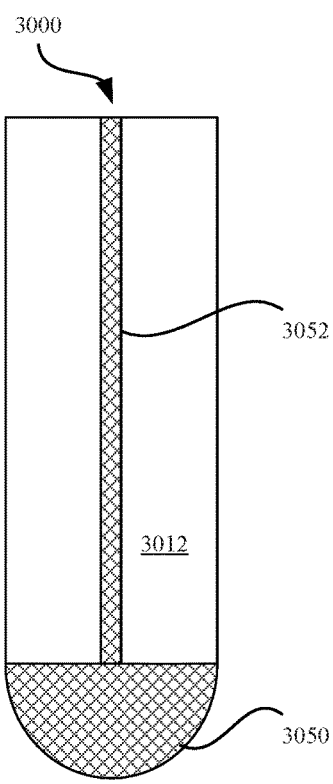
FIGS. 30A-30B illustrate a cross-sectional view and a top view of a strand of the touch sensitive device, in accordance with some embodiments.
Figure 29B:
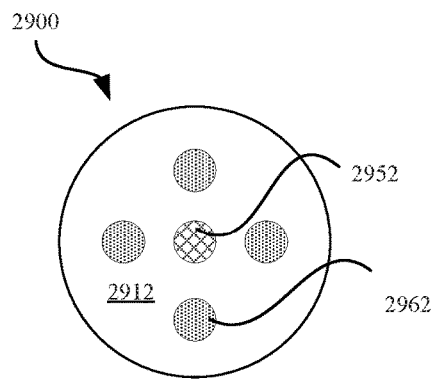
Figure 30B:
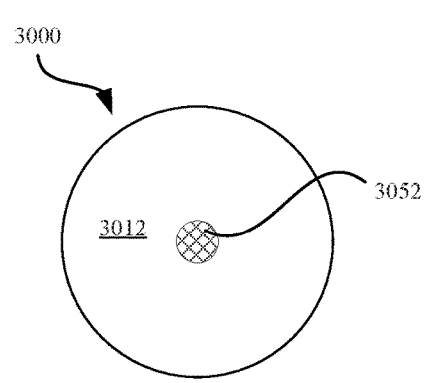

FIGS. 30A-30B illustrate a cross-sectional view and a top view of a strand 3000 of the touch sensitive device 2510 in accordance with some embodiments, respectively. As shown in FIG. 30A, the strand 3000 includes a capacitive component 3050 that is positioned at a distal end of the strand 3000. The capacitive component 3050 is electrically coupled to the capacitive sensor 2614 via an inner capacitive sensor wire 3052. The inner capacitive sensor wire 2352 is surrounded by flexible substrate material 2312 which enables the strand 3000 to flex or deform in response to a load that is applied to the strand 3000. As shown in FIG. 30B, the capacitive sensor wire 3052 is included along the center of the flexible substrate material 3012. The capacitive component 3050 is configured to detect a change in capacitance based upon the amount of force in conjunction with contact between the capacitive component 3050 and the touch screen panel 2552. In some examples, the amount of force that is detected can be utilized to modify a width of the brush stroke that is displayed on the touch screen panel 2552.

Figure 31A:
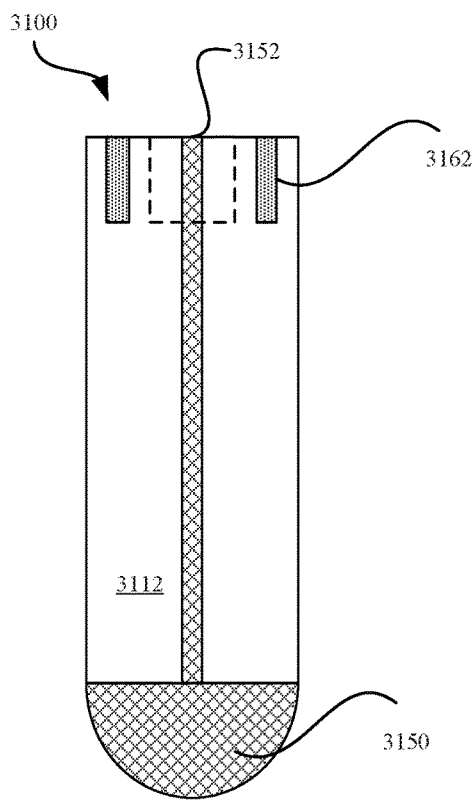
FIGS. 31A-31B illustrate a cross-sectional view and a top view of a strand of the touch sensitive device, in accordance with some embodiments.
Figure 31B:
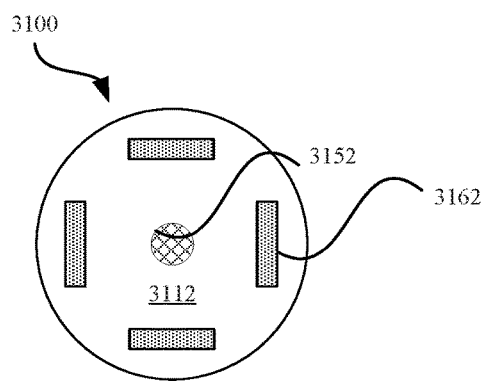

FIGS. 31A-31B illustrate a cross-sectional view and a top view of a strand 3100 of the touch sensitive device 2510 in accordance with some embodiments, respectively. As shown in FIG. 31A, the strand 3100 includes a capacitive component 3150 that is positioned at a distal end of the strand 3100.

The capacitive component 3150 is electrically coupled to the capacitive sensor 2614 via an inner capacitive sensor wire 3152, where the inner capacitive sensor wire 3152 is surrounded by flexible substrate material 3112. The combination of the flexible substrate material 3112 and the inner capacitive sensor wire 3152 can function as a cantilever beam structure. FIG. 31A illustrates that the flexible substrate material 3112 includes a plurality of strain gages 3162 that are positioned along the periphery of the strand 3100 and localized at the proximal end of the strand 3100. In such a configuration, the flexible substrate material 3112 and inner capacitive sensor wire 3152 are more freely able to flex or bend without interference from strain gages 3162 positioned along the majority of the length of the strand 3100. The strain gages 3162 can be bonded to the flexible substrate material 3112. Each strain gage 3162 can be configured to detect strain measurements that are proportional to the amount of force that deforms the strand 3100. As the strand 3100 is configured to flex at the proximal end of the strand 3100, by positioning each strain gage 3162 at the proximal end of the strand 3100, can cause a more accurate indication of the amount of deformation within the strand 3100.

FIG. 31B illustrates that the plurality of strain gages 3162 are equally positioned from one another and equally positioned relative to the inner capacitive sensor wire 3152. For example, FIG. 31B illustrates that the strain gages 3162 are positioned opposite one another to facilitate providing equal and opposite strain fields in the strand 3100. Under normal loading conditions (e.g., the strand 3100 is not bent), each strain gage 3162 is subjected to an equal amount of compression. However, under non-axial or side-loading compressions (e.g., deforming the strand 3100), each strain gage 3162 can provide a different strain measurement that translates to an amount of load that is applied to the corresponding surface of the strand 3100. In this configuration, each strain gage 3162 can provide a different strain measurement to the controller 2630 that is indicative of the amount of deformation of the corresponding surface of the strand 3100.

Figure 32A:
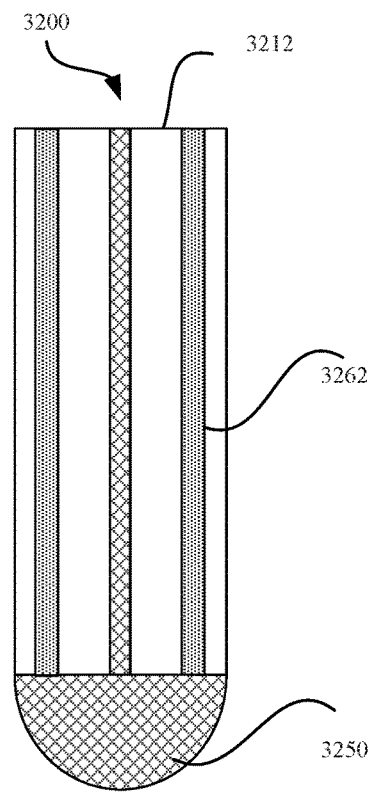
FIGS. 32A-32B illustrate a cross-sectional view and a top view of a strand of the touch sensitive device, in accordance with some embodiments.
Figure 32B:
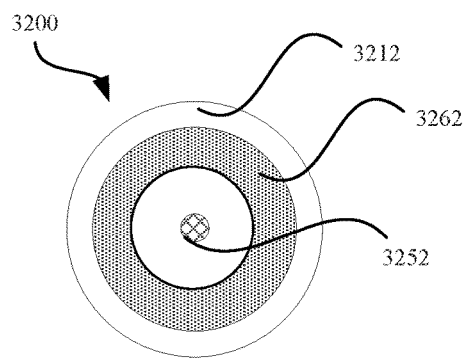

FIGS. 32A-32B illustrate a cross-sectional view and a top view of a strand 3200 of the touch sensitive device 2510 in accordance with some embodiments, respectively. As shown in FIG. 32A, the strand 3200 includes a capacitive component 3250 that is positioned at a distal end of the strand 3200. The capacitive component 3250 is electrically coupled to the capacitive sensor 2614 via an inner capacitive sensor wire 3252, where the inner capacitive sensor wire 3252 is surrounded by flexible substrate material 3212. FIG. 32A illustrates the strand 3200 includes a plurality of strain wires 3262 that are positioned along the periphery of the strand 3200. The strain wires 3262 extend along the length of the strand 3200 and are electrically coupled to the strain gage 2650. The inner capacitive sensor wire 3252 is surrounded by flexible substrate material 3212 which enables the strand 3200 to flex or deform in response to a load that is applied to the strand 3200. In turn, a strain wire 3262 surrounds the inner capacitive sensor wire 3252. As shown in FIG. 32B, the inner capacitive sensor wire 3252 and the strain wire 3262 have a coaxial configuration. In response to bending or deforming the strand 3200 under load, the strain wire 3262 can be configured to elongate. In response to bending or deforming the strand 3200, the strain wire 3262 can provide a varied strain measurement that translates to an amount of load that is applied to the strand 3200.

Figure 33:
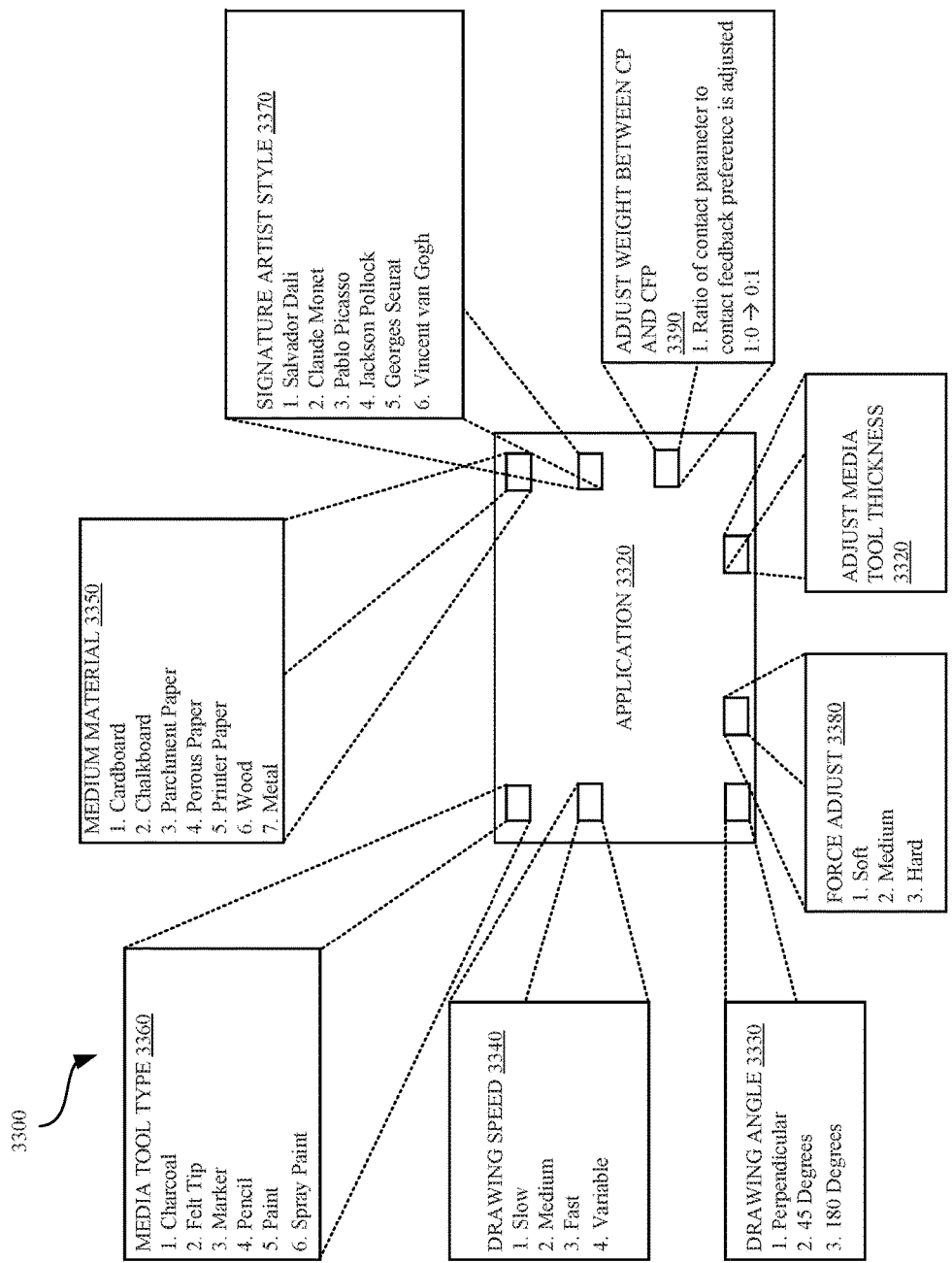
FIG. 33 illustrates a block diagram of an exemplary list of contact feedback preferences associated with an application, in accordance with some embodiments.

FIG. 33 illustrates a system diagram of an application 3320 that is configured to be executed by a processor (see e.g., 2430 of FIG. 24) of the electronic device 2550. The application 3320 can be configured to execute a graphics presentation program. In some embodiments, the application 3320 is configured to receive a graphical input in conjunction with physical contact between the touch sensitive device 2510 and the electronic device 2550. In some examples, the input can be provided by a user's finger(s), a stylus, or the touch sensitive device 2510, or other embodiments of the touch sensitive device as described herein. For example, the application 3320 can receive a graphical input in conjunction with the electronic device 2550 detecting a change in capacitance via the touch sensitive device 2510. The electronic device 2550 includes a touch screen panel 2552 that includes capacitive sensors that are configured to detect the capacitive input provided by the touch sensitive device 2510 and process different contact parameters of the capacitive input, including the speed of the input, the force of the input, the position of the input, the acceleration of the input, the angle of the input relative to the touch screen panel, and the like. The processor 2430 of the electronic device 2550 can process the different contact parameters detected by the capacitive sensors in conjunction with generating an audible feedback parameter.

In some embodiments, the application 3320 can be configured to receive a user selection of a contact feedback preference. Subsequently, the processor 2430 of the electronic device 2550 is configured to generate a modified display output by combining an electrical signal associated with the different contact parameters with an electrical signal associated with the contact feedback preference.

FIG. 33 illustrates a system view of an exemplary list of contact feedback preferences associated with data items 1860 that can be executed by the application 3320. The application 3320 can represent a graphics presentations program, such as Apple Keynote, produced by Apple Inc. In other examples, the application 1820 can represent a multimedia program, an illustrator program, a music player, a word processor, a web development program, and the like. The application 3320 can be configured to be executed by the electronic device 2550 in a manner similar to the system overview as shown in FIG. 18. The application 3320 can be configured to directly communicate with the storage device 1840. In some embodiments, the storage device 1840 can include a data item 1860 managed by the application 3320. In conjunction, the application 3320 can request the data item 1860 from the storage device 1840. In one example, the data item 1860 refers to an contact feedback preference that can be selected by the user.

In another example, the data item 1860 refers to a contact feedback preference that can be dynamically selected by the application 3320 in conjunction with determining that there is contact between the touch sensitive device 2510 and the electronic device 2550. For example, the processor (see e.g., 2430 of FIG. 24) of the electronic device 2550 can be configured to determine that a plurality of different contact parameters are concurrently detected by the capacitive sensors 2460 of the electronic device 2550 in accordance with a swappable tip 2710 that includes a plurality of conductive tips (e.g., paintbrush). Accordingly, when the processor 2430 of the electronic device 2550 receives a plurality of capacitive measurements, the processor 2430 can be configured to dynamically select a contact feedback preference (i.e., without user selection of a contact feedback preference) that indicates that the touch sensitive device 2510 includes a swappable tip 2710 that resembles the paintbrush. Accordingly, the processor 2430 can cause an electrical signal associated with the contact feedback preference to be dynamically combined with electrical signals associated with the plurality of contact parameters to generate a plurality of feedback characteristics to be displayed on the touch screen panel 2552.

As shown in FIG. 33, the exemplary list of contact feedback preferences includes: "Adjust Media Tool Thickness" 3320, "Drawing Angle" 3330, "Drawing Speed" 3340, "Medium Material" 3350, "Media Tool Type" 3360, "Signature Artist Style" 3370, "Force Adjust" 3380, and "Adjust Weight 3390". The processor 2430 is configured to generate a digital signal associated with the contact feedback preference. In some embodiments, the processor 2430 of the electronic device 2550 can combine an electrical/digital signal associated with the contact feedback preference with an electrical/digital signal with a contact parameter (generated by the electronic device 2550 or the touch sensitive device 2510) to generate a contact feedback characteristic. Accordingly, the application 3320 can cause a specific one or more contact preferences to be associated with a contact parameter. For example, the application 3320 can associate a plurality of contact feedback preferences with a single contact parameter. Alternatively, the application 3320 can associate a single contact feedback preference with a plurality of contact parameters.

In some embodiments, the application 3320 provides a graphical user interface (GUI) that permits for the user to select the contact feedback preferences.

In one example, the user can select "Media Tool Type" 3360, whereupon the application 3320 provides a list of options for generating a contact feedback characteristic that is associated with the settings of textures/thicknesses/shapes/size/color that correspond to the media tool that is selected. For example, selection of the "Media Tool Type" can provide options for associating specific textures/thicknesses/shapes/size/color to a specific type of media. The various types of media that can be selected include settings: 1) charcoal; 2) felt tip; 3) marker; 4) pencil; or 5) paint. In one example, charcoal is associated with the settings of a specific texture/thickness/shape/size/color that is different from paint. Thus, by associating the media tool type of charcoal with the settings of the specific texture/thickness/shape/size/color can generate a contact feedback characteristic combines the detected change in capacitance and/or strain measurement with the contact feedback preference selected, where the contact feedback characteristic can be output on the touch screen panel 2552.

In another example, the user can select "Media Tool Type" 3360, whereupon the user is provided with a list of options, including: 1) charcoal; 2) felt tip; 3) marker; 4) pencil; 5) paint; and 6) spray paint. Each media tool type can be associated with a unique set of settings of texture/thickness/shape/size/color. For example, spray paint can be associated with an inconsistent spray pattern having more miniscule color particles, while paint can be associated with a more uniform pattern of larger color particles. In another example, pencil can be associated with a grey color, while charcoal can be associated with a single black color.

In some embodiments, the "Media Tool Type" 3360 option can be performed in conjunction with the capacitive sensor 2460 of the electronic device 2550, the capacitive sensor 2614 of the touch sensitive device 2510, and/or the strain gage 2650 of the touch sensitive device 2510. For example, the capacitive sensor 2460 can be configured to detect an amount of force that is applied against the touch screen panel 2552. Subsequently, the processor 2430 of the electronic device 2550 can combine the capacitive measurement with the contact feedback preference to generate a contact feedback characteristic. For example, if the force detected by the capacitive sensor 2460 is strong, but the "pencil" media tool type 3360 and the "soft" force adjustment 3380 are selected, then the electronic device 2550 can generate a sound effect that is more akin to a "soft" stroke of a pencil rather than a "hard" stroke of the pencil.

In some examples, each of the contact feedback preferences shown in FIG. 33 can be stored in the storage device 1840. In some examples, the application 3320 can rely upon machine-learning algorithm to learn a user's preferences and adjust a default preference to align more similarly to the user's preference so that the settings of each of the contact feedback preferences is adjusted to more closely correspond to a user's preferences. For example, if the application 3320 learns over time that the user selects the "Paint" selection of the "Media Tool Type" 3360, but then modifies the settings of the specific texture/thickness/shape/size/color associated with the "Paint" selection to have an opacity that resembles acrylic paints in contrast to an oil-based paint, then the application 3320 can dynamically apply the user settings to future selection of the "Paint" selection.

In some embodiments, since the controller 2630 of the touch sensitive device 2510 or the processor 2430 of the electronic device 2550 can be configured to combine the electrical signals associated with the contact feedback preference (CFP) with the electrical signals associated with the contact parameter (CP), the controller 2630 or the processor 2430 can be configured to adjust the amount of weight for each set of electrical signals. In some embodiments, the application 3320 can provide a contact feedback preference that can be selected to allow a user to adjust between the ratio of the contact feedback preference to the contact parameter that corresponds to the detected change in capacitance/strain measurement. For example, a user may want to place more weight on the contact feedback preference by assigning the CFP with a higher weighted value than the contact parameter. The ratio between CFP and CP can have a ratio ranging between 1:0 to 0:1. To adjust the weight between CFP and CP, the user can select the "Adjust Weight Between CP and CFP" 3390 to cause the application 3320 to adjust the amount of weight that the controller 2630/processor 2430 is configured to assign to the CFP and to the CP. For example, the application 3320 can assign a ratio 1:9 to assign more weight to the contact feedback preference. In another example, the application 3320 can adjust the ratio to 5:5 to assign an equal amount of weight to the contact feedback preference and the contact parameter.

Figure 34A:
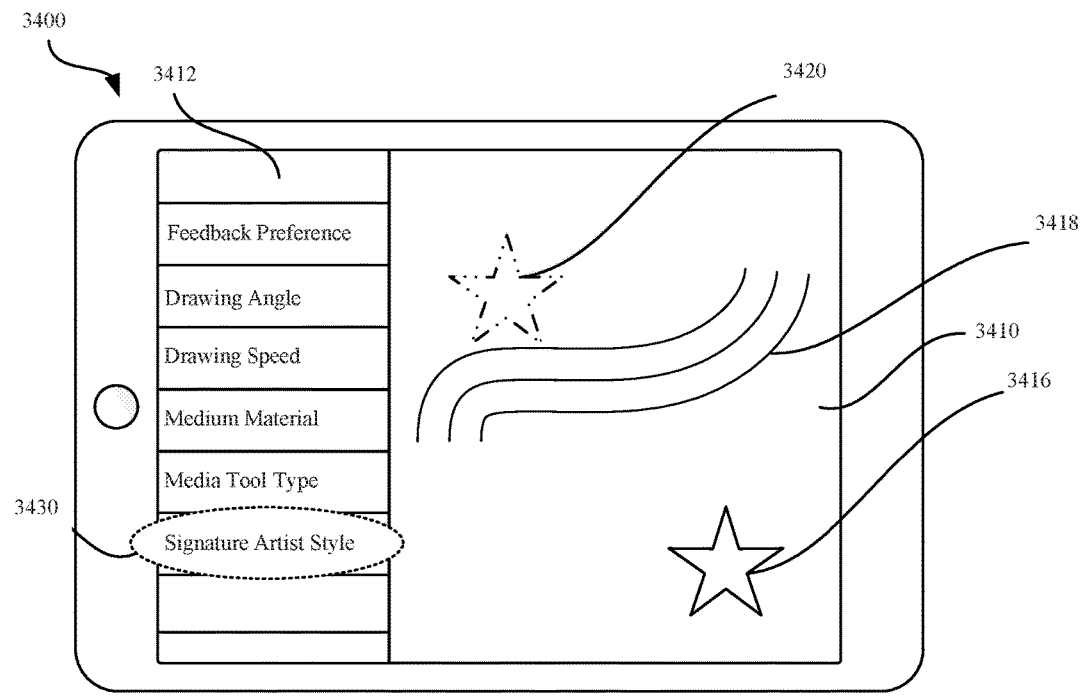
FIGS. 34A-34B illustrate a sequence diagram for selecting a contact feedback preference, in accordance with some embodiments.
Figure 34B:
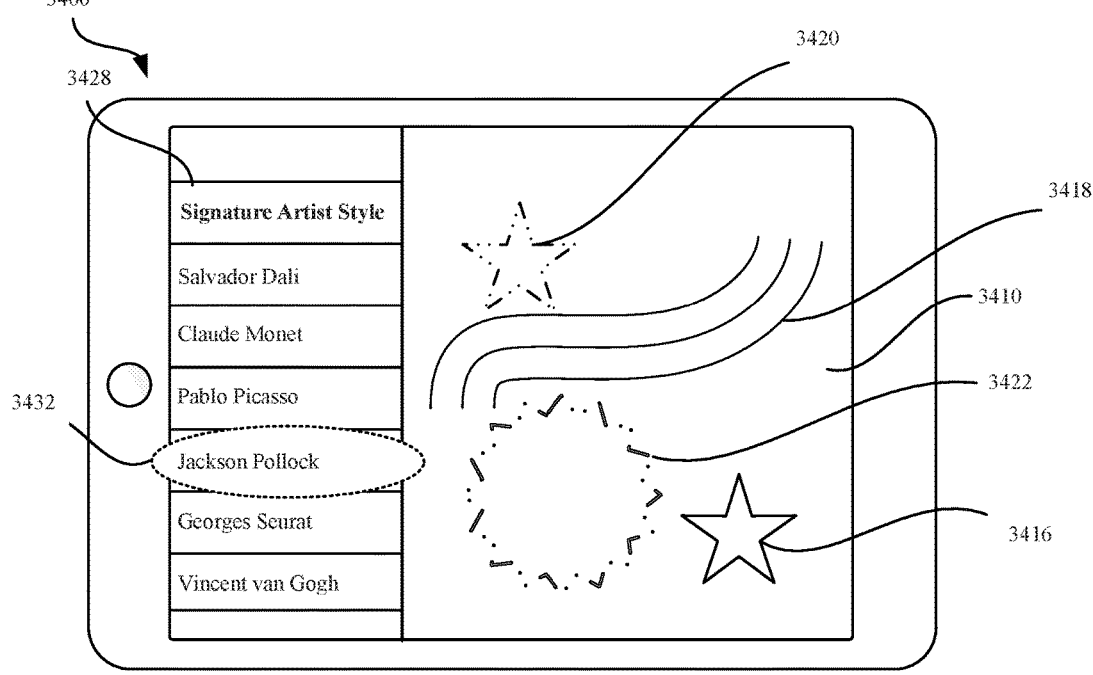

FIGS. 34A-34B illustrate a sequence diagram 3400 for associating a contact feedback preference with a contact parameter associated with contact between the touch sensitive device 2510 and the electronic device 2550, as described above in conjunction with the block diagram of FIG. 33. In particular, a user interface 3410 of the application 3320 can be configured to receive a selection of an contact feedback preference. As shown in FIG. 34A, a contact feedback preference menu 3412 is provided within the user interface 3410. The user can browse through the various types of contact feedback preferences, such as "Drawing Speed", "Medium Tool", or "Signature Artist Style" displayed by the contact feedback preference menu 3412. As shown in FIG. 34A, the user interface 3410 includes a plurality of media items 3416, 3418, and 3420. Each of the media items 3416, 3418, and 3420 can be generated via a touch sensitive device 2510 having a different type of strand 2712. For example, FIG. 34A shows that media item 3416 is a singular line that corresponds to a touch sensitive device 2510 having a single strand 2712. Furthermore, the media item 3418 shows three offset lines that corresponds to a touch sensitive device 2510 that has three separate strands 2712. Furthermore, the media item 3420 shows a dashed line that corresponds to the application 3320 associating a "Spray Paint" selection with a contact input provided by a touch sensitive device 2510 having a single strand 2712. In other words, the media item 3416 is generated without modification from a selection of one or more contact feedback preferences from the application 3320, while the media item 3420 represents a modification of the media item 3416 with modification of the "Media Tool Type" 3360.

As shown in FIG. 34A, a contact feedback preference 3430 labeled "Signature Artist Style" is selected by the user, which causes the application 3320 to generate a detailed window 3328 that illustrates the different types of artists associated with the "Signature Artist Style", which is illustrated in FIG. 34B.

As shown in FIG. 34B, the detailed window 3428 displays the different types of artists associated with the "Signature Artist Style". As shown in FIG. 34B, "Jackson Pollock" 3432 is selected, which causes the application 3320 to associate any existing media items 3416, 3418, 3420 or any subsequent contact inputs provided by the touch sensitive device 2510 with the "Jackson Pollock" selection. For example, any subsequent input 3422 (e.g., additional drawn lines) in the user interface 3410 that is received by the application 3320 is associated with the "Jackson Pollock" selection. As an example, selection of the "Jackson Pollock" style can cause the subsequent input to simulate unique set of settings of texture/thickness/shape/size/color of zero-friction that corresponds to dripping, drizzling, or pouring paint onto a canvas while generating a subsequent media item 3422. This is in contrast to the "Claude Monet" style which can be attributed to unique set of settings of texture/thickness/shape/size/color that correspond to repeatedly painting over previously applied strokes of paint so that there is more simulation of abrasion or friction between the paint brush and the canvas.

Additionally, any subsequent contact input is detected by the capacitive sensors of the touch screen panel 2552 of the electronic device 2550 in order to form a contact parameter. Alternatively, the subsequent contact input can be generated by the touch sensitive device 2510 and transmitted to the electronic device 2550 via antenna 2640. The contact parameter can refer to a strain gage measurement and a capacitive measurement. Examples of the contact parameter include angle, orientation, force, speed, acceleration, and the like. In conjunction with generating an audible feedback parameter, a processor of the electronic device 2550 is configured to combine the contact parameter with the contact feedback preference. Because the electric signal generated by the capacitive sensor of the touch screen panel 2552 can be an analog signal, the electronic device 2550 can optionally include an A/D converter that is configured to convert the analog signal into a digital signal. Accordingly, the processor of the electronic device 2550 is configured to combine the digital signal associated with the contact parameter and the digital signal associated with the contact feedback preference into a contact feedback characteristic. In some examples, the ratio between the contact parameter and the contact feedback characteristic is 50:50. In other examples, the contact feedback characteristic can include between about 0% contact parameter and 100% of the contact feedback preference to 100% contact parameter and 0% of the contact feedback preference. In some embodiments, the weight/ratio between the contact parameter and the audible feedback preference can be adjusted by the user.

In some embodiments, the processor 2430 of the electronic device 2550 can be configured to generate the contact feedback preference and the contact parameter. In some embodiments, the electronic device 2550 can receive a contact feedback characteristic from the touch sensitive device 2510, whereupon the electronic device 2550 can optionally combine the contact feedback characteristic with the contact feedback preference to cause a digital output (e.g., media item) to be displayed on the user interface 3410 of the application 3320.

Figure 35A:
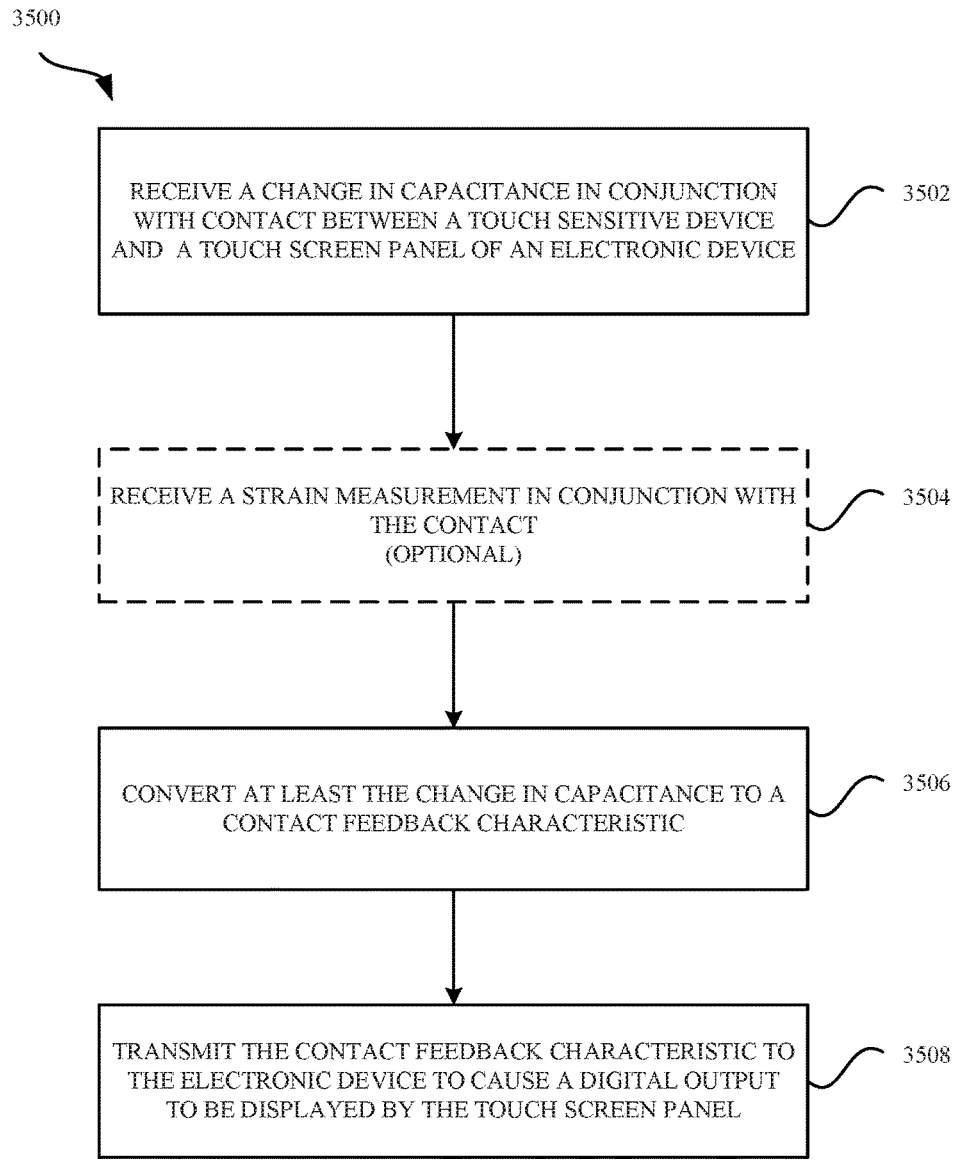
FIG. 35A illustrates a method for generating a contact feedback characteristic by the touch sensitive device, in accordance with some embodiments.

FIG. 35A illustrates a method 3500 for generating a contact feedback characteristic by the touch sensitive device 2510, in accordance with some embodiments. As shown in FIG. 34A, the method begins at step 3502, where in conjunction with contact between the touch sensitive device 2510 and a touch screen panel 2552 of the electronic device 2550, the touch sensitive device 2510 detects a change in capacitance. In some examples, the change in capacitance can correspond to at least one of the strands 2512 initially contacting the touch screen panel 2552, changing the type of contact with the touch screen panel 2552, and separating from contact with the touch screen panel 2552. The change in capacitance can be detected by a capacitive sensor 2614.

At step 3504, a strain measurement in conjunction with the contact between the touch sensitive device 2510 and the touch screen panel 2552 can be optionally detected by a strain gage 2650 of the touch sensitive device 2510.

At step 3506, the controller 2630 can convert at least the change in capacitance into an electrical signal that can be referred to as a feedback characteristic. In some embodiments, where the controller 2630 receives the change in capacitance and the strain measurement, the controller 2630 can convert both the change in capacitance and the strain measurement to separate electrical signals that can be subsequently combined to form one or more contact feedback characteristic.

At step 3508, the controller 2630 can transmit the contact feedback characteristic to the electronic device 2550 via antenna 2640, whereupon the electronic device 2550 generates a digital output to be displayed by the touch screen panel 2552 of the electronic device 2550 that is based on the contact feedback characteristic.

Figure 35B:
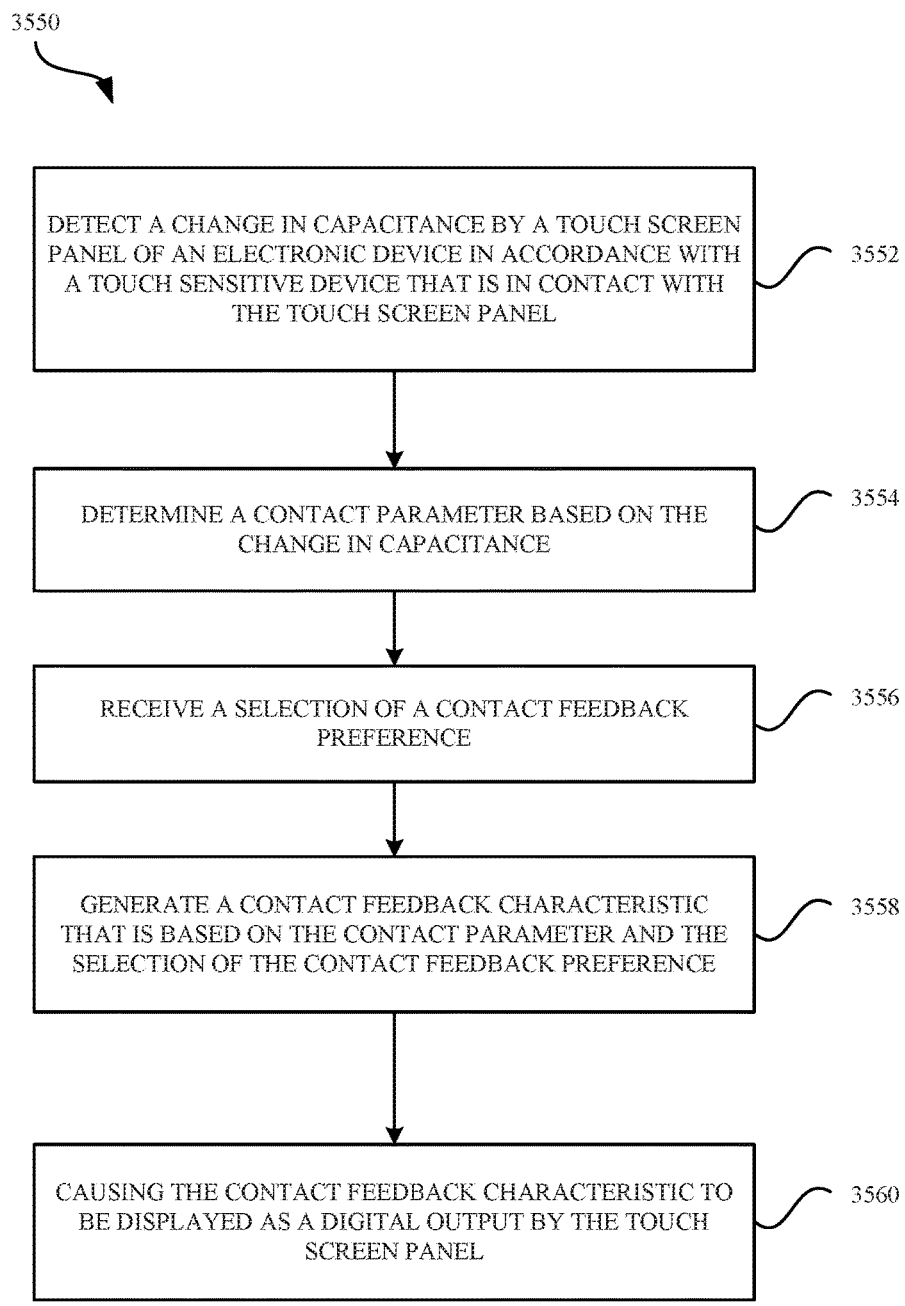
FIG. 35B illustrates a method for generating a contact feedback characteristic by the electronic device, in accordance with some embodiments.

FIG. 35B illustrates a method 3550 for generating a contact feedback characteristic by the electronic device 2550, in accordance with some embodiments. As shown in FIG. 35B, the method begins at step 3552, where in conjunction with contact between the touch sensitive device 2510 and the touch screen panel 2552 of the electronic device 2550, the touch sensitive device 2510 detects a change in capacitance. The change in capacitance can be detected by a capacitive sensor (see e.g., ref. 2460 of FIG. 24) associated with the touch screen panel 2552.

At step 3554, a processor 2430 of the electronic device 2550 can determine one or more contact parameters based on the change in capacitance.

At step 3556, the application 3320, that is configured to be executed by the processor 2430, can receive a selection of one or more contact feedback preferences.

At step 3558, the processor 2430 can be configured to generate a contact feedback characteristic in accordance with combining an electrical signal associated with the contact parameter and an electrical signal associated with the contact feedback preference. In some embodiments, the processor 2430 can adjust the amount of weight that is assigned to the contact parameter and to the contact feedback preference. In contrast to the contact feedback characteristic described in method 3500 of FIG. 35A, the contact feedback characteristic described with reference to method 3550 can involve modifying the media item that is displayed by the application 3320 via the contact feedback preference. In other words, without modification by the contact feedback preference, the contact feedback characteristic is based solely on the contact parameter. However, modification of the contact parameter via the contact feedback preference can cause the media item to be modified such that a different media item is displayed on the touch screen panel 2552.

At step 3560, the processor 2430 can cause a digital output that is based on the contact feedback characteristic to be displayed by the touch screen panel 2552 of the electronic device 2550.

Figure 36:
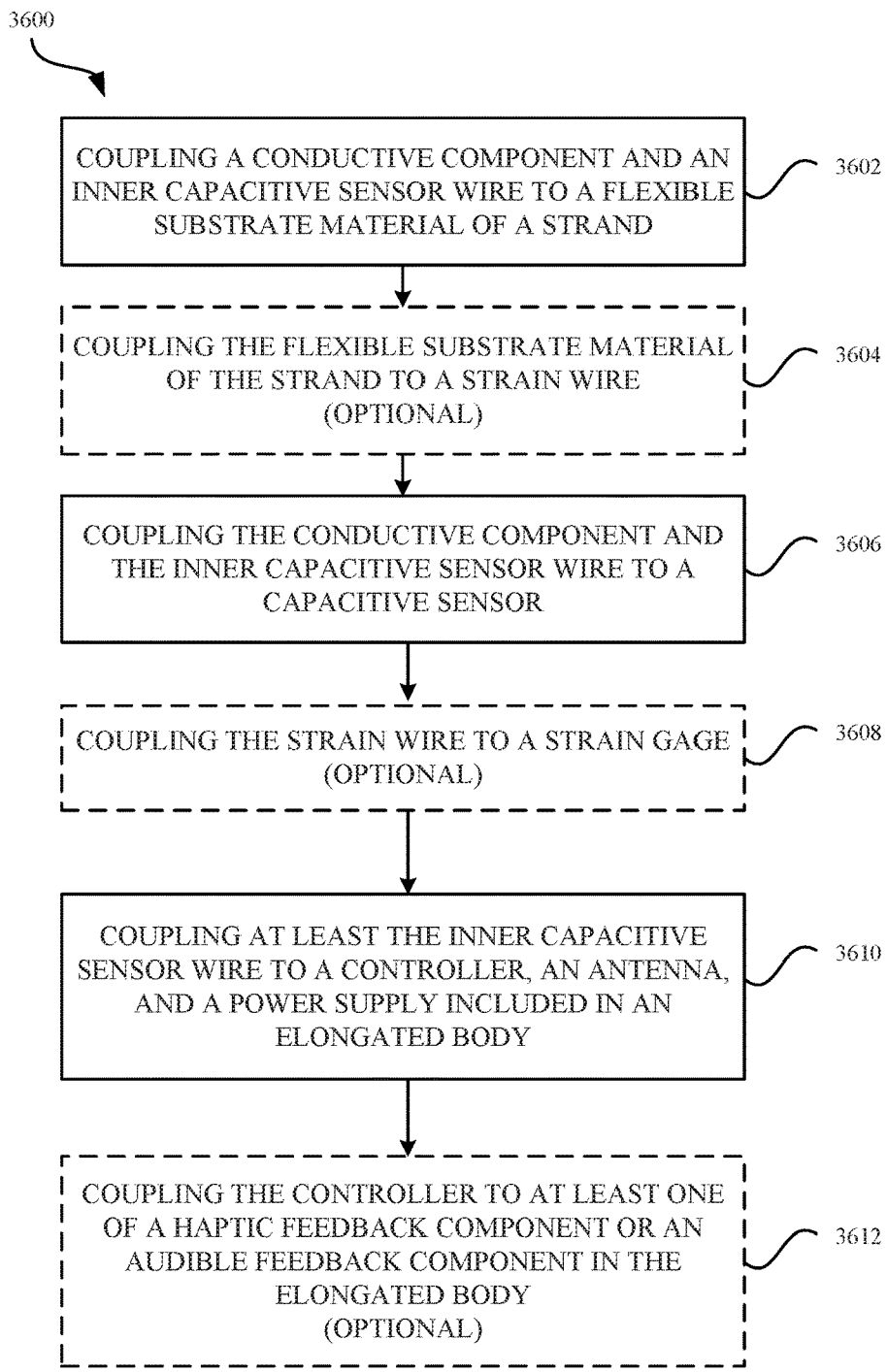
FIG. 36 illustrates a method for constructing a touch sensitive device, in accordance with some embodiments.

FIG. 36 illustrates a method 3600 for constructing a touch sensitive device 2510 according to some of the embodiments described herein. Although FIG. 36 illustrates that the method 3600 is described with reference to constructing the strand 2900, the method 3600 can be utilized to construct other embodiments of the touch sensitive device 2510. The method 3600 begins at step 3602 where a capacitive component 2950 and an inner capacitive sensor wire 2952 is coupled to a flexible substrate material 2912 of a strand 2900. The method 3600 optionally includes the step 3604 of coupling a strain wire 2962 to the flexible substrate material 2912 of the strand 2900. At step 3606, the capacitive component 2950 and the inner capacitive sensor wire 2952 can be electrically coupled to a capacitive sensor 2614. The method 3600 optionally includes the step 3508 of coupling the strain wire 2962 to a strain gage 2650. At step 3610, the inner capacitive sensor wire 2952 is coupled to a controller 2630, an antenna 2640, and a power supply 2660. In some embodiments, where the flexible substrate material 2912 is coupled to both the inner capacitive sensor wire 2952 and the strain wire 2962, then both the inner capacitive sensor wire 2952 and the strain wire 2962 are coupled to the controller 2630, the antenna 2640, and the power supply 2660.

At step 3612, the controller 2630 can be electrically coupled to at least one of a haptic feedback component 140 or an audible feedback component 190 that are included in the elongated body 2702. The method 3600 can be arranged in any suitable order or manner, and can be modified according to any of the embodiments described herein.

Figure 37:
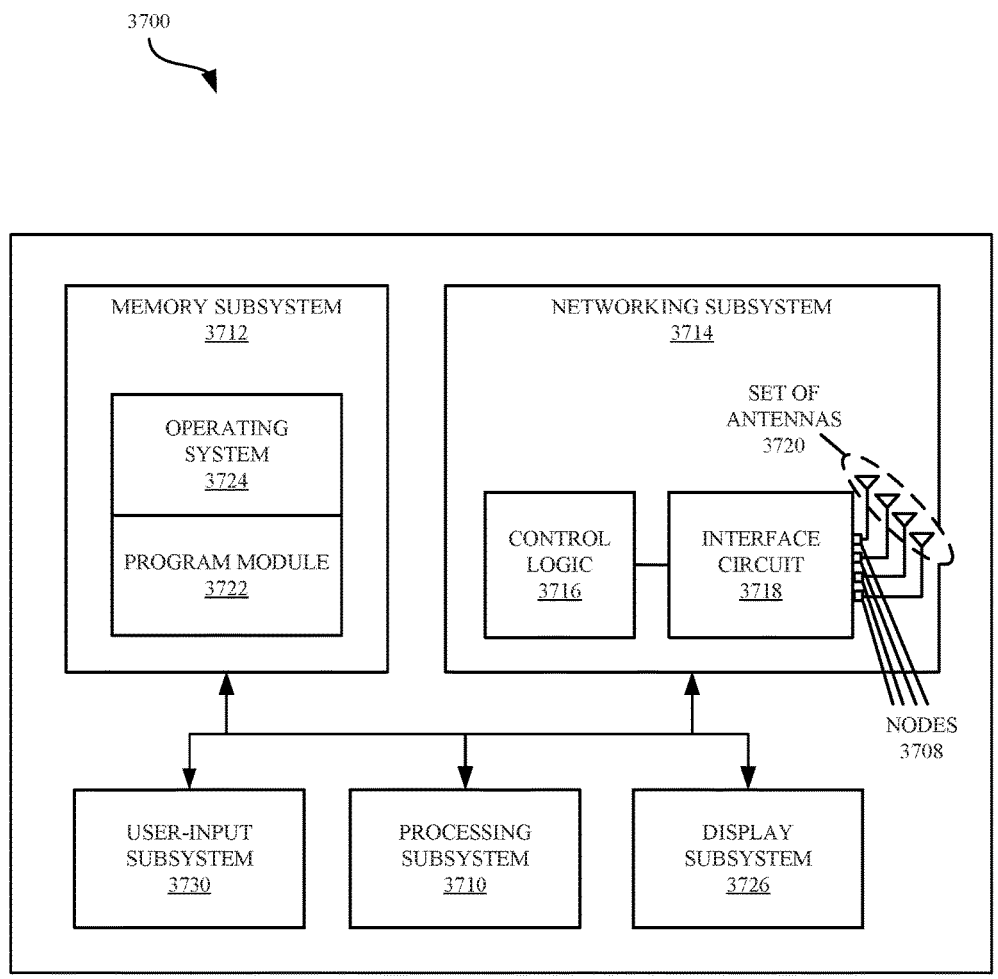
FIG. 37 illustrates a block diagram of an electronic device that can be used to implement the various components described herein, in accordance with some embodiments.

FIG. 37 is a block diagram illustrating an exemplary electronic device 3700, such as the electronic device 150 shown in FIG. 1, the electronic device 1850 shown in FIG. 18, or any other electronic device as described herein. The electronic device 3700 includes a processing subsystem 3710 (which is sometimes referred to as 'processing logic' or a 'means for processing'), memory subsystem 3712, and networking subsystem 3714. Processing subsystem 3710 includes one or more devices configured to perform computational operations. For example, the processing subsystem 3710 can include one or more microprocessors, application-specific integrated circuits (ASICs), microcontrollers, programmable-logic devices, and/or one or more digital signal processors (DSPs).

The memory subsystem 3712 includes one or more devices for storing data and/or instructions for processing subsystem 3710 and networking subsystem 3714. For example, memory subsystem 3712 can include dynamic random access memory (DRAM), static random access memory (SRAM), a read-only memory (ROM), flash memory, and/or other types of memory. In some embodiments, instructions for processing subsystem 3710 in memory subsystem 3712 include: one or more program modules or sets of instructions (such as program module 3722 or operating system 3724), which may be executed by processing subsystem 3710. For example, a ROM can store programs, utilities or processes to be executed in a non-volatile manner, and DRAM can provide volatile data storage, and may store instructions related to the operation of electronic device 3700. Note that the one or more computer programs may constitute a computer-program mechanism, a computer-readable storage medium or software. Moreover, instructions in the various modules in memory subsystem 3712 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 3710. In some embodiments, the one or more computer programs are distributed over a network-coupled computer system so that the one or more computer programs are stored and executed in a distributed manner.

In addition, memory subsystem 3712 can include mechanisms for controlling access to the memory. In some embodiments, memory subsystem 3712 includes a memory hierarchy that comprises one or more caches coupled to a memory in electronic device 3700. In some of these embodiments, one or more of the caches is located in processing subsystem 3710.

In some embodiments, memory subsystem 3712 is coupled to one or more high-capacity mass-storage devices (not shown). For example, memory subsystem 3712 can be coupled to a magnetic or optical drive, a solid-state drive, or another type of mass-storage device. In these embodiments, memory subsystem 3712 can be used by electronic device 3700 as fast-access storage for often-used data, while the mass-storage device is used to store less frequently used data.

Networking subsystem 3714 includes one or more devices configured to couple to and communicate on a wired and/or wireless network (i.e., to perform network operations), including: control logic 3716, an interface circuit 3718 (which is sometimes referred to as a 'communication circuit') and a set of antennas 3720 (or antenna elements). These antennas may be included inside of a cavity (defined by an inner surface of an external housing or case) or an internal volume of electronic device 3700. In some embodiments, set of antennas 3720 includes an adaptive array that can be selectively turned on and/or off by control logic 3716 to create a variety of optional antenna patterns or 'beam patterns.' (While FIG. 37 includes set of antennas 3720, in some embodiments electronic device 3700 includes one or more nodes, such as nodes 3708, e.g., a pad, which can be coupled to set of antennas 3720. Thus, electronic device 3700 may or may not include set of antennas 3720.) For example, networking subsystem 3714 can include a Bluetooth networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Within electronic device 3700, processing subsystem 3710, memory subsystem 3712, and networking subsystem 3714 are coupled together using bus 3728 that facilitates data transfer between these components. Bus 3728 may include an electrical, optical, and/or electro-optical connection that the subsystems can use to communicate commands and data among one another. Although only one bus 3728 is shown for clarity, different embodiments can include a different number or configuration of electrical, optical, and/or electro-optical connections among the subsystems.

In some embodiments, electronic device 3700 includes a display subsystem 3726 for displaying information on a display, which may include a display driver and the display, such as a liquid-crystal display, a multi-touch touchscreen, etc. Display subsystem 3726 may be controlled by processing subsystem 3710 to display information to a user (e.g., information relating to incoming, outgoing, or an active communication session).

Electronic device 3700 can also include a user-input subsystem 3730 that allows a user of the electronic device 3700 to interact with electronic device 3700. For example, user-input subsystem 3730 can take a variety of forms, such as: a button, keypad, dial, touch screen, audio input interface, visual/image capture input interface, input in the form of sensor data, etc.

Electronic device 3700 can be (or can be included in) any electronic device with at least one network interface. For example, electronic device 3700 may include: a cellular telephone or a smartphone, a wireless device, a mobile device, a tablet computer, a laptop computer, a notebook computer, a personal or desktop computer, a netbook computer, a media player device, an electronic book device, a MiFi® device, a smartwatch, a wearable computing device, a portable computing device, a consumer-electronic device, as well as any other type of electronic computing device having wireless communication capability that can include communication via one or more wireless communication protocols.

Although specific components are used to describe electronic device 3700, in alternative embodiments, different components and/or subsystems may be present in electronic device 3700. For example, electronic device 3700 may include one or more additional processing subsystems, memory subsystems, networking subsystems, and/or display subsystems. Additionally, one or more of the subsystems may not be present in electronic device 3700. Moreover, in some embodiments, electronic device 3700 may include one or more additional subsystems that are not shown in FIG. 37. Also, although separate subsystems are shown in FIG. 37, in some embodiments some or all of a given subsystem or component can be integrated into one or more of the other subsystems or component(s) in electronic device 3700. For example, in some embodiments program module 3722 is included in operating system 3724 and/or control logic 3716 is included in interface circuit 3718.

Moreover, the circuits and components in electronic device 3700 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

While some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the latching technique may be implemented using program module 3722, operating system 3724 or in firmware in interface circuit 3718.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. An electronic stylus capable of wireless communication with an electronic device, the electronic device having a display assembly overlaid by a protective layer, the display assembly including a touch sensitive surface that overlays a display, the electronic stylus comprising:
 a housing that carries components, the components comprising:
  flexible contact members disposed at a distal end of the housing, wherein some of the flexible contact members are capable of flexing relative to one another when contacting the protective layer, wherein some of the flexible contact members include (i) a capacitive component that is capable of detecting a change in capacitance while in contact with the protective layer, and (ii) a strain wire that is capable of detecting an amount of strain exerted by the flexible contact members due to the flexing; and
  a sensor coupled to the flexible contact members, the sensor capable of providing a detection signal that represents a respective change in position of the flexible contact members, wherein the respective change in position corresponds to an amount of strain and a corresponding change in capacitance of the flexible contact members during the flexing,
  a processor in communication with the sensor and capable of receiving the detection signal, the processor capable of generating a feedback instruction that is based upon the respective change in position of the flexible contact members, and
  a communications unit coupled to and capable of receiving the feedback instruction from the processor, wherein the communications unit responds to the feedback instruction by transmitting a feedback parameter to the electronic device such that a graphical output is presented at the display in accordance with the respective change in position of the flexible contact members.

2. The electronic stylus of claim 1, wherein the respective changes in position of the flexible contact members is caused by applying a load to the protective layer via the flexible contact members.

3. The electronic stylus of claim 1, wherein the amount of strain is characterized as at least one of axial strain, bending strain, shear strain, or torsional strain.

4. The electronic stylus of claim 1, wherein the sensor is coupled to the flexible contact members via the strain wire.

5. The electronic stylus of claim 1, wherein the flexible contact members are coupled to the sensor via respective capacitive wires.

6. The electronic stylus of claim 1, wherein the sensor is capable of detecting an amount of force applied by the flexible contact members to the protective layer that is based on the corresponding change in capacitance, and the graphical output is based on the amount of force applied.

7. The electronic stylus of claim 1, wherein the processor alters the graphical output based on a feedback preference.

8. The electronic stylus of claim 7, wherein the processor is capable of balancing a first amount of the feedback preference with a second amount of the respective change in position to alter the graphical output presented at the display.

9. The electronic stylus of claim 1, wherein some of the flexible contact members include at least two angularly spaced apart strain wires.

10. An accessory device, comprising:
 a housing having walls that define a cavity, wherein the housing carries operational components in the cavity that include:
  a processor capable of providing instructions,
  flexible tip extending through an opening at a distal end of the housing, wherein the flexible tips are capable of flexing relative to one another when a stimulus originating from outside the housing transmits a load through the flexible tips,
  a strain gauge coupled to the processor and the flexible tips, the strain gauge capable of detecting an amount of strain exerted by the flexible tips during the flexing, and
  a capacitive sensor coupled to the processor and the flexible tip, wherein the capacitive sensor is capable of ROM detecting a change in capacitance while the flexible tips are flexing,
  wherein the processor is capable of generating a contact parameter based on the amount of strain and the change in capacitance.

11. The accessory device of claim 10, wherein the stimulus originates from a protective layer of an electronic device, and the accessory device further comprises:
 a wireless communications component coupled to the processor, the wireless communications component capable of wirelessly transmitting the contact parameter to the electronic device.

12. The accessory device of claim 11, wherein the strain gauge is capable of detecting a magnitude and orientation of the load.

13. The accessory device of claim 10, wherein the amount of strain is characterized as at least one of axial strain, bending strain, shear strain, or torsional strain.

14. The accessory device of claim 12, wherein strain wires extend along lengths of the flexible, and the strain wires are coupled to the strain gauge.

15. The accessory device of claim 14, wherein the strain wires are insulated by a protective flexible material that minimizes damage to the strain wires during the flexing.

16. The accessory device of claim 14, wherein the amount of strain is characterized as at least one of axial strain, bending strain, shear strain, or torsional strain.

17. A method for generating feedback at an electronic stylus that includes a housing, a sensor carried by walls of the housing, flexible contact members that include a capacitive element and a strain wire that are coupled to the sensor, a processor in communication with the sensor, and a wireless communications unit coupled to the processor, the method comprising:
 in response to detecting, by the sensor, a change in a position of the flexible contact members caused by an interaction between the flexible contact members and a touch sensitive portion of an electronic device, wherein the change in position is based on (i) a change in capacitance in the capacitive element during the interaction with the touch sensitive portion, and (ii) an amount of strain experienced by the strain wire during the interaction with the touch sensitive portion:

receiving, by the processor, a contact feedback parameter from the sensor that is based on the change in position; and instructing, by the processor, the wireless communications unit to wirelessly transmit the contact feedback parameter to the electronic device.

18. The method of claim 17, wherein the amount of strain is characterized as at least one of axial strain, bending strain, shear strain, or torsional strain.

19. The method of claim 17, wherein the sensor is coupled to the flexible contact members via a strain wire.

20. The method of claim 17, wherein the amount of strain is characterized as at least one of axial strain, bending strain, shear strain, or torsional strain.

* * * * *

UNITED STATES PATENT AND TRADEMARK OFFICE
CERTIFICATE OF CORRECTION

PATENT NO.         : 10,268,273 B1
APPLICATION NO.    : 15/593219
DATED              : April 23, 2019
INVENTOR(S)        : Sundaram et al.

Page 1 of 1

It is certified that error appears in the above-identified patent and that said Letters Patent is hereby corrected as shown below:

In Claim 10, Column 56, Line 16: "flexible tip extending" should read -- flexible tips extending --.

In Claim 10, Column 56, Line 27: "of ROM detecting a change" should read -- of detecting a change --.

In Claim 14, Column 56, Line 46: "lengths of the flexible, and" should read -- lengths of the flexible tips, and --.

Signed and Sealed this
Third Day of December, 2019

Andrei Iancu
*Director of the United States Patent and Trademark Office*